(12) United States Patent
Ganichev et al.

(10) Patent No.: US 9,344,349 B2
(45) Date of Patent: May 17, 2016

(54) TRACING NETWORK PACKETS BY A CLUSTER OF NETWORK CONTROLLERS

(71) Applicant: Nicira, Inc., Palo Alto, CA (US)

(72) Inventors: Igor Ganichev, Mountain View, CA (US); Pankaj Thakkar, Santa Clara, CA (US); Teemu Koponen, San Francisco, CA (US); Mo Dong, Urbana, IL (US)

(73) Assignee: NICIRA, INC., Palo Alto, CA (US)

( * ) Notice: Subject to any disclaimer, the term of this patent is extended or adjusted under 35 U.S.C. 154(b) by 257 days.

(21) Appl. No.: 13/968,387

(22) Filed: Aug. 15, 2013

(65) Prior Publication Data

US 2015/0016286 A1    Jan. 15, 2015

Related U.S. Application Data

(60) Provisional application No. 61/845,942, filed on Jul. 12, 2013, provisional application No. 61/859,153, filed on Jul. 26, 2013.

(51) Int. Cl.
*H04J 3/14* (2006.01)
*H04L 12/26* (2006.01)
(Continued)

(52) U.S. Cl.
CPC ............ *H04L 43/10* (2013.01); *H04L 12/4633* (2013.01); *H04L 45/42* (2013.01); *H04L 45/586* (2013.01); *H04L 49/70* (2013.01); *G06F 11/07* (2013.01); *G06F 21/60* (2013.01)

(58) Field of Classification Search
CPC ....... H04L 43/10; H04L 45/586; H04L 49/70; H04L 43/12; H04L 12/2678; H04L 43/50; H04L 43/04; H04L 63/20; H04L 63/0227; G06F 9/45533; G06F 9/45558; G06F 11/3096; G06F 11/3089; G06F 11/3466; G06F 21/60; G06F 11/07
See application file for complete search history.

(56) References Cited

U.S. PATENT DOCUMENTS 5,224,100 A    6/1993    Lee et al.
5,245,609 A    9/1993    Ofek et al.
(Continued)

FOREIGN PATENT DOCUMENTS

JP    2002-141905    5/2002
WO    95/06989    3/1995
(Continued)

OTHER PUBLICATIONS

International Search Report and Written Opinion for PCT/US2014/036464, Sep. 22, 2014 (mailing date), Nicira, Inc.
(Continued)

*Primary Examiner* — Brian O'Connor
(74) *Attorney, Agent, or Firm* — Adeli LLP

(57) ABSTRACT

Some embodiments provide a method for a first network controller that manages a set of logical forwarding elements implemented in several managed forwarding elements. The method receives a request to trace a specified packet having a particular source on a logical forwarding element. The method generates the packet according to the packet specification. The generated packet includes an indicator that the packet is for a trace operation. The method sends the packet to a second network controller that manages a managed forwarding element associated with the particular source. The method receives a first set of messages regarding operations performed on the packet from a set of network controllers that receives a second set of messages regarding operations performed on the packet from a set of managed forwarding elements that process the packet.

26 Claims, 23 Drawing Sheets

(51) Int. Cl.
*H04L 12/931* (2013.01)
*H04L 12/717* (2013.01)
*H04L 12/713* (2013.01)
*H04L 12/46* (2006.01)
*G06F 11/07* (2006.01)
*G06F 21/60* (2013.01)

(56) References Cited

U.S. PATENT DOCUMENTS

| | | | |
|---|---|---|---|
| 5,265,092 | A | 11/1993 | Soloway et al. |
| 5,781,534 | A | 7/1998 | Perlman et al. |
| 6,104,700 | A | 8/2000 | Haddock et al. |
| 6,430,160 | B1 | 8/2002 | Smith et al. |
| 6,721,334 | B1 | 4/2004 | Ketcham |
| 7,079,544 | B2 | 7/2006 | Wakayama et al. |
| 7,627,692 | B2 | 12/2009 | Pessi |
| 7,706,266 | B2 | 4/2010 | Plamondon |
| 7,760,735 | B1 | 7/2010 | Chen et al. |
| 7,808,919 | B2 | 10/2010 | Nadeau et al. |
| 7,937,492 | B1 | 5/2011 | Kompella et al. |
| 8,345,558 | B2 | 1/2013 | Nicholson et al. |
| 8,351,418 | B2 | 1/2013 | Zhao et al. |
| 8,611,351 | B2 | 12/2013 | Gooch et al. |
| 8,645,952 | B2 * | 2/2014 | Biswas et al. ................ 718/1 |
| 8,750,288 | B2 * | 6/2014 | Nakil ............... G06N 99/005 370/351 |
| 8,806,005 | B2 * | 8/2014 | Miri et al. ................ 709/224 |
| 8,837,300 | B2 * | 9/2014 | Nedeltchev ............ H04L 43/04 370/241 |
| 9,059,926 | B2 * | 6/2015 | Akhter ............... H04L 41/142 |
| 9,197,529 | B2 * | 11/2015 | Ganichev ............ H04L 45/586 |
| 2005/0132044 | A1 | 6/2005 | Guingo et al. |
| 2005/0232230 | A1 | 10/2005 | Nagami et al. |
| 2006/0028999 | A1 | 2/2006 | Iakobashvilli et al. |
| 2006/0029056 | A1 | 2/2006 | Perera et al. |
| 2006/0037075 | A1 | 2/2006 | Frattura et al. |
| 2006/0206655 | A1 | 9/2006 | Chappell et al. |
| 2006/0282895 | A1 | 12/2006 | Rentzis et al. |
| 2007/0055789 | A1 | 3/2007 | Claise et al. |
| 2008/0049614 | A1 | 2/2008 | Briscoe et al. |
| 2008/0049786 | A1 | 2/2008 | Ram et al. |
| 2009/0010254 | A1 | 1/2009 | Shimada |
| 2009/0109973 | A1 * | 4/2009 | Ilnicki ................ 370/392 |
| 2010/0128623 | A1 | 5/2010 | Dunn et al. |
| 2011/0317696 | A1 | 12/2011 | Aldrin et al. |
| 2012/0159454 | A1 | 6/2012 | Barham et al. |
| 2012/0287791 | A1 | 11/2012 | Xi et al. |
| 2013/0031233 | A1 * | 1/2013 | Feng et al. ................ 709/223 |
| 2013/0044636 | A1 | 2/2013 | Koponen et al. |
| 2013/0067067 | A1 | 3/2013 | Miri et al. |
| 2013/0125120 | A1 * | 5/2013 | Zhang et al. ................ 718/1 |
| 2013/0332602 | A1 | 12/2013 | Nakil et al. |
| 2014/0029451 | A1 | 1/2014 | Nguyen |
| 2014/0119203 | A1 | 5/2014 | Sundaram et al. |
| 2014/0126418 | A1 * | 5/2014 | Brendel et al. ................ 370/254 |
| 2014/0195666 | A1 | 7/2014 | Dumitriu et al. |
| 2014/0207926 | A1 * | 7/2014 | Benny ................ 709/223 |
| 2014/0281030 | A1 | 9/2014 | Cui et al. |
| 2015/0016287 | A1 | 1/2015 | Ganichev et al. |
| 2015/0016298 | A1 | 1/2015 | Ganichev et al. |

FOREIGN PATENT DOCUMENTS

| | | |
|---|---|---|
| WO | WO 2013/184846 | 12/2013 |
| WO | PCT/US2014/036464 | 5/2014 |
| WO | WO 2015/005968 | 1/2015 |

OTHER PUBLICATIONS

Portions of prosecution history of U.S. Appl. No. 13/952,538, May 27, 2015, Ganichev, Igor, et al.
Portions of prosecution history of U.S. Appl. No. 13/968,390, Jul. 17, 2015, Ganichev, Igor, et al.
Phaal, Peter, et al., "sFlow Version 5," Jul. 2004, 46 pages, sFlow.org.
Phan, Doantam, et al., "Visual Analysis of Network Flow Data with Timelines and Event Plots", Month Unknown, 2007, pp. 1-16, VizSEC.

* cited by examiner

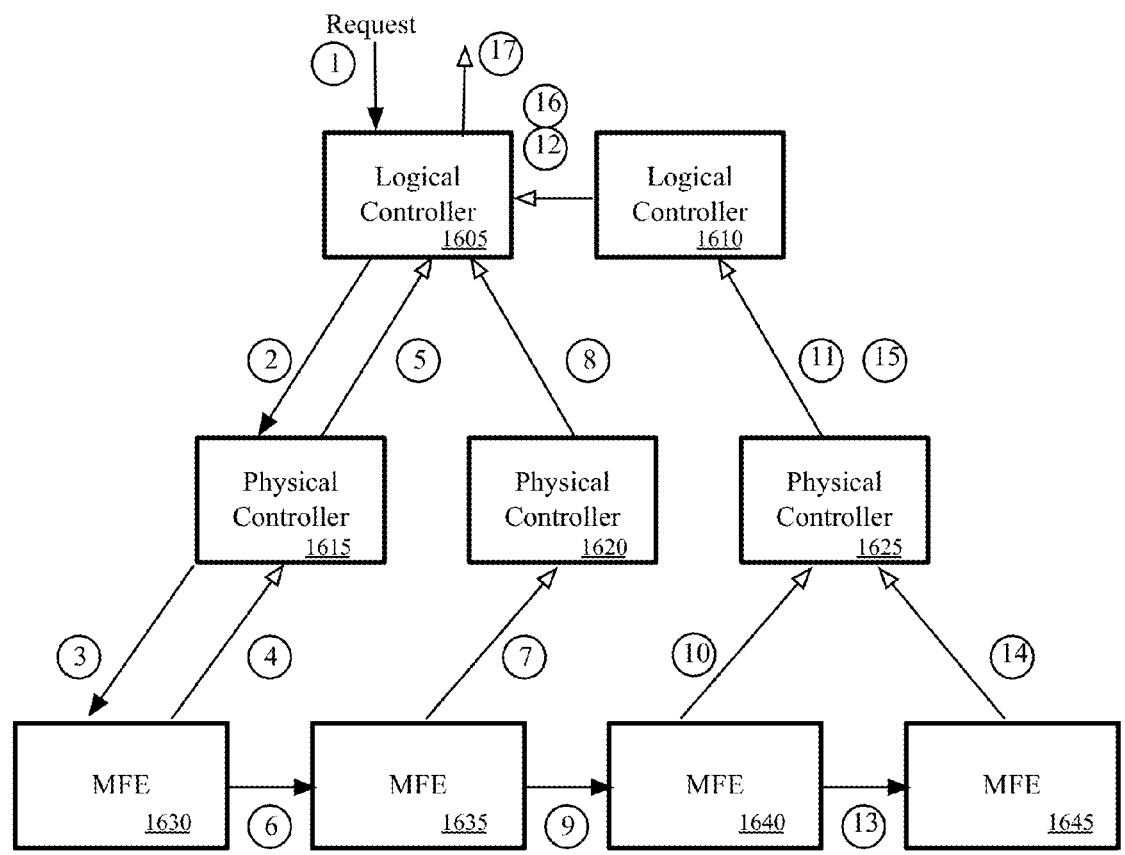
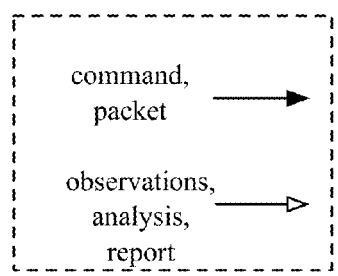
*Figure 16*

TRACING NETWORK PACKETS BY A CLUSTER OF NETWORK CONTROLLERS

BACKGROUND

Typical physical networks include many routers and switches through which packets travel. In some cases for such networks, an administrator may identify that packets are not being delivered correctly, and therefore may wish to troubleshoot the network. In order to do so, some physical networks have the ability to perform a route trace that shows how far a packet travels. In physical networks, the administrator can often log into the routers and troubleshoot the routing table.

However, in at least some virtualized networks that operate many separate logical networks over the physical network, packets are typically sent across the physical network in tunnels between managed forwarding elements. These tunneled packets are passed through the unmanaged physical forwarding elements (e.g., standard routers) with minimal processing, and inspecting the routers will not provide an administrator with useful information. Thus, methods for troubleshooting virtualized networks are needed.

BRIEF SUMMARY

Some embodiments provide a cluster of network controllers for managing forwarding elements that performs novel packet tracing operations. In some embodiments, the cluster of network controllers includes (i) a first set of network controllers that define and manage logical networks implemented by the managed forwarding elements and (ii) a second set of network controllers that are responsible for managing the operations of the managed forwarding elements.

In some embodiments, a logical network controller receives a request to trace a specified packet having a particular source on a logical forwarding element. In some embodiments, the packet specifies a source address and a destination address that are associated with one or more logical forwarding elements (e.g., on one or more logical layer 2 (L2) domains, which may be connected by a logical layer 3 (L3) router). In response to the request, the logical network controller generates a traceable packet from the source address to the destination address. The logical network controller identifies a physical network controller that manages a managed forwarding element (MFE) to which an entity (e.g., a virtual machine (VM) located at the source address connects). The logical network controller passes the packet to the identified physical network controller.

The physical network controller inserts the traceable packet into the MFE associated with the source of the packet. After inserting the traceable packet, the physical network controller receives a set of observations from the MFE that indicate certain operations performed on the packet. As the packet traverses a path to its destination, the packet is processed and forwarded by a set of MFEs that are managed by a set of physical network controllers in the cluster. Each of these physical network controllers receives a set of observations from one or more MFEs that the physical network controller manages. In some embodiments, the physical network controllers analyze the received observations and send the analyses to the logical network controller that generated the traceable packet. Based on the messages and/or analyses from the physical network controllers, the logical network controller generates a report regarding the packet tracing operation, for delivery to a user that requested the trace.

In some embodiments, the request is received at the logical network controller through an application programming interface (API) command. A user (e.g., a network administrator), using one of a variety of user interface tools, designs a packet to be traced through the physical network managed by the controller. In addition to the source and destination addresses, the user may specify whether to trace a broadcast packet (i.e., instead of a specific destination address), a payload for the packet, the packet size, or other information.

The logical network controller generates the packet, and in some embodiments inserts an indicator into a particular location in the packet that specifies the packet as a traced packet. For instance, some embodiments use a single bit at a specific location in the packet header (e.g., a logical VLAN field) that flags the packet as being used for a trace operation. The logical network controller then sends the packet to the physical controller that manages a particular MFE associated with the source of the packet (e.g., the MFE to which the entity having the source address connects). The physical controller inserts this packet into the appropriate MFE. In some embodiments, the MFE is a software forwarding element that operates in a physical host machine along with the VM associated with the source address. After sending the packet to the appropriate physical network controller, the logical network controller then awaits the receipt of analyses of the observations from the physical network controllers that manage the MFEs through which the packet passes.

In some embodiments, each MFEs through which the packet passes performs a set of logical forwarding operations and a set of physical forwarding operations on the packet, as though the packet was an unmarked packet originating from a VM or other source on the network. By performing logical forwarding operations, the MFEs advance the packet through the logical networks towards the destination. The MFEs perform the physical forwarding operations to advance the packet through the physical networks that implement the logical networks. In some embodiments, the MFEs send an observation after performing a physical forwarding operation only. In other embodiments, the MFEs send an observation after performing a logical forwarding operation as well as after performing a physical forwarding operation.

In some embodiments, the logical forwarding operations that the MFEs perform include logical L2 ingress ACL operations, logical L2 forwarding operations, and logical L2 egress ACL operations. The logical L2 ingress ACL operations determine whether a logical forwarding element for a logical L2 domain (i.e., a logical switch) should accept an incoming packet. The logical L2 forwarding operations include operations that forward packets from one logical port to another logical port of a logical forwarding element for a logical L2 domain. These operations determine a destination logical port on the logical switch based on destination address information stored in the packet in some embodiments. The logical L2 egress ACL operations determine whether a logical forwarding element for a logical L2 domain should allow a packet to exit the logical forwarding element.

The logical forwarding operations of some embodiments may additionally include logical L3 ingress ACL operations, logical L3 forwarding operations, and logical L3 egress ACL operations. The logical L3 ingress ACL operations determine whether a logical forwarding element for routing packets at L3 (i.e., a logical router) should accept an incoming packet. The logical L3 forwarding operations include operations for routing packets from one logical L2 domain to another logical L2 domain, or to an external address. The logical L3 egress ACL operations determine whether a logical forwarding element for routing packets at L3 should allow a packet to exit the logical forwarding element.

One MFE may process a packet through several stages and therefore perform several of the above logical operations, as well as physical operations such as sending the packet out through a tunnel. In some embodiments, while processing a packet through several stages, the MFEs store a register bit indicating that the packet is marked for a trace operation. The MFE looks up this register bit while processing the packet in order to determine that observation messages should be sent to the controller cluster.

In order to send these observation messages, the forwarding tables of the MFEs of some embodiments contain entries that specify when the observation messages should be sent. In some embodiments, these messages contain (i) the packet being processed by the MFE as received and (ii) the contents of the registers for the packets, from which the physical controllers can identify the relevant data. The forwarding table entry for sending the observation messages, in some embodiments, specifies the MFE to copy certain data to the register and then send the register contents to the physical controller that manages this MFE.

In some embodiments, each physical network controller that receives the observations analyzes the received observations and sends the analyses to the logical network controller. Once the logical network controller receives the analyses of the observations (or once a timeout set for the trace operation is reached), the logical network controller of some embodiments generates a report and delivers it to the requesting user. In some embodiments, this report indicates whether the packet was delivered and provides information about each of the received observations.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

FIG. 16 conceptually illustrates an example for a trace packet that is generated by a logical controller.

DETAILED DESCRIPTION

Figure 1:
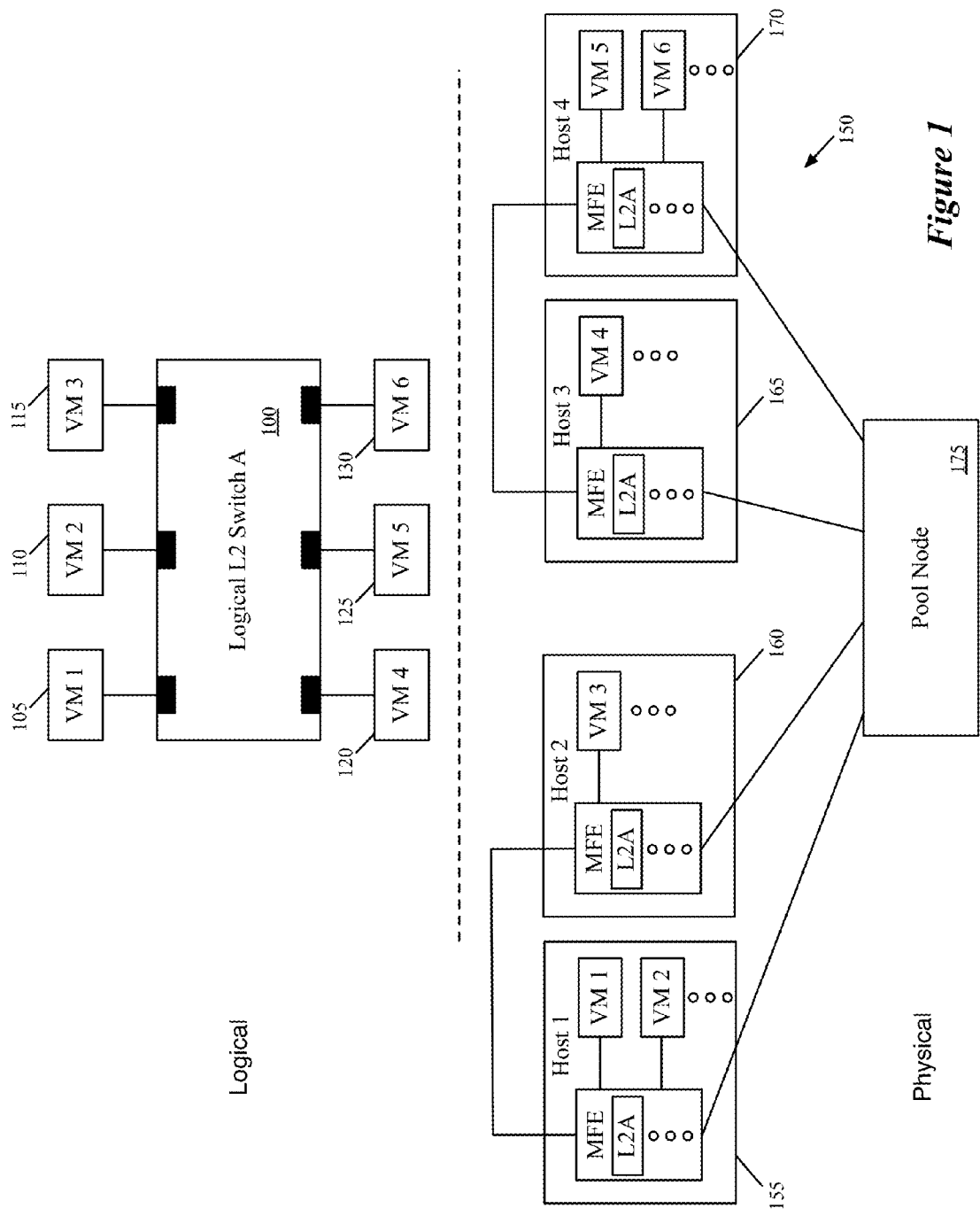
FIG. 1 conceptually illustrates a logical forwarding element 100 implemented in a physical network.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a cluster of network controllers for managing forwarding elements that performs novel packet tracing operations. In some embodiments, the cluster of network controllers includes (i) a first set of network controllers that define and manage logical networks implemented by the managed forwarding elements and (ii) a second set of network controllers that are responsible for managing the operations of the managed forwarding elements.

In some embodiments, a logical network controller (also referred to as a logical controller) receives a request to trace a specified packet having a particular source on a logical forwarding element. In some embodiments, the packet specifies a source address and a destination address that are associated with one or more logical forwarding elements (e.g., on one or more logical layer 2 (L2) domains, which may be connected by a logical layer 3 (L3) router). In response to the request, the logical controller generates a traceable packet from the source address to the destination address. The logical controller identifies a physical network controller (also referred to as a physical controller) that manages a managed forwarding element (MFE) to which an entity (e.g., a virtual machine (VM) located at the source address connects). The logical controller passes the packet to the identified physical controller.

The physical controller inserts the traceable packet into the MFE associated with the source of the packet. After inserting the traceable packet, the physical controller receives a set of observations from the MFE that indicate certain operations performed on the packet. As the packet traverses a path to its destination, the packet is processed and forwarded by a set of MFEs that are managed by a set of physical controllers in the cluster. Each of these physical controllers receives a set of observations from one or more MFEs that the physical controller manages. In some embodiments, the physical controllers analyze the received observations and send the analyses to the logical controller that generated the traceable packet. Based on the messages and/or analyses from the physical controllers, the logical controller generates a report regarding the packet tracing operation, for delivery to a user that requested the trace.

In some embodiments, the cluster of network controllers (also referred to as controller cluster) manages one or more logical forwarding elements implemented across physical forwarding elements in a distributed, virtualized environment. That is, rather than using a single physical switch to implement a logical forwarding element, the forwarding responsibilities are spread across MFEs distributed throughout the network. For instance, some embodiments include switching software within physical host machines (e.g., running on top of or within a hypervisor on the host). This switching software (e.g., open virtual switch ("OVS")) implements the logical forwarding elements of some embodiments.

FIG. 1 conceptually illustrates a logical forwarding element (e.g., a logical switch) 100 implemented in a physical network 150. As shown, the logical forwarding element 100 connects six virtual machines 105-130. Each of these virtual machines 105-130 connects to a logical port of the logical forwarding element 100. In some embodiments, a user (e.g., network administrator) defines the logical forwarding element, which may be part of a larger logical network. For instance, the logical forwarding element is a logical L2 switch that may include a logical port that connects to an external gateway (e.g., to an external network), to a logical L3 router (which may also connect to other logical L2 switches), etc.

In some embodiments, the user defines the logical forwarding element 130 through an API of a controller cluster, which translates the user definition into a logical control plane definition of the logical forwarding element 130. The controller cluster then converts this logical control plane definition into a logical forwarding plane specification of the logical forwarding element. The logical forwarding plane specification, in some embodiments, includes logical forwarding table entries (logical flow entries) that specify rules for forwarding packets to logical ports of the logical forwarding element. For instance, the logical control plane of some embodiments includes bindings between media access control (MAC) addresses of VMs and logical ports, and the logical forwarding plane specifies flow entries for forwarding packets to the logical ports based on matches of the MAC addresses.

In addition, the controller cluster of some embodiments converts the logical forwarding plane data into physical control plane data that specifies rules for the MFEs to follow in order to implement the logical forwarding element. This physical control plane data includes matches over the logical forwarding element itself (e.g., based on the source of the packet), as well as entries for placing packets into tunnels from one MFE to another (and receiving packets from these tunnels). These rules, in some embodiments, incorporate data from the MFEs, such as physical ports and tunnel IP address information. The controller cluster then pushes this physical control plane data down to the MFEs.

In some embodiments, the different network controllers (i.e., logical and physical controllers) in the controller cluster take part in different portions of the translation from logical control plane definition into the logical forwarding plane definition and then into the physical control plane data. The controller cluster and generation of flow entries of some embodiments is described in greater detail in the U.S. Publication 2013/0103817, which is incorporated herein by reference.

The controller cluster, as mentioned, pushes these flow entries to several MFEs in some embodiments, such that the logical forwarding element (and/or other logical forwarding elements, such as logical routers) is implemented in a distributed, virtualized fashion. The physical network 150 of FIG. 1 illustrates that the six VMs 105-130 are hosted on four different host machines 155-170. Some embodiments may only host one VM from a particular logical network on a single machine, while other embodiments may put multiple VMs from a logical network on the same machine, as in this case with the hosts 155 and 170. As shown, in the virtualized environment, each of these hosts 155-170 also hosts additional virtual machines beyond those connected to the logical forwarding element 100. That is, many tenants may share the use of the physical network 150, and in fact may share use of a single physical host.

Operating on each host (e.g., within the hypervisor on the host) is a MFE. The MFE, in some embodiments, is a software forwarding element to which the network controller connects and pushes down flow entries for various logical forwarding elements. In this case, because VMs from the logical forwarding element 100 are located on each of the four illustrated hosts 155-170, the MFE in each of these hosts implements the logical forwarding element 100. That is, each of the illustrated MFEs has flow entries in its forwarding tables for logically forwarding packets to the logical ports associated with the different VMs 105-130.

In addition to the host machines 155-170, the physical network 150 further includes a pool node 175, also referred to as a service node in some embodiments. The pool node 175 connects to each of the hosts within the network, and serves to forward packets between edge MFEs (those located in the hosts, at the edge of the network) that do not have direct connections. As shown, the first MFE in host 155 and second MFE in host 160 have a tunnel connection between them, as do the third MFE in host 165 and the fourth MFE in host 170. However, the first MFE does not have a direct tunnel connection to the third or fourth MFE, nor does the second MFE. Instead, each of the four MFEs have tunnels defined to ports of the pool node 175. In some embodiments, packets sent along each of these tunnels pass through one or more unmanaged forwarding elements (e.g., standard, dedicated routers) that do not receive flow entries from the network controller and pass along the packets with only minimal processing.

In addition, the pool node 175 may include connections to a remote domain in some embodiments (e.g., a separate domain that implements a different logical L2 switch). The logical forwarding element 300 could include a seventh port for connecting to this remote domain, and packets sent from one of the VMs 105-130 to the remote domain would be forwarded by the pool node through a physical connection to the remote domain.

In some embodiments, tunnels provided by tunneling protocols (e.g., control and provisioning of wireless access points (CAPWAP), generic route encapsulation (GRE), GRE Internet Protocol Security (IPsec), etc.) may be used to facilitate the implementation of the logical forwarding element 101 the four MFEs. By tunneling, a packet is transmitted through the switches and routers as a payload of another packet. That is, a tunneled packet does not have to expose its addresses (e.g., source and destination MAC addresses) as the packet is forwarded based on the addresses included in the header of the outer packet that is encapsulating the tunneled packet. Tunneling, therefore, allows separation of logical address space from the physical address space as a tunneled packet can have addresses meaningful in the logical address space while the outer packet is forwarded/routed based on the addresses in the physical address space. In this manner, the tunnels may be viewed as the "logical wires" that connect MFEs in the network in order to implement the logical forwarding element.

Within the above-described environment, in which the controller cluster connects to each of the MFEs (including the pool node), in some embodiments the controller cluster receives a request through an API command. A user (e.g., a network administrator), using one of a variety of user interface tools, designs a packet to be traced through the physical network managed by the controller cluster. In addition to the source and destination addresses, the user may specify whether to trace a broadcast packet (i.e., instead of a specific destination address), a payload for the packet, the packet size, or other information.

The controller cluster generates the packet, and in some embodiments inserts an indicator into a particular location in the packet that specifies the packet as a traced packet. For instance, some embodiments use a single bit at a specific location in the packet header (e.g., a logical VLAN field) that flags the packet as being used for a trace operation. The controller cluster then sends the packet to the particular MFE associated with the source of the packet (e.g., the managed forwarding element to which the entity having the source address connects). Some embodiments additionally set registers associated with the packet at the particular managed forwarding element in order to simulate the MFE receiving the packet through a particular physical port associated with the source address.

In some embodiments, this MFE is a software forwarding element that operates in a physical host machine along with the VM associated with the source address. The controller cluster then awaits the receipt of observations from the MFEs through which the packet passes.

In some embodiments, the MFEs through which the packet passes each performs a set of logical forwarding operations and a set of physical forwarding operations on the packet like the forwarding element does when processing an unmarked packet actually received from a VM. By performing logical forwarding operations, the MFEs advance the packet through the logical networks towards the destination. The MFEs perform the physical forwarding operations to advance the packet through the physical networks that implement the logical networks. In some embodiments, the MFEs send an observation after performing a physical forwarding operation only. In other embodiments, the managed forwarding elements send observations after performing a logical forwarding operation as well as after performing a physical forwarding operation.

In some embodiments, the packet tracing operation operates with a specified timeout after which the controller cluster assumes that no additional observations will be delivered. Other than sending the observations and not actually delivering the packet to a VM (or other destination bound to a logical port), the MFEs process the packet in the same manner as an unmarked packet actually received from a VM. In some embodiments, while processing a packet through several stages, the MFEs store a register bit indicating that the packet is marked for a trace operation.

In order to send observation messages, the forwarding tables of the MFEs of some embodiments contain entries that specify when the observation messages should be sent. In some embodiments, these messages contain (i) the packet being processed by the MFE as received and (ii) the contents of the registers for the packets, from which the controller can identify the relevant data. The forwarding table entry for sending the observation messages, in some embodiments, specifies to the MFE to copy certain data to the registers and then send the register contents to the controller.

Once the controller cluster receives the observations (or the timeout is reached), the controller cluster of some embodiments generates a report and delivers it to the requesting user. In some embodiments, this report indicates whether the packet was delivered and provides information about each of the received observations.

Figure 2:
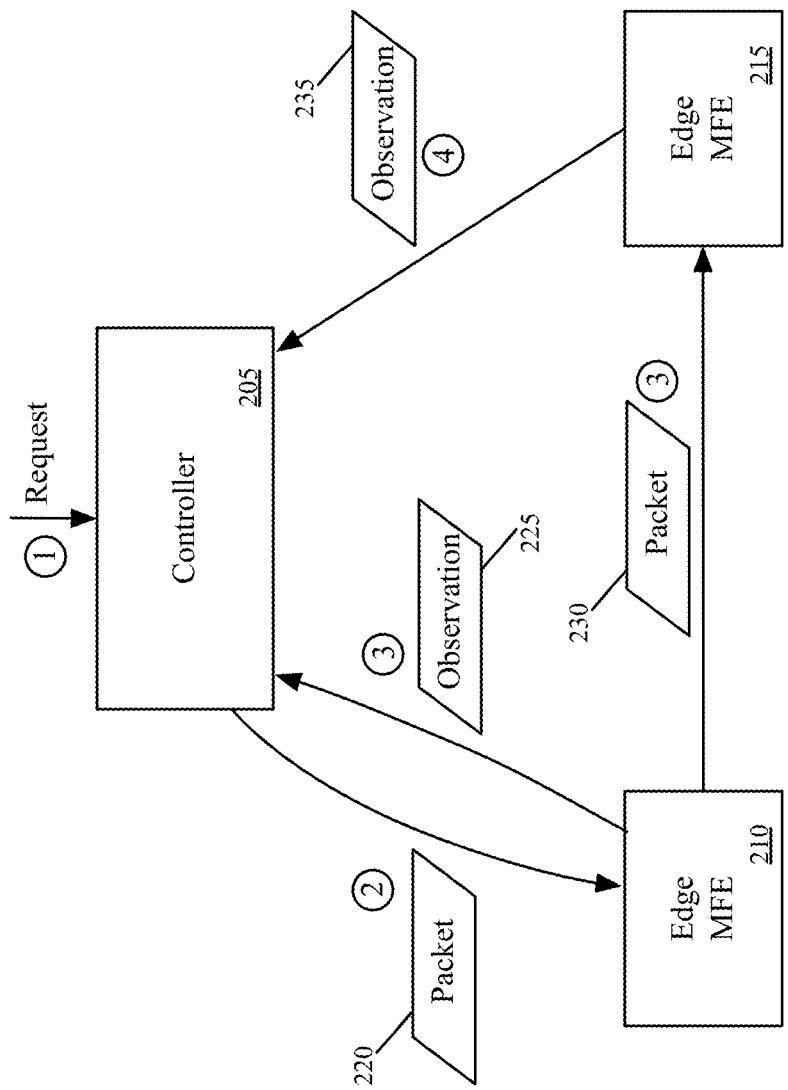
FIG. 2 conceptually illustrates an example for a traced packet that is sent directly from a MFE to a destination MFE.

In some embodiments, the controller cluster includes a single network controller (or a single master controller with a backup controller) that performs translation of the logical control plane definition. This single network controller also generates a trace packet, receives observations from the MFEs, and generates a report from the received observations. FIG. 2 conceptually illustrates an example in which the controller cluster includes such a single network controller that generates a traced packet and receives observations from the MFEs through which the traced packet passes. In this example, the traced packet is injected into a first MFE. The traced packet is then sent directly from the first MFE to a destination MFE. As shown, this example illustrates a controller 205, a first edge MFE 210, and a second edge MFE 215. In addition, the figure illustrates various packets and observations with encircled numbers that indicate an order in which the various data (packets, observation messages) are sent within the network.

As shown by the encircled 1, initially the single controller 205 receives a request (e.g., as will be described further below by reference to FIG. 5). In this case, the request specifies a source logical port that maps to a VM connected to the first MFE 210 and a destination logical port that maps to a VM connected to the second MFE 215. In response to the request, the controller 205 generates a packet 220 and sends this to the MFE (shown by the encircled 2), along with a command to process the packet. The header of the packet 220 specifies the source and destination addresses received in the request, as well as a trace indicator that marks the packet as a test packet for a trace operation.

The first edge MFE 210 processes the packet (e.g., as will be shown further below in FIG. 7), and its forwarding table entries in some embodiments indicate to (i) encapsulate the packet with a logical context tag that specifies a destination logical port corresponding to the destination MAC address and (ii) further encapsulate the packet using tunnel encapsulation with an IP address for a port of the second MFE 215. Furthermore, the forwarding table entries also specify to send an observation message to the controller because a register bit at the MFE has been modified to identify the packet as associated with a trace operation. Thus, as shown by the encircled 3, the first MFE 210 sends both an observation 225 to the controller 205 and a packet 230 to the second MFE 215. In some embodiments, the first MFE 210 sends more than one observation message to the controller 205. In these embodiments, the first MFE 210 sends an observation message after performing a logical or physical forwarding operation in a set of logical and physical forwarding operations that the MFE 210 performs on the packet 230 before sending the packet to the second MFE 215. Sending more than one observation message from a MFE will be further described below by reference to FIG. 4. The packet 230 is the same as the packet 220 in some embodiments, with the additional encapsulations mentioned above.

The MFE 215 receives this packet 230, which still includes the trace indicator, and is encapsulated with the destination logical port. The receiving MFE 215 reads this destination logical port and identifies (via its forwarding table entries) to deliver the packet to the VM associated with the destination logical port. However, based on additional entries that (i) modify a register at the MFE to indicate the trace packet and (ii) read this register when delivering to the logical port, the MFE 215 instead drops the packet and sends an observation 235 (indicated by the encircled 4) to the controller 205. In some embodiments, this is a delivery observation message that specifies the ID of the MFE 215 and the port to which the packet would have been delivered, as will be described by reference to FIG. 8.

Figure 3:
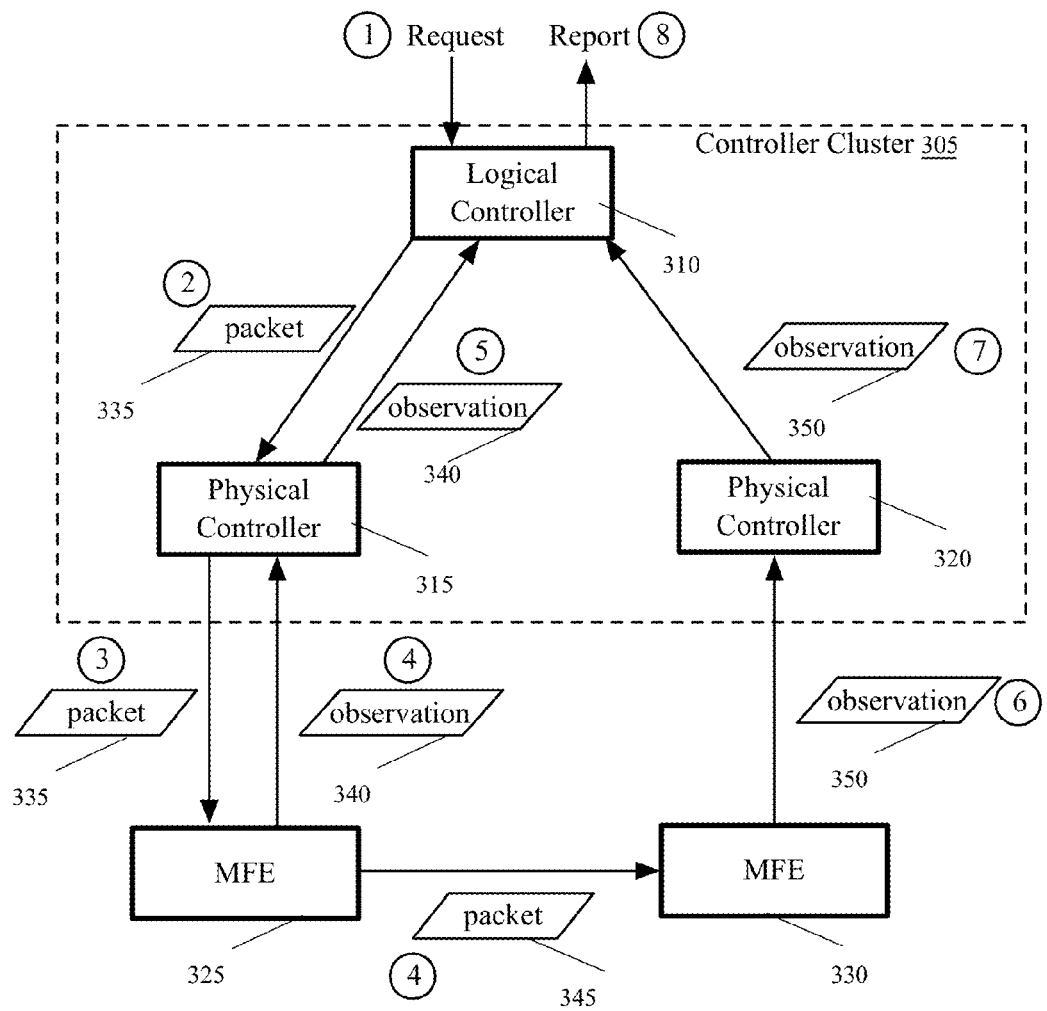
FIG. 3 conceptually illustrates another example for a traced packet that is sent directly from a MFE to the destination MFE.

FIG. 2 above illustrates an example of a trace operation when the controller cluster includes a single network controller. In contrast, FIG. 3 conceptually illustrates an example of a trace operation when the controller cluster includes several different network controllers forming a hierarchy of controllers. As shown, a controller cluster 305 in this example includes a logical controller 310 and two physical controllers 315 and 320. This figure also illustrates a first edge MFE 325 and a second edge MFE 330 along with various packets and observations with encircled numbers that indicate an order in which the packets and observations messages sent within the network.

As shown by the encircled 1, the logical controller 310 receives a request from the user. This request specifies a source logical port that maps to a VM connected to the MFE 325. In response to the request, the logical controller 310 generates a packet 335. As shown by the encircled 2, the logical controller then sends the generated packet to the physical controller 315 because the physical controller 315 manages the MFE 325. In some embodiments, a particular physical controller that manages a particular MFE is the only controller other than a back-up of the particular physical controller that can exchange data with the MFE. The header of the packet 335 specifies the source and destination addresses received in the request, as well as a trace indicator that marks the packet as a test packet for a trace operation.

The physical controller 335 examines the packet and identifies that the MFE 325 is the MFE into which to inject the packet because the logical port to which the source address of the packet connects is mapped to a physical port of the MFE 325. As shown by the encircled 3, the physical controller 315 sends the packet 335 to the MFE 325.

The processing of the received packet by the first edge MFE 325 is similar to the processing of the trace packet by the first edge MFE 210 in FIG. 2. That is, the first edge MFE 325 processes the packet and its forwarding table entries indicate to (i) encapsulate the packet with a logical context tag that specifies a destination logical port corresponding to the destination MAC address and (ii) further encapsulate the packet using tunnel encapsulation with an IP address for a port of the second MFE 330. Furthermore, the forwarding table entries also specify to send an observation message to a physical controller 315 that sent the packet to the MFE because a register bit at the MFE has been modified to identify the packet as associated with a trace operation. Thus, as shown by the encircled 4, the first MFE 325 sends both an observation 340 to the physical controller 315 and a packet 345 to the second MFE 330. In some embodiments, the MFE 325 sends more than one observation message to the physical controller 315 before sending the packet to the second MFE 330. In these embodiments, the first MFE 325 sends an observation message to the physical controller after performing a logical or physical forwarding operation in a set of logical and physical forwarding operations that the MFE 325 performs on the packet 335. The packet 345 is the same as the packet 335 in some embodiments, with the additional encapsulations mentioned above.

When the physical controller 315 receives the observation 340 from the first MFE 340, the physical controller 315 of some embodiments analyzes the observation and sends (as shown by the encircled 5) the analysis of the observation to the logical controller 310. The logical controller 310 receives the analysis of the observation and waits for more analyses to come from other physical controllers until a timeout is reached. In other embodiments, the physical controller 315 relays the observation message to the logical controller 310 and the logical controller 310 analyzes the observation.

The second MFE 330 receives the packet 345, which still includes the trace indicator, and is encapsulated with the destination logical port. The receiving MFE 330 reads this destination logical port and identifies (via its forwarding table entries) to deliver the packet to the VM associated with the destination logical port by performing a set of logical and physical forwarding operations on the packet 345. However, based on additional entries that (i) modify a register at the MFE to indicate the trace packet and (ii) read this register when delivering to the logical port, the MFE 330 instead drops the packet and sends an observation 350 (indicated by the encircled 6) to the physical controller 320. In some embodiments, the MFE 330 sends the observation to the physical controller 320 because the physical controller 320 manages the MFE 330.

In some embodiments, the MFE 330 sends multiple observations to the physical controller 320. Instead of only sending the observation for delivery to a destination (a physical forwarding operation), the MFE 330 sends an observation after performing each logical or physical forwarding operation in a set of logical and physical forwarding operations that the MFE 330 performs on the packet 345.

Like the physical controller 315, the physical controller 320 of some embodiments analyzes the received observation(s) and sends (as shown by the encircled 7) the analysis of the observation to the logical controller 310. In other embodiments, the physical controller 315 relays the observation message to the logical controller 310 and the logical controller 310 analyzes the observation. The logical controller 310 receives the observation(s) or the analysis of the observation(s) and waits for more analyses/observations to come from other physical controllers until a timeout is reached. Once the timeout is reached, the logical controller 310 generates a report for the requested tracing operation and sends (as shown by the encircled 8) the report to the user.

It is to be noted that the order between sending (shown by the encircled 5) the analysis of the observation by the physical controller 315 and the sending (shown by the encircled 6) of the observation by the MFE 330 may be arbitrary even though the encircled numbers are in sequence. This is because the observation 340 and the packet 345 may take different amounts of time to reach the physical controller 315 and the MFE 335, respectively. Also, the physical controller 315 and the MFE 335 may take different amounts of time to process the observation 340 and the packet 345, respectively.

Figure 4:
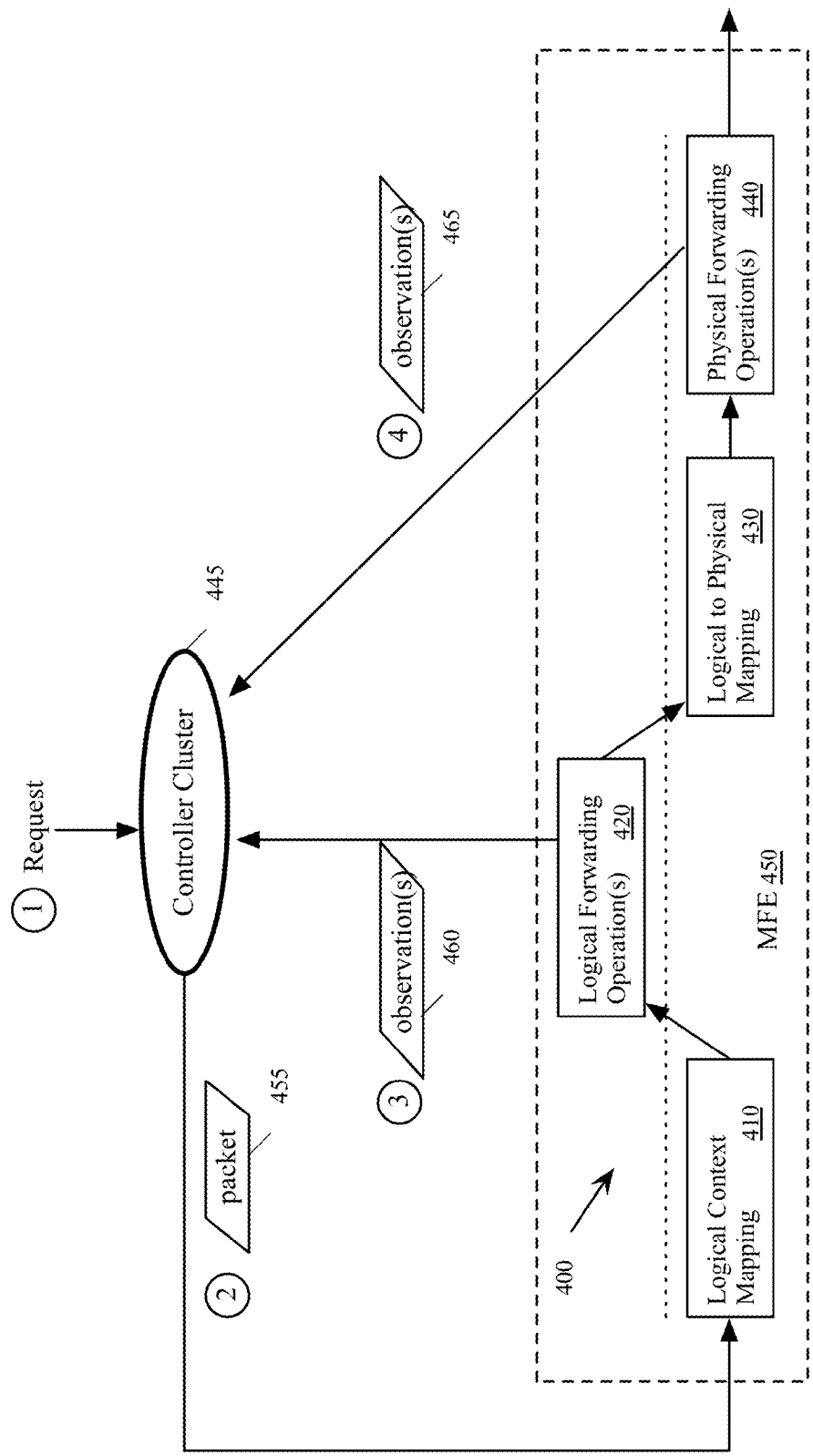
FIG. 4 conceptually illustrates that a MFE sends multiple observations to a controller cluster while processing a trace packet.

FIG. 4 conceptually illustrates an example of a MFE that sends multiple observations to a controller cluster while processing a trace packet. Specifically, this figure illustrates a processing pipeline 400 that a MFE performs on a packet in order to advance the packet through a logical network implemented across a set of MFEs. The processing pipeline 400 includes four stages 410-440 for processing a packet. In some embodiments, each MFE through which the packet passes performs the processing pipeline 400 (or a portion of the processing pipeline) when the MFE receives the packet. This figure also illustrates a controller cluster 445, a MFE 450, and various packets and observations with encircled numbers that indicate an order in which the packets and observations messages sent.

As shown by the encircled 1, the controller cluster 405 receives a request. In this case, the request specifies a source logical port that maps to a VM connected to the MFE 450 and a destination logical port that maps to a VM connected to another MFE. In response to the request, the controller 405 generates a packet 455 and sends (shown by the encircled 2) this to the MFE 450. The header of the packet 455 specifies the source and destination addresses received in the request, as well as a trace indicator that marks the packet as a test packet for a trace operation.

In some embodiments, the header of the packet includes a set of fields that contains information used for forwarding the packet through a network. Forwarding elements perform a set of forwarding operations based on the information contained in the header (and possibly registers for the packet stored by the forwarding element) and may, in some cases, modify some or all of the header fields. As explained above, some embodiments perform forwarding operations based on flow entries in the forwarding elements' forwarding tables.

In some embodiments, the processing pipeline 400 may be implemented by flow entries in the forwarding tables of the MFEs. For instance, some flow entries are defined such that the packet is processed against the flow entries based on various fields in the packet's header, including source and/or destination address, a logical context tag generated by a previous MFE, etc. In some embodiments, a controller cluster configures the MFEs to have such flow entries.

When the MFE 450 receives the packet 455, the MFE 450 stores a register bit indicating that the packet is marked for a trace operation. The MFE 450 then performs a logical context mapping on the packet to determine the logical context of the packet in the first stage 410 of the processing pipeline 400. In some embodiments, the first stage 410 is performed when a logical forwarding element receives the packet (e.g., the packet is initially received by the MFE 450 that implements the logical forwarding element).

In some embodiments, a logical context represents the state of the packet with respect to the logical forwarding element. For example, the logical context may specify the logical forwarding element to which the packet belongs, the logical port of the logical forwarding element through which the packet was received, the logical port of the logical forwarding element to which the packet is to be transmitted, the stage of the logical forwarding plane of the logical forwarding element the packet is at, etc.

In some embodiments, the first MFE to receive a packet determines the logical context by mapping a physical port of the MFE through which the packet was received and/or a source address (e.g., MAC address) of the packet to a logical port of a particular logical forwarding element. Other embodiments may use other fields in the header of the packet (e.g., a VLAN tag) in order to initially determine the logical context of the packet. At subsequent MFEs, the logical context may be determined based on a logical context tag placed in the packet header by a previous MFE.

After determining the logical context of the packet, the MFE of some embodiments stores this information in either the packet header itself or registers created for the packet at the MFE. For instance, the first MFE may store the logical input port in a register, then utilize this information for performing the logical forwarding operations 420, described below. After performing these operations, some embodiments identify a logical output port, which the MFE uses to encapsulate the packet with a logical context tag. Later MFEs can read this logical context to identify the logical output port of the packet and perform any necessary operations on the packet using this information.

In the second stage 420 of the processing pipeline 400, the MFE performs a set of logical forwarding operations on the packets to determine a logical port of the logical forwarding element to which the packet should be forwarded. In some embodiments, a packet may be sent through multiple connected logical forwarding elements (e.g., from one logical L2 switch to another logical L2 switch through a logical L3 router), and these operations may collectively be referred to as logical forwarding operations. Thus, in some embodiments, the logical forwarding operations may include a logical ingress ACL operation for determining access control when the logical forwarding element receives the packet, a logical L2 operation for determining where to forward the packet through a layer 2 network, and a logical egress ACL operation for determining access control before the logical forwarding element routes the packet out of the logical forwarding element. Alternatively, or in conjunction with the logical L2 operation, some embodiments of the logical forwarding operations include a logical L3 operation for determining where to route the packet through a layer three network.

In some embodiments, the MFE 450 sends (shown by the encircled 3) a set of observations for the set of logical forwarding operations 420. In some embodiments, the MFE 450 is configured (by the controller cluster 445) to send an observation to the controller cluster after performing each logical forwarding operation in the set of logical forwarding operations in the stage 420 when the packet is marked for the trace operation and/or a register bit is set indicating that the packet is for a trace operation. Because the packet 455 is marked for the tracing operation, the MFE 450 in this example sends an observation including the result of performing the logical forwarding operation. In some embodiments, the MFE 450 is configured to send observations only for some of the logical forwarding operations performed on the marked packet.

In some embodiments, the result of the logical forwarding operations may include dropping the packet, enqueuing the packet, forwarding the packet to one or more logical egress ports of the logical forwarding element, etc. In addition, many of the operations send the packet to a dispatch port of the MFE in order to resubmit the packet to the forwarding tables of the MFE that implement the logical forwarding elements.

Next, the third stage 430 of the processing pipeline 400 performs a mapping operation on the packet. In some embodiments, the mapping operation is a logical to physical mapping operation that maps the logical egress port of the logical forwarding element (a result of logical forwarding operations 420) to a physical result in the network. That is, the mapping operation determines one or more ports of one or more MFEs that correspond to the logical egress port of the logical forwarding element through which the packet is to be sent out. For instance, if the packet is a broadcast packet or a multicast packet, the third stage 430 of some embodiments determines the ports of the MFEs that correspond to the logical egress ports of the logical forwarding element through which the packet is to be sent out (i.e., the logical ports to which the intended recipients of the packet are coupled). If the packet is a unicast packet, the third stage 430 determines a port of a MFE that corresponds to the logical egress port of the logical forwarding element through which the packet is to be sent out (i.e., the logical port to which the intended recipient of the packet is coupled).

At the fourth stage 440 of the processing pipeline 400, a set of operations to implement physical forwarding of the packet is performed. The set of physical operations of some embodiments includes operations for sending the packet to the physical port(s) that corresponds to the logical egress port(s) of the packet, as determined in the third stage 430. For example, the set of physical operations of some embodiments determines one or more ports of the MFE on which the processing pipeline 400 is being performed through which to send the packet out in order for the packet to reach the physical port(s) determined in the third stage 430. This way, the MFEs can route the packet along the correct path in the network for the packet to reach the determined physical port(s) that corresponds to the packet destination.

In some embodiments, the MFE 450 sends (shown by the encircled 4) one or more observation messages 465 to the controller cluster for the set of physical operations performed at the fourth stage 440 when the register bit indicates that the packet is marked for the trace operation. In some embodiments, the MFE 450 is configured (by the controller cluster 445) to send observations for all of the physical forwarding operations. In other embodiments, the MFE 450 is configured to send observations only for some of the physical forwarding operations performed on the marked packet. For instance, the MFE of some embodiments sends observations when either of two actions is taken by the MFE: (1) the MFE sends the packet to another MFE via a tunnel, or (2) the MFE delivers the packet to a physical port to which the logical egress port is mapped.

As mentioned above, in some embodiments, the processing pipeline 400 is performed by each MFE in the managed network that is used to implement the logical network. In some embodiments, some of the MFEs perform only a portion of the processing pipeline 400. For example, in some embodiments, the MFE that initially receives the packet may perform the first-fourth stages 410-440 and the remaining MFEs that subsequently receive the packet only perform the first, third, and fourth stages 410, 430, and 440. The processing pipeline, including logical and physical forwarding operations, that each MFE performs to process an incoming packet is further described in the U.S. Publications 2013/0044636 and 2013/0058250, which are incorporated herein by reference.

The above description introduces the packet tracing operations of some embodiments. Several more detailed embodiments are described below. First, Section I describes the operation of a single network controller that performs a packet tracing operation to trace operations performed on a packet. Next, Section II describes the operation of several network controllers that facilitate packet tracing together. Section III then describes sending observations by a MFE for logical forwarding operations. Finally, Section IV describes an electronic system with which some embodiments of the invention are implemented.

I. Tracing by a Single Controller

A. Single Network Controller Operation

As indicated, in some embodiments a single controller generates a traceable packet according to a request received from a user and inserts this packet at a particular MFE. In order to generate such a packet, the network controller of some embodiments knows how the packet headers should appear when received at the MFE from a specified source port (i.e., what data should be in the packet headers). Thus, the network controller can generate a packet that mimics a packet actually received at the source port of the MFE.

Figure 5:
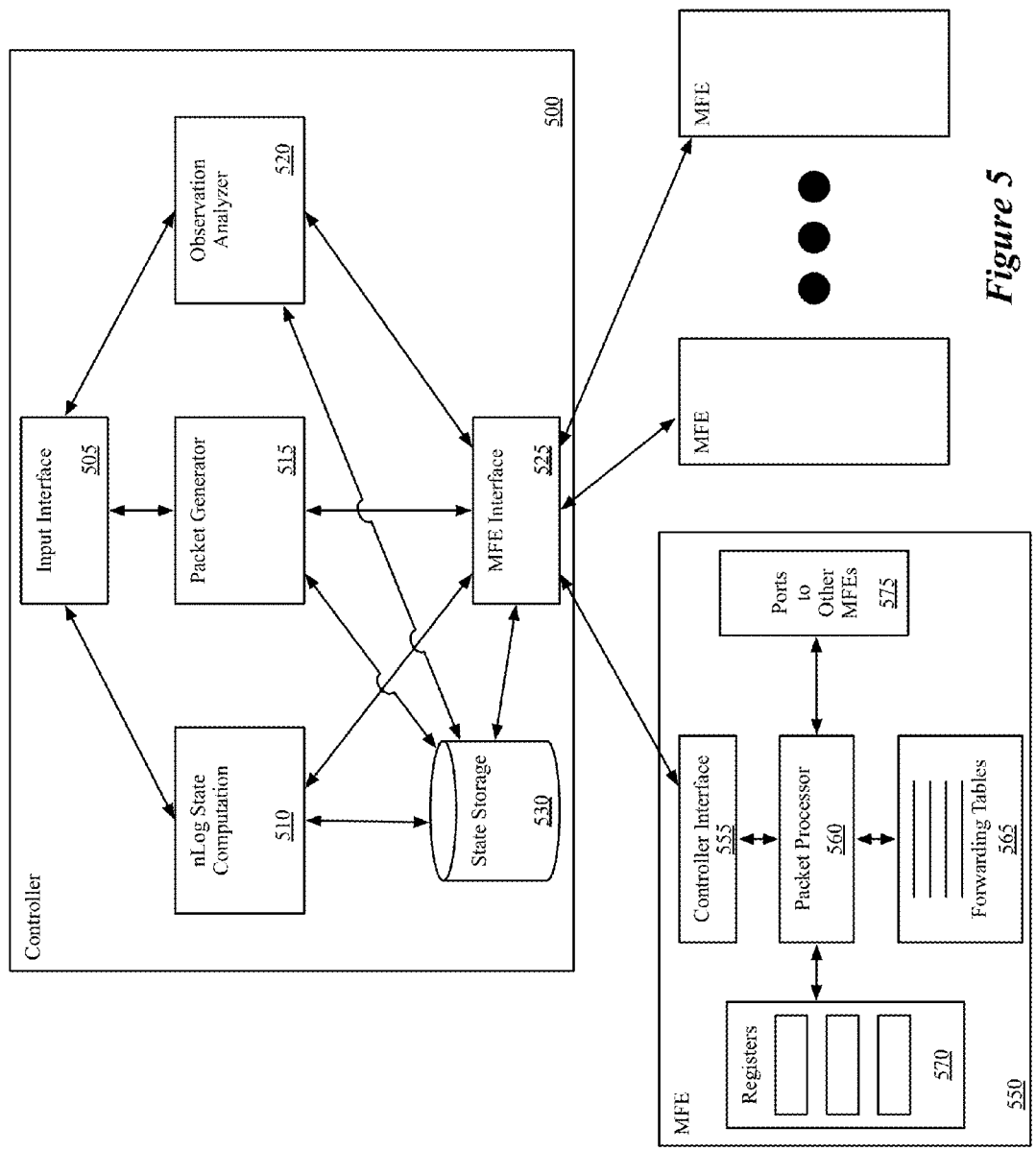
FIG. 5 conceptually illustrates a network controller with packet generation and tracing capability, as well as a MFE that analyzes and forwards packets and includes the capability to send observations for traceable packets to the controller.

FIG. 5 conceptually illustrates a network controller 500 with packet generation and tracing capability, as well as a MFE 550 that analyzes and forwards packets and includes the capability to send observations for traceable packets to the controller 500. As shown, the controller 500 includes an input interface 505, an nLog state computation module 510, a packet generator 515, an observation analyzer 520, and a MFE interface 525. In addition, the network controller 500 includes one or more state storage database 530, which in some embodiments stores input and/or output of the nLog state computation module 510.

The input interface 505 of some embodiments receives input from one or more users to define logical networks (e.g., sets of workloads (such as VMs) connected through logical switches, logical routers, middleboxes, gateways to external networks, etc.), as well as requests to trace packets sent through a logical switch on such a logical network. For example, a user could define a logical switch shown in FIG. 1, described above. In addition, with such a logical switch defined and implemented within the physical network managed by the network controller 500 (which includes the MFE 550), the user could request a packet tracing operation for a packet sent from one logical port of the logical switch 100 to another logical port of the logical switch.

In some embodiments, the request received at the input interface specifies the logical ports in terms of source and destination MAC addresses entered (or selected) by the user. In other embodiments, the user specifies a source logical port (e.g., in terms of a UUID used to represent the port) at which to insert the packet and a destination MAC address that is used in the packet itself (a source MAC address will be placed in the packet header as well, based on the specified logical port). In addition, the request may include additional parameters beyond the source and destination addresses. For instance, in some embodiments the user specifies a payload for the packet. When no payload is specified, the controller inserts a default payload for the packet. Users can also specify a frame size and/or ethertype for the traced packet. In some embodiments, the user can specify a timeout which specifies a duration (e.g., 100 ms, 1 s, 10 s, etc.) that the controller will wait for observations from the MFEs in the network.

In addition, instead of specifying a specific destination address corresponding to a single logical port on the logical switch, in some embodiments the user may wish to send a broadcast packet on the logical switch. In some embodiments, when the request does not include a destination address, or does not include a destination address that corresponds to a particular VM, the controller generates a traceable broadcast packet for insertion into the network at the specified source logical port. In other embodiments, the user is required to specify a destination address for each trace operation, and must affirmatively specify a broadcast destination in order to perform the trace on a broadcast packet.

When the input interface 505 receives a specification of a logical network, the interface of some embodiments translates this specification into logical control plane data that defines the logical network, and passes this data to the nLog state computation module 510. In some embodiments, the input interface 505 reads this logical control plane data into input tables of the state computation module 510. The nLog state computation module 510 of some embodiments includes a table mapping engine with a set of input tables and output tables, and maps records in the input tables to records in the output tables according to a set of rules. More specifically, some embodiments translate logical control plane data into logical forwarding plane data and subsequently translate the logical forwarding plane data into physical control plane data that can be passed down to the MFEs that implement the logical network. The nLog state computation module 510 of some embodiments is described in greater detail in U.S. Publication 2013/0058228, which is incorporated herein by reference.

In some embodiments, the physical control plane data for a particular specified logical network includes a set of flow entries used by the managed forwarding elements to implement the logical network. For instance, a flow entry for performing a logical forwarding decision might state that if a packet matches a specific logical switch (e.g., based on its source MAC address or ingress port) and the destination address is a particular MAC address, the packet should be forwarded to a particular logical port of the logical switch. An example of such a flow would state "If match L2 switch Q and destination MAC B→forward to logical egress port X". The physical control plane flow entries additionally include entries for identifying a physical port to which to send the packet and placing the packet in tunnels. To continue the above example, the physical control plane entries might include a flow stating "If logical egress=port X→encapsulate with remote tunnel information Z and send to physical port P".

The above control plane entries will be matched for packets that are sent over the network as part of normal network traffic or which are generated by the controller for a trace operation. However, some embodiments also include flow entries for the trace operation, which are passed to the MFEs as well. These entries basically specify that if the packet being sent over the tunnel (or delivered to a final destination) is a traced packet, then certain data should be copied to the registers and sent as an observation message to the controller. For example, using the above case, a flow entry might state "If sending packet with tunnel information Z and register bit J==1→copy MFE ID and tunnel information Z to registers and send register data with packet to controller". Similarly, for a delivery observation message, a flow entry might state "If sending packet to physical port R and register bit J==1→drop packet, copy MFE ID and physical port ID to register and send register data with packet to controller". These flow entries, like the other physical control plane data, are converted by the MFE into physical forwarding plane data in the forwarding tables of the MFE, as described below.

In some embodiments, the nLog state computation module 510 stores its output state in the state storage database(s) 530. This database 530 stores MAC address to logical port bindings, physical control plane data output by the nLog state computation module 510, and other data in some embodiments.

The operations of the nLog state computation module 510 may take place at a different time than the packet tracing operations. That is, in some embodiments the controller 500 initially generates (using the nLog state computation module 510) the flow entries for a logical network, both for the packet tracing operation and the general logical network functionality. While the flow entries may require updating as the network changes (i.e., due to the user adding or removing entities from the network, modifications to the physical network, etc.), the packet tracing operations performed by both the controller and the managed forwarding elements take place at conceptually a different time (i.e., in response to user requests, which may occur well after the generation and distribution of the flow entries by the controller 500).

The packet generator 415 receives requests to trace packets through the input interface 405. The packet generator 415, in some embodiments, receives the source and destination logical ports, payload specification, frame size, etc., and generates a packet with the appropriate headers and payload. In addition, the packet generator 515 appends an indicator in the packet that specifies to a MFE processing the packet that the packet is a traced packet. This signifies to the MFE (1) that it should send observations back to the controller when it performs specific logical or physical forwarding operations on the packet and (2) that it should drop the packet once it has made the decision to deliver the packet to its intended recipient at the destination address. In addition, some embodiments append an identifier for the issuing controller (i.e., the controller 500) as well as a trace operation session ID to differentiate between multiple packet tracing operations. Some embodiments append this data at the end of the payload. When appending the data to the end of the payload, the controller of some embodiments updates length and checksum fields of the packet to accommodate the appended data, so that the packet remains a valid IP packet. After generating the packet, the controller sends the packet to the appropriate MFE (that which connects to the source logical port) through the MFE interface 525.

The observation analyzer 520 receives observations about a traced packet sent by the MFEs to the network controller 500. In some embodiments, a MFE sends a set of observations to the controller by sending an observation whenever it performs one forwarding operation in a set of logical or physical forwarding operations to perform on a packet. In addition, when a MFE delivers a traced packet to its destination (or would deliver the packet, if it was not a traced packet generated by the network controller), the MFE sends an observation to the controller. These observations are received at the MFE interface 525 and sent to the observation analyzer 520. The structure of these observations is discussed in further detail below.

The observation analyzer 520 of some embodiments performs operations to deduce certain data from the received observations. For instance, for observations indicating that the packet was forwarded into a particular tunnel, the observation analyzer uses the mappings contained in the state storage 530 to identify the remote IP address to which the packet was sent. For observations indicating delivery to a logical port, the observation includes a physical port of the MFE through which the packet would be sent, which the observation analyzer 520 maps to the logical port using the data in the state storage 530.

In some embodiments, the observation analyzer generates a report for the traced packet. Some embodiments provide a summary report to the user through the input interface 505 that indicates whether the packet successfully reached its destination(s), to which destinations it was delivered, packet information specified in the request (source/destination addresses, frame size, timeout duration, etc.), the number of observations received, the number of times the packet was forwarded, and a time stamp that indicates when the traced packet was sent by the controller.

In addition, for each observation received, some embodiments include additional information for presentation to the user. This information may include whether the observation was sent for forwarding (into a tunnel) or delivery to a destination, information about the source and destination MFE for a particular tunnel, time duration from when the packet was sent by the controller to when the observation was received, remote IP address (for observations indicating that the packet was forwarded into a tunnel), and logical port to which the packet would have been delivered (for observations indicating delivery). The information may also include whether the logical forwarding element (e.g., a logical switch, a logical router, etc.) dropped or forwarded the packet in the logical network, the reason for the logical forwarding element's dropping the packet (e.g., by ingress or egress ACLs, etc.), the location of the packet within the logical network, etc.

As shown, the controller connects to one or more MFEs through its MFE interface 525. Through this interface, the controller (i) distributes physical control plane data to the MFEs, (ii) sends traced packets for insertion into the physical network at a particular MFE and (iii) receives observations regarding traced packets from the MFEs in the physical network. In some embodiments, the communications channel between the controller and the MFE for the purpose of the packet tracing operations is the same channel through which the physical control plane entries are pushed down to the MFE (e.g., using a particular communication protocol such as OpenFlow). In some embodiments, the communication through this interface is a TCP connection between the controller and a specific control port of the MFE (the interface 555, described below). Thus, IP reachability is required between the controller and the control port of the MFE. Some embodiments use a specific VLAN for control channel connectivity.

While the controller 500 connects to multiple MFEs, FIG. 5 displays additional detail regarding a particular one of the MFEs 550, which is illustrative of all of the MFEs in some embodiments. This MFE 550 may be an edge MFE which resides in a machine that hosts VMs, a pool node, etc. The MFE 550 includes a controller interface 555, a packet processor 560, a set of forwarding tables 565, a set of registers 570, and a set of ports 575 to other MFEs.

The controller interface 555 enables the MFE to communicate with the network controller 500. Through this interface, the MFE 550 receives physical control plane data that it converts (e.g., using a module not shown in this figure) into physical forwarding plane data that populates the forwarding tables 565. In addition, through the controller interface 555, the MFE 550 receives traced packets for processing and sends observation messages back to the controller.

The packet processor 460 receives packets (e.g., from the controller interface, from the ports 575) and processes the packets using the forwarding tables 565. The forwarding tables 565, in some embodiments, include entries for one or more unaffiliated logical networks that are virtualized over the physical network. Each entry includes a condition and a corresponding action to perform if the condition is matched, in some embodiments. For instance, a table entry might specify that if a particular bit is set to 1 in the packet (or in a register) and a packet is being sent through a tunnel, then send a particular observation message to the controller. Another example of a forwarding table entry is that if a packet is received from a particular physical port, then set a particular logical ingress port for the packet in a register.

The registers 570 are used by the packet processor 560 as a temporary storage when processing a packet (e.g., in memory). In some embodiments, the packet processor 560 uses one or more registers per packet, such that numerous registers may be created at a single time when numerous different packets are being processed. The temporary information may include an indication that a packet is for a tracing operation, a result of a logical or physical forwarding operation performed on the packet, logical context information that specifies information about the logical forwarding element through which a packet is logically sent, etc. In some embodiments, the forwarding table entries that cause the packet processor 560 to send an observation to controller 500 specify to write certain data to the registers 570 and then send a copy of the packet along with the register contents to the controller 500.

A more detailed description of a MFE of some embodiments can be found in U.S. Publication 2013/0058250, which is incorporated by reference above. One of ordinary skill in the art will recognize that both the network controller and the MFE of some embodiments includes various additional modules not shown in FIG. 5.

Figure 6:
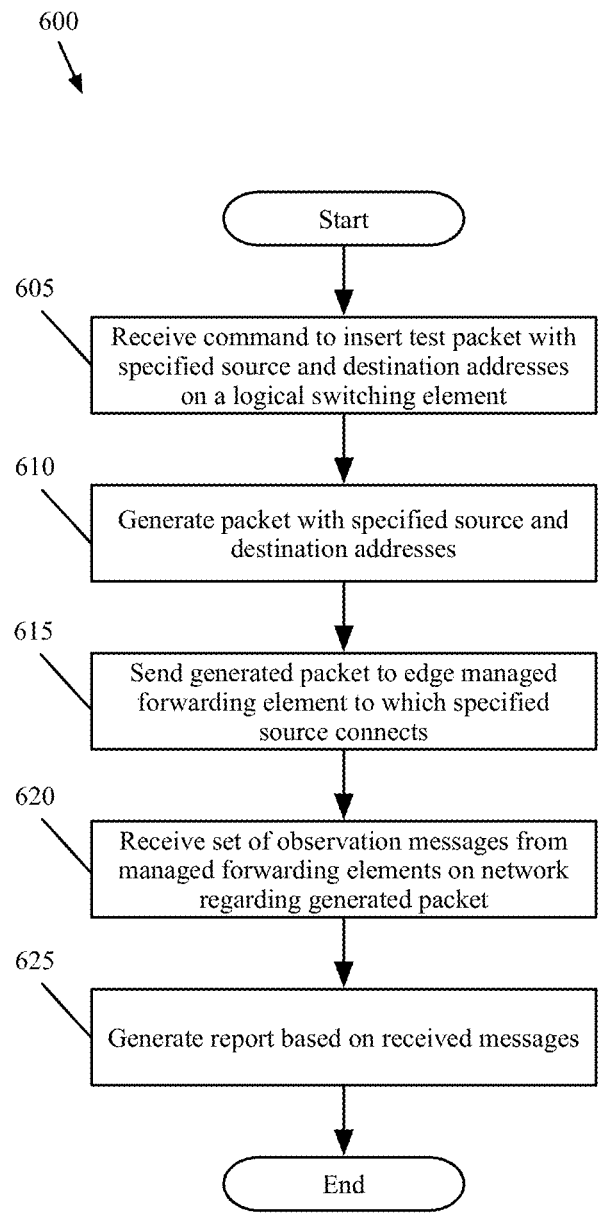
FIG. 6 conceptually illustrates a process performed by the network controller of some embodiments in order to execute a packet tracing operation.

FIG. 6 conceptually illustrates a process 600 performed by the network controller of some embodiments in order to execute a packet tracing operation. The process 600 is performed, in some embodiments, by a network controller such as that shown above in FIG. 5. As shown, the process 600 begins by receiving (at 605) a command to insert a test packet with specified source and destination addresses on a logical forwarding element into the physical network managed by the controller. In some embodiments, the controller requires that the source and destination addresses be connected to the same logical L2 switch (e.g., that they not be located on different L2 switches connected by a router). However, the source or destination address are not necessarily both VMs. For instance, the packet could be a broadcast packet, or could have as a source or destination a logical port that connects to an external network (e.g., via a gateway). As described above, the request may additionally include a timeout duration, a payload for the packet, or other parameters.

Next, the process 600 generates (at 610) a packet with the specified source and destination addresses. In some embodiments, these addresses are MAC addresses that represent VMs (more specifically, virtual interfaces (VIFs) of VMs), gateways that connect the logical switch to external networks, connections to a different logical switch in a different controller domain, etc. The controller logic has the ability to generate a packet that mimics packets arriving at a MFE from the source address with the destination address as the intended recipient. In addition, the controller stores an indicator in the packet (e.g., in the packet header) that denotes the packet as a traced packet. In some embodiments, the controller uses a specific bit in the logical VLAN portion of the header. Furthermore, some embodiments append to the end of the payload additional information regarding the packet tracing operation, such as a controller identifier that uniquely identifies the controller issuing the packet and a tracing operation identifier that uniquely identifies the particular trace operation issued by the controller.

The process then sends (at 615) the generated packet to the edge MFE associated with the source of the packet. In some embodiments, this binding information (of logical port to physical port of an MFE) is stored by the network controller along with the binding of MAC address to logical port. In some embodiments, a particular logical port (and thus source address) could reside on multiple MFEs. While a VM will be connected to one MFE, a gateway to an external network or a connection to a different logical switch domain might connect to several different MFEs (e.g., all of the pool nodes in the physical domain). In this case, some embodiments allow the user to specify to which particular physical MFE the packet will be sent. When the user does not specify one of the MFEs, the controller chooses one (e.g., randomly, from an ordered list, etc.) in some embodiments. When sending the packet to the edge MFE, in some embodiments the controller also accesses the registers (e.g., via a command over the communications channel with the MFE) associated with the packet on the MFE. The controller, in some embodiments, sets register values at the MFE that mimic those for a packet received from the specified source address. The behavior of the edge MFE (as well as the other MFEs that process the traced packet) will be described in greater detail below in sub-section I.B.

The process 600 next receives (at 620) a set of observation messages from MFEs in the physical network regarding the generated packet. As will be described in further detail below, the observation messages are sent to the network controller when an MFE performs a set of logical or physical forwarding operation. Some of the logical forwarding operations after which the MFE sends observation messages include a logical L2 ingress ACL operation, a logical L2 forwarding operation, a logical L2 egress ACL operation, a logical L3 ACL operation, a logical L3 routing operation, and a logical L3 egress ACL operation. For the physical forwarding operations, some embodiments send an observation message when either of two actions is taken by an MFE: (1) the MFE sends the packet to another MFE via a tunnel, or (2) the MFE delivers the packet to a logical port.

Different observations provide different information for the different operations performed by the MFE. For instance, when the packet is dropped as a result of performing a logical L2 ingress ACL, the observation includes some or all of the entries in the ACL, the security policy (e.g., port security) that was implemented by the ACL, the identity of the logical forwarding element to which the ACL belongs, etc. For forwarding via a tunnel, the observation includes an indicator of the MFE performing the action and a tunnel identifier in some embodiments. From this information the controller can determine a remote IP for the tunnel using the network state data that it stores. This may be the remote IP of a port at the destination MFE of the tunnel. In some embodiments, the tunnel may also end at an entity in an external network (e.g., if the logical port to which the packet is sent corresponds to a remote IP in an external network). For delivery to a logical port, the observation of some embodiments includes an indicator of the MFE performing the action and a physical port through which the packet would be delivered if it was not a traced packet. From this information, the controller can determine a logical port identifier (e.g., of a gateway, a VM, etc.) to which the packet is sent based on the mappings stored in its network state data.

Finally, the process 600 generates (at 625) a report based on the received observation messages, then ends. The report, in some embodiments, indicates whether the packet successfully reached its destination(s), to which destinations the packet was delivered, packet information specified in the request (source/destination addresses, frame size, timeout duration, etc.), the number of observations received, how many times the packet was forwarded, and a time stamp that indicates when the traced packet was sent by the controller.

In addition, for each observation received, some embodiments include additional information. This information may include whether the observation was sent for forwarding (into a tunnel) or delivery to a destination, information about the source and destination MFE for a particular tunnel, time duration from when the packet was sent by the controller to when the observation was received (which is useful for measuring the latency of the network), remote IP address (for observations indicating that the packet was forwarded into a tunnel), and logical port to which the packet would have been delivered (for observations indicating delivery).

B. MFE Operation

The above sub-section I.A. describes the behavior of the single network controller to perform a packet tracing operation, as well as the structure of the MFEs that send observations. As mentioned, the single network controller inserts a traceable packet into the network at a particular MFE and then receives observation messages from the MFEs through which the packet passes. The following section describes in further detail the operation of the MFEs to process the packets and generate the observation messages.

Figure 7:
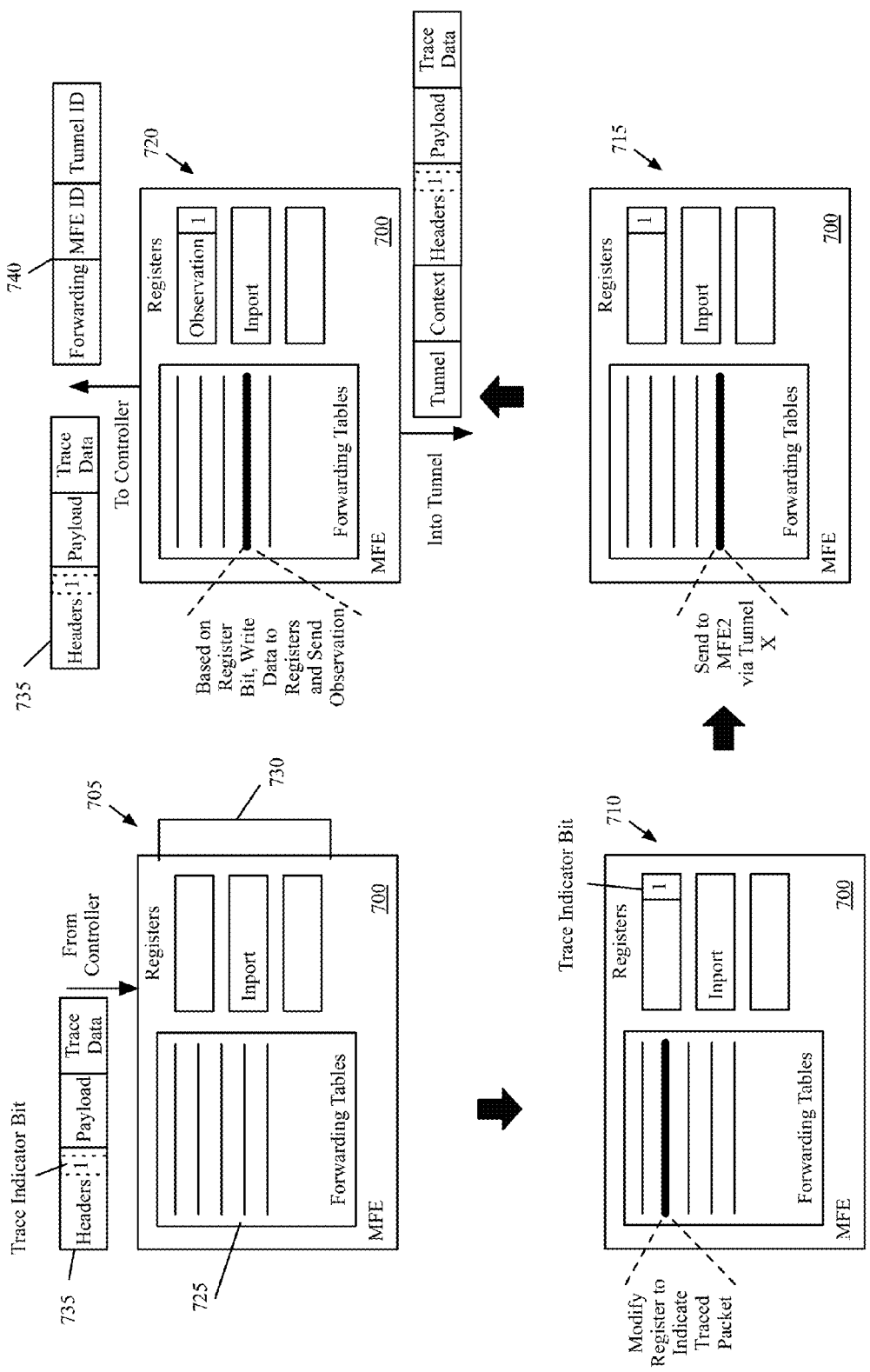
FIG. 7 conceptually illustrates the processing performed by a MFE that receives a packet from a network controller, processes the packet, sends the packet out over a tunnel, and sends an observation to the network controller.
Figure 8:
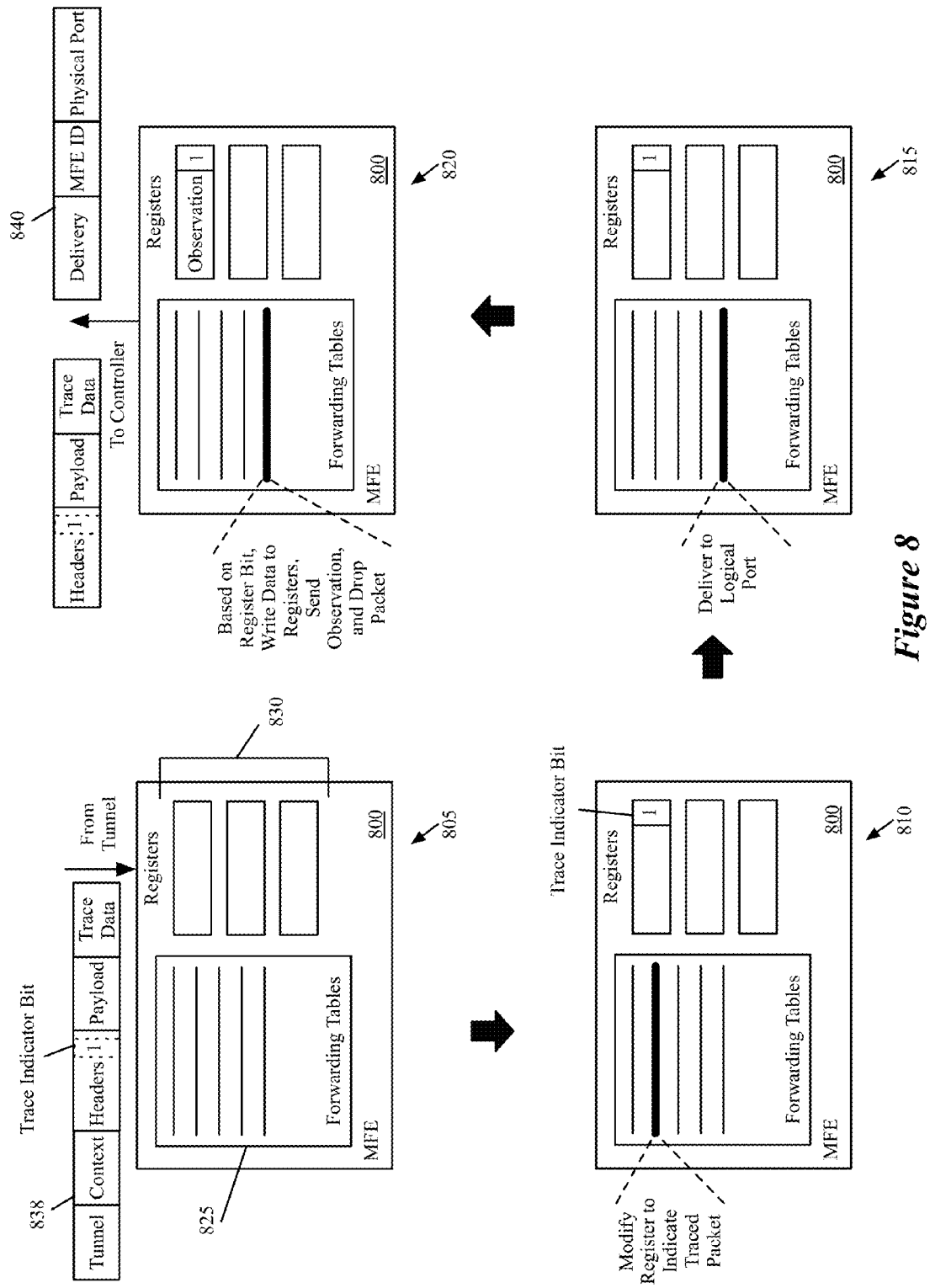
FIG. 8 conceptually illustrates the processing performed by a MFE that receives a packet from another MFE through a tunnel, processes the packet, identifies that the packet should be delivered to a logical port, and sends an observation to the network controller.

As mentioned above, an MFE of some embodiments performs one or more logical or physical forwarding operations and sends an observation messages after performing a logical or physical forwarding operation. The next two figures, FIGS. 7 and 8, illustrate a MFE that sends observation messages after performing physical forwarding operations. Section II will describe a MFE that sends observation messages after performing logical forwarding operations as well as physical forwarding operations.

FIG. 7 conceptually illustrates the processing performed by a MFE 700 that receives a packet from a network controller, processes the packet, sends the packet out over a tunnel, and sends an observation to the network controller. This figure illustrates the processing over four stages 705-720.

The MFE 700 of some embodiments may be a software forwarding element that runs on or within a hypervisor on a VM host in a virtualized environment. That is, in some embodiments the MFE 700 is one piece of software that runs in the same physical machine as VMs that connect to the physical network through the MFE 700. In some embodiments, the MFE 700 may be either a software or hardware forwarding element that operates on a dedicated box, separate from the machines hosting VMs. For instance, the pool nodes of some embodiments are dedicated boxes with software or hardware forwarding elements for performing the pool node functionality.

As shown at the first stage 705, the MFE 700 includes one or more forwarding tables 725 and one or more registers 730. The forwarding tables 725, in some embodiments, include forwarding entries pushed down to the MFE 700 from a network controller as physical control plane data and then converted into physical forwarding plane data by the MFE. The forwarding tables 725, in some embodiments, include entries for several unaffiliated logical networks that are virtualized over the physical network. For instance, if the machine on which the MFE 700 resides hosts VMs belonging to seven different logical networks, then the forwarding tables 725 include entries for these seven different networks, while maintaining isolation between the networks.

The registers 730 of the MFE 700 serve as temporary, quick-access storage for information while processing a packet. As described in detail in U.S. Publication 2013/0058250, which is incorporated by reference above, some embodiments resubmit a packet to the forwarding tables of the MFE several times in order to fully process the packet. During this processing, the MFE 700 uses the registers 730 to temporarily store information (e.g., logical context information, packet tracing information, etc.) about the packet. In addition, some embodiments send the contents of the registers to the controller as part of an observation message.

At the first stage 705, the MFE 700 receives a packet 735 directly from a network controller that manages the MFE. As described above, in some embodiments the network controller uses the same channel to send this packet as to send flow entries. In other embodiments, the packet is sent through a different channel. As shown, the packet 735 includes a payload and a set of headers. The payload may be specified by the user, or a default payload may be used. The headers include a source MAC address and a destination MAC address as specified by the user who requests the packet tracing operation, among other data, in some embodiments. Furthermore, as illustrated, the headers include a trace indicator bit that is set to "1" to indicate that the packet is a traced packet. In some embodiments, this bit is set within a logical VLAN field of the header. In addition, appended to the payload (either within the payload portion of the packet or after the payload portion), the packet 735 includes trace operation data. This trace operation data includes, in some embodiments, a controller ID that identifies the issuing controller as well as a trace operation session ID that identifies the particular trace operation that issued the packet. In some cases, multiple trace packets for multiple trace operations may be issued, and the trace data allows the controller to identify to which trace operation a particular observation applies.

Furthermore, along with the packet, the controller of some embodiments sends a command to set register information so as to mimic the receiving of the packet through a particular physical port associated with the source address. In the case of a packet for which the source is a VM, the register data simply indicates a physical port to which the VM connects. When the MFE actually receives a traffic (non-trace operation) packet from the VM through this physical port (e.g., virtual interface), the MFE sets this physical port in the register. Because the traced packet is not actually received through this physical port, the controller command sets the physical port in the register so that the MFE treats the packet using the same flow entries (i.e., so the same flow entries match the packet).

The "source" of the traced packet (as set by the user requesting the trace) might not be a VM, however. For example, the source could be a gateway that connects to an external network (e.g., an unmanaged network). In this case, the MFE 1300 to which the packet is sent would be an extender in some embodiments that contains a port facing the external network. However, whereas a physical port on an edge MFE only connects to a single VM in general, this port on the extender may face numerous external networks that connect to different logical networks, which correspond to different logical ports (potentially of different logical switches). Accordingly, some embodiments use different physical VLANs to bridge into different logical ports, and this VLAN data as well as the physical port will be set in the register for trace operation packets.

In other trace operations, the source might be a remote domain that connects to the local domain via a pool node via a particular tunnel with a specific interdomain context. For these operations, the controller of some embodiments sets in the registers for the packet both the physical port of the pool node over which packets from the particular tunnel are received and the interdomain context.

In some embodiments, the controller also sets one or more bits in the register to indicate that the packet is a trace packet received from the controller. VMs or other entities on the network sending packets to the MFE do not have access to the registers, so this prevents such entities from sending out their own trace packets. Without such a precaution, a VM could send numerous (e.g., thousands, millions, etc.) trace packets to the MFE as part of a denial of service attack on a controller, as these packets would spawn numerous observations sent to the controller.

The MFE 700 receives the packet 735 and begins processing the packet through its forwarding tables. As mentioned, the forwarding tables include numerous flow entries (e.g., on the order of hundreds or thousands of entries), which take the form of a match and corresponding action or set of actions. That is, if the packet matches a flow entry, the entry specifies one or more actions for the MFE to take. In addition, in some embodiments the flow entries have different priorities, such that if two or more entries are matched, the MFE performs the action or actions for the entry with the highest priority. As shown by the thicker line in the forwarding tables 725 in the second stage 710, at this stage a flow entry is matched that specifies to modify a particular bit in a particular register in order to indicate that the current packet is a traced packet. Thus, as shown, one of the registers 730 is modified to specify this trace indicator bit. In some embodiments, this entry has a high priority so that the first operation the MFE performs upon receiving a traced packet is to set this register bit. In some embodiments, this bit is set by the controller specifying register values and therefore this flow entry is not required.

In the third stage 715, a different flow entry is matched, as shown by the thicker line in the forwarding tables 725. This flow entry specifies to send the packet to a different MFE via a particular tunnel. Not shown in this diagram are several processing entries that would be matched in between the second and third stages 710 and 715. In some embodiments, to get to the point of sending the packet out via a tunnel, the MFE would have already identified the source address stored in the packet and/or physical inport entered in the register as correlating to a particular logical input port (and therefore a particular logical switch), performed logical L2 forwarding to identify a destination logical port that correlates to the packet's destination address (and updated or encapsulated the packet with a logical context that includes at least the destination logical port), and mapped that destination logical port to a physical destination.

For instance, if the trace packet specifies a source MAC A and a destination MAC B (both corresponding to VMs), and the physical port specified in the register is port P (which is the port of the MFE 700 to which the VM having MAC A connects), then the MFE first maps the physical port P to a logical port X on logical switching element Q. Because the logical switching element Q is then matched (e.g., with this information stored in a register), the MFE then maps the destination address B to a logical port Y on the logical switching element Q, and encapsulates the packet with the destination logical port Y. This logical port Y maps to a remote destination Z (e.g., a remote IP or a port of a different MFE). Based on this remote destination Z, the MFE determines to encapsulate the packet to be sent in a tunnel T.

At the fourth stage 720, the resubmitted packet matches a flow entry to write data to the registers for the packet and to send an observation to the controller based on (i) the trace indicator bit stored in the register and (ii) the decision to send the packet out through a tunnel. As shown, the MFE sends an observation message to the network controller from which it received the packet. In some embodiments, this observation message contains (i) the packet as received and (ii) the contents of the registers. As such, in some embodiments the flow entry that specifies to send the observation also specifies that the MFE first write certain data into the registers.

This data, which is then sent as part of observation message 740, includes (i) an indicator that the observation is a forwarding observation (i.e., that the traced packet is being sent into a tunnel), (ii) a MFE ID specifying that the MFE 700 is sending the observation, and (iii) a tunnel ID denoting the tunnel through which the packet is sent. Some embodiments also send a remote IP of the MFE at which the tunnel terminates, while in other embodiments the controller determines this data based on its stored network state information. One of ordinary skill in the art will recognize that different forwarding observations may include different information.

As indicated, the MFE 700 sends the packet 735 as received to the controller as part of the observation message in some embodiments. In other embodiments, the MFE sends to the controller the packet with the encapsulations that is sent to the MFE (described below). The controller, in some embodiments, only uses the packet to read the trace data stored in the packet (e.g., the controller ID and the trace operation session ID), and reads all other pertinent information from the register contents sent as the observation message.

Furthermore, the MFE 700 also sends out the packet 735 through the tunnel to another MFE (e.g., the destination MFE, a pool node that connects to a destination MFE, etc.), which is now further encapsulated. In addition to the previous headers, the packet is now encapsulated with a logical context (e.g., the destination logical port) and a tunnel encapsulation. In some embodiments, the MFE 700 also clears out the registers after processing the packet 735 (e.g., deletes the registers from memory).

The previous example illustrates an MFE processing a packet from a controller and sending a forwarding observation message. In the managed networks of some embodiments, MFEs also send observations when delivering traced packets to logical ports. FIG. 8 conceptually illustrates the processing performed by a MFE 800 that receives a packet from another MFE through a tunnel, processes the packet, identifies that the packet should be delivered to a logical port from the MFE, and sends an observation to the network controller. This figure illustrates the processing over four stages 805-820.

As with the MFE 700, the MFE 800 of some embodiments may be a software forwarding element that runs on or within a hypervisor on a VM host in a virtualized environment. In this case, the MFE operates within the same machine that hosts the destination VM for the processed packet. However, delivery observations can also be generated for the delivery of packets to external network gateways, logical routers, interconnects to a different logical switch managed by a different controller, or other entities that connect to a logical port of a logical switch.

As shown at the first stage 805, the MFE 800 includes one or more forwarding tables 825 and one or more registers 830. Like the forwarding tables of the MFE 700, the forwarding tables 825 of some embodiments include forwarding entries pushed down to the MFE 800 from a network controller as physical control plane data and then converted into physical forwarding plane data by the MFE. The forwarding tables 825, in some embodiments, include entries for several unaffiliated logical networks that are virtualized over the physical network. For instance, if the machine on which the MFE resides hosts VMs belonging to five different logical networks, then the forwarding tables 825 include entries for these five different networks, while maintaining isolation between the networks.

Like the registers of the MFE 700, the registers 830 serve as temporary, quick-access storage for information while processing a packet. Some embodiments resubmit a packet to the forwarding tables of the MFE (through a dispatch port) several times in order to fully process the packet. During this processing, the MFE 800 uses the registers 730 to temporarily store information (e.g., logical context information, packet tracing information, etc.) about the packet. In addition, some embodiments send the contents of the registers to the controller as part of an observation message.

At the first stage 805, the MFE 800 receives a packet 835 through a tunnel from a different MFE. The packet 835 is similar to the packet 735 after the fourth stage 720 of FIG. 7, in that the packet is encapsulated with a logical context and tunnel information. While the tunnel through which the packet is sent terminates at two MFEs, in between these two MFEs may be one or more unmanaged forwarding elements that make up a physical network over which packets are sent. In addition, like the packet of the previous figure, the packet 835 includes a payload and a set of headers. As illustrated, the headers include a trace indicator bit that is set to "1" to indicate that the packet is a traced packet. In some embodiments, this bit is set within a logical VLAN field of the header. While shown as a single bit, some embodiments use more than one bit in the logical VLAN field or a different location of the packet to indicate that a packet is traced. In addition, appended to the payload (either within the payload portion of the packet or after the payload portion), the packet 835 includes trace operation data. As described above for FIG. 7, this trace operation data includes, in some embodiments, a controller ID that identifies the issuing controller as well as a trace operation session ID that identifies the particular trace operation that issued the packet. Because this packet is received through a tunnel and not from a controller, no register data is set initially. Instead, the physical input port is identified (because the packet actually is received through a physical port as network traffic in this case) and stored in a register.

The MFE 800 receives the packet 835 and begins processing the packet through its forwarding tables. As mentioned, the forwarding tables include numerous flow entries (e.g., on the order of hundreds or thousands of entries), which take the form a match and corresponding action. As shown by the thicker line in the forwarding tables 825 in the second stage 810, at this stage a flow entry that is matched specifies to modify a particular bit in a particular register in order to indicate that the current packet is a traced packet. Thus, as shown, one of the registers 830 is modified to specify this trace indicator bit.

In the third stage 815, a different flow entry is matched, as shown by the thicker line in the forwarding tables 825. This flow entry specifies to deliver the packet to its destination logical port. Not shown in this diagram are several processing entries that would be matched in between the second and third stages 810 and 815. In some embodiments, to get to the point of delivering the packet to a logical port, the MFE would have already removed the tunnel encapsulation, read the logical context into a register, etc.

At the fourth stage 820, the resubmitted packet matches a flow entry to write data to the registers for the packet, send an observation to the controller based on (i) the trace indicator bit stored in the register and (ii) the decision made at the third stage 815 to deliver the packet to its destination logical port, and to drop the packet (i.e., not actually deliver the packet to the logical port). As shown, the MFE sends an observation message to the network controller that issued the packet (in some embodiments, all of the MFEs within a single domain are managed by one controller). In some embodiments, this observation message contains (i) the packet as generated by the controller (i.e., without the logical context and tunnel encapsulation) and (ii) the contents of the registers for the packet. As such, in some embodiments the flow entry that specifies to send the observation also specifies that the MFE first write certain data into the registers.

This data, which is then sent as part of the observation message 840, includes (i) an indicator that the observation is a delivery observation (i.e., that the traced packed would have been successfully delivered to a logical port if it was a real data packet), (ii) a MFE ID specifying that the MFE 800 is sending the observation, and (iii) a physical port ID denoting the port to which the packet would have been delivered. Some embodiments also send the destination logical port, while in other embodiments the controller determines this data based on its stored network state information.

As indicated, the MFE 800 sends the packet 835 to the controller as part of the observation message. In some embodiments, the MFE sends the packet without the encapsulations (i.e., just the original headers, payload, and trace operation data). In other embodiments, the MFE sends to the controller the packet with the encapsulations as received from the previous MFE. The controller, in some embodiments, only uses the packet to read the trace data stored in the packet (e.g., the controller ID and the trace operation session ID), and reads all other pertinent information from the register contents sent as the observation message. Furthermore, as noted, the MFE does not deliver the packet to its destination, because it is only a test packet. Because the packet is inserted at a first MFE and dropped by a second MFE, the test packets are never seen by the endpoints (e.g., the VMs), and thus do not affect the user workloads in any way.

C. Example Packet Tracing Operations

The above sub-sections I.A. and I.B. described in detail the operation of the network controllers and MFEs of some embodiments. This sub-section I.C. describes several example packet-tracing operations and the observations sent to the controller for these operations. In these examples, the packets are all delivered to their endpoint, in order to illustrate the full scope of observations sent for various examples. However, one of ordinary skill in the art will recognize that in the situations, for various different reasons (e.g., corrupted flow entries in the forwarding tables of one or more MFEs), the packets may not be fully delivered, in which case some of the observations may not be sent.

Figure 9:
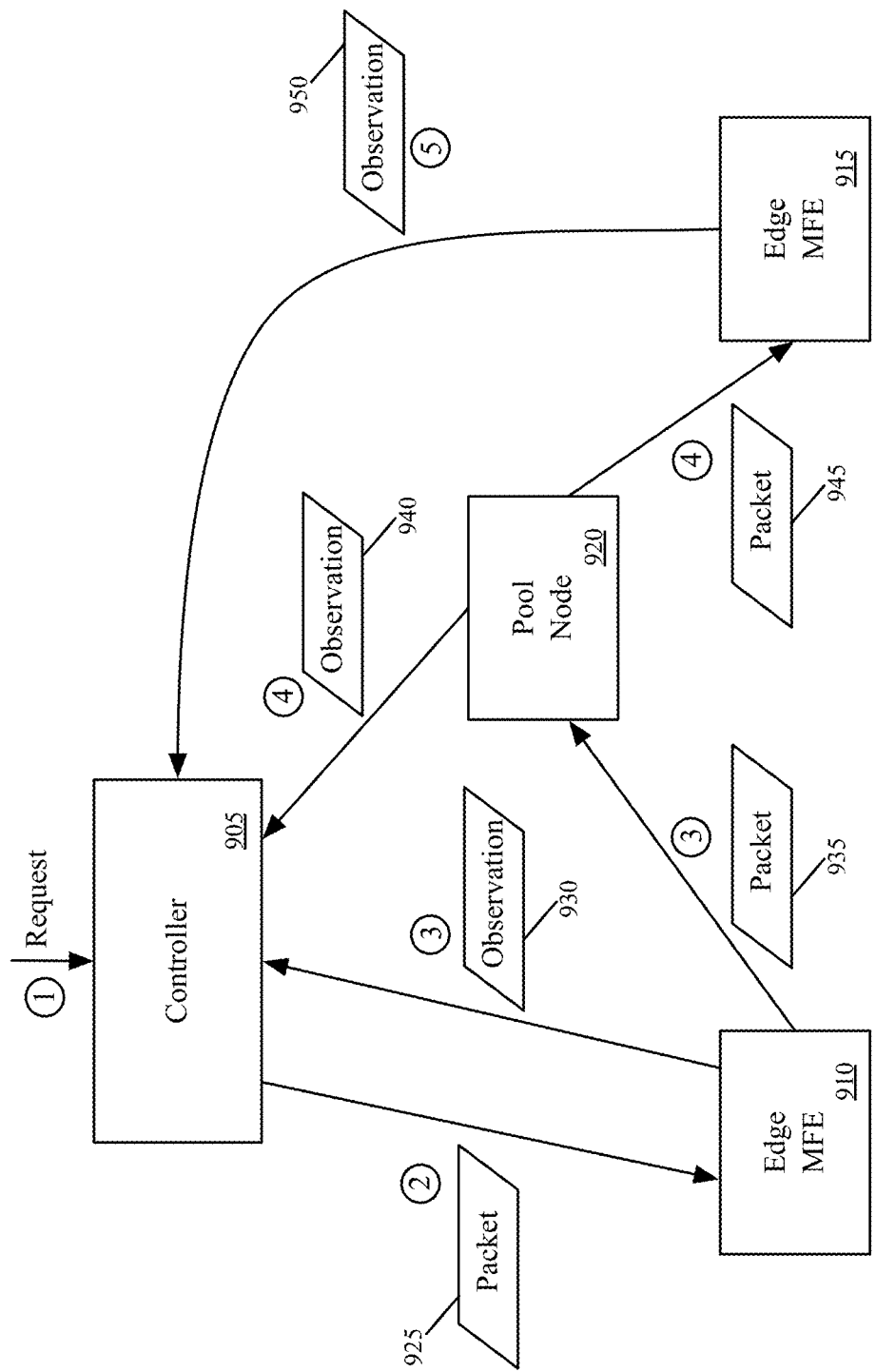
FIG. 9 conceptually illustrates an example for a traced packet that is sent through a pool node between the source MFE and destination MFE.

FIG. 9 conceptually illustrates an example for a traced packet that is generated and injected by the single network controller and then is sent through a pool node between the source MFE and destination MFE. As shown, this example illustrates a controller 905, a first edge MFE 910, a second edge MFE 915, and a pool node 920 (also an MFE). In addition, the example illustrates various packets and observations with encircled numbers to indicate an order in which the various data (packets, observation messages) are sent within the network.

As shown by the encircled 1, initially the controller 905 receives a request (e.g., as described above by reference to FIG. 5). In this case, the request specifies a source logical port that maps to a VM connected to the first MFE 910 and a destination logical port that maps to a VM connected to the second MFE 915. In response to the request, the controller 905 generates a packet 925 and sends this to the MFE 910 (shown by the encircled 2), along with a command to process the packet. The header of the packet 925 specifies the source and destination addresses received in the request, as well as a trace indicator that marks the packet as a test packet for a trace operation.

The first edge MFE 910 processes the packet (e.g., as shown above in FIG. 7), and its forwarding table entries in some embodiments indicate to forward the packet to the pool node 920. In some embodiments, this may be because the edge MFE 910 does not have a direct tunnel connection to the edge MFE 915. In this case, the edge MFE 910 (i) encapsulates the packet with a logical context tag that specifies a destination logical port corresponding to the destination MAC address and (ii) further encapsulates the packet using tunnel encapsulation with an IP address for a port of the pool node 920. Furthermore, the forwarding table entries also specify to send an observation message to the controller because a register bit at the MFE has been modified to identify the packet as associated with a trace operation. Thus, as shown by the encircled 3, the first MFE 910 sends both an observation 930 to the controller 905 and a packet 935 to the pool node 920. In some embodiments, this is a forwarding observation message that specifies the ID of the MFE 910 and the tunneling information between the edge MFE 910 and the pool node 920, as described above by reference to FIG. 7. The packet 935 is the same as the packet 935 in some embodiments, with the additional encapsulations mentioned above.

The pool node 920 of some embodiments receives the packet, sets a register bit based on the trace indicator stored in the packet, removes the tunnel encapsulation, and identifies that the destination logical port is located at the edge MFE 915. Thus, much like the edge MFE 910, the pool node encapsulates the packet in a tunnel (this time terminating at the edge MFE 915). As shown by the encircled 4, the pool node 920 sends both an observation 940 to the controller 905 and a packet 945 to the edge MFE 915. In some embodiments, like the observation 930, this is a forwarding observation message that specifies the ID of the pool node 920 and the tunneling information between the pool node 920 and the edge MFE 915, as described above by reference to FIG. 7. The packet 945 is the same as the packet 935 in some embodiments, with the different tunnel encapsulation.

The MFE 915 receives this packet 945, which still includes the trace indicator, and is encapsulated with the destination logical port. The receiving MFE 915 reads this destination logical port and identifies (via its forwarding table entries) to deliver the packet to the VM associated with the destination logical port. However, based on additional entries that (i) modify a register at the MFE to indicate the trace packet and (ii) read this register when delivering to the logical port, the MFE 915 instead drops the packet and sends an observation 950 (indicated by the encircled 5) to the controller 905. In some embodiments, this is a delivery observation message that specifies the ID of the MFE 915 and the port to which the packet would have been delivered, as described above by reference to FIG. 8.

Figure 10:
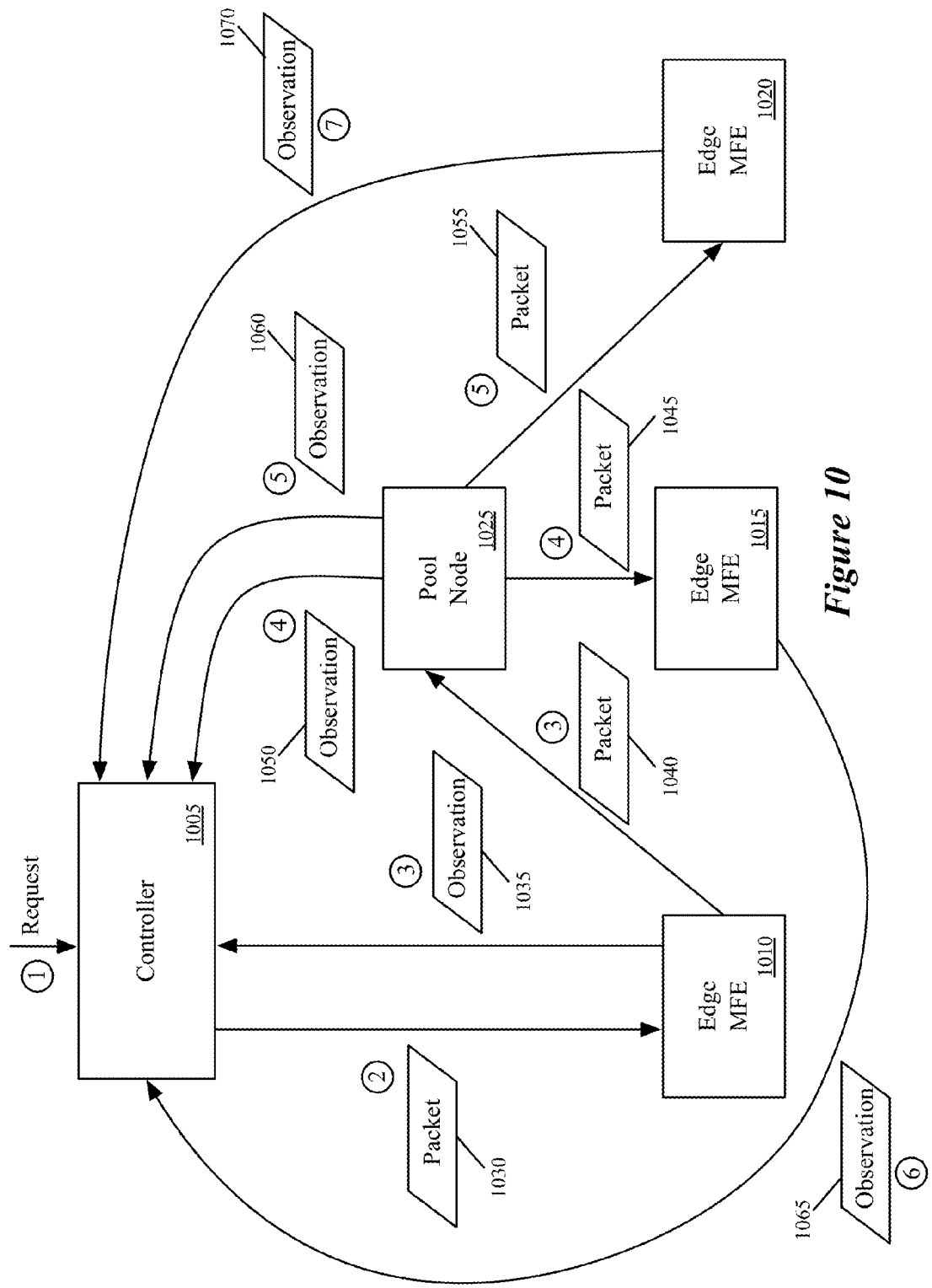
FIG. 10 conceptually illustrates a third example for a traced broadcast packet.

In the above example, the traced packet specifies a singular destination address. FIG. 10 conceptually illustrates an example for a traced broadcast packet. As shown, this example illustrates a controller 905, a first edge MFE 910, a second edge MFE 915, a third MFE 1020 and a pool node 1020 (also an MFE). In addition, as with the previous figure, the example illustrates various packets and observations with encircled numbers to indicate an order in which the various data (packets, observation messages) are sent within the network. In this case, the logical switch being examined has only three logical ports corresponding to three VMs, located at the hosts on which the three edge MFEs 1010-1020 operated.

As shown by the encircled 1, initially the controller 1005 receives a request (e.g., as described above by reference to FIG. 5). In this case, the request specifies a source logical port that maps to a VM connected to the first MFE 1010. In addition, rather than specifying a particular destination logical port, the request specifies to send a broadcast packet to the logical switch. In response to the request, the controller 1005 generates a broadcast packet 1030 and sends this to the MFE 1010 (shown by the encircled 2), along with a command to process the packet. The header of the packet 1030 specifies the source address and the broadcast destination received in the request, as well as a trace indicator that marks the packet as a test packet for a trace operation.

The first edge MFE 1010 processes the packet (e.g., as shown above in FIG. 7), and its forwarding table entries in some embodiments indicate to forward broadcast packets to the pool node 1025. Furthermore, the forwarding table entries also specify to send an observation message to the controller because a register bit at the MFE 1010 has been modified to identify the packet as associated with a trace operation. Thus, as shown by the encircled 3, the first MFE 1010 sends both an observation 1035 to the controller 1005 and a packet 1040 to the pool node 1025. In some embodiments, this is a forwarding observation message that specifies the ID of the MFE 1010 and the tunneling information between the edge MFE 1010 and the pool node 1025, as described above by reference to FIG. 7. The packet 1040 is the same as the packet 1040 in some embodiments, with the additional tunneling encapsulation mentioned above.

The pool node 1025 of some embodiments receives the packet, sets a register bit based on the trace indicator stored in the packet, removes the tunnel encapsulation, and identifies the packet as a broadcast packet. In some embodiments, the pool node 1025 converts the broadcast packet into a set of unicast packets with the different destinations of the MAC addresses connected to the logical switch (excluding the source address). For each of these unicast packets, the pool node 1025 (i) encapsulates the packet with a logical context tag specifying the destination logical port for the packet and (ii) further encapsulates the packet using tunnel encapsulation with an IP address for a port of the destination MFE at which the logical port is located. Thus, as shown by the encircled 4 and 5, the pool node sends (i) a packet 1045 to the edge MFE 1015 and a corresponding observation 1050 to the controller 1005, and (ii) a packet 1055 to the edge MFE 1020 and a corresponding observation 1060 to the controller 1005. Each of these observations is a forwarding observation indicating the respective tunneling data to the MFEs.

Each of the MFEs 1015 and 1020 receive their respective packets 1045 and 1055, which still include the trace indicator and are encapsulated with their respective destination logical ports. The receiving MFEs 1015 and 1020 read the destination logical ports and identify (via their forwarding table entries) to deliver their packets to the VMs associated with the destination logical ports. However, based on additional entries at each of the MFEs that (i) modify a register at the MFE to indicate the trace packet and (ii) read this register when delivering to the logical port, the MFEs 1015 and 1020 instead drop the packets and sends observations 1065 and 1070 (indicated by the encircled 6 and 7) to the controller 1005. In some embodiments, each of these are delivery observation messages that specify the ID of the MFE 1015 and 1020 respectively, and the ports to which the packets would have been delivered, as described above by reference to FIG. 8.

II. Tracing by Multiple Network Controllers

The above section described examples of tracing operation performed by a single network controller that generates and injects a trace packet and receives the observations from the MFEs to generate a report. This section describes examples of tracing operation performed by a controller cluster that includes several logical controllers and physical controllers. As mentioned above, the logical controllers of some embodiments generate trace packets and the physical controllers of some embodiments receive the observations from the MFEs that they manage.

A. Logical and Physical Controllers

Figure 11:
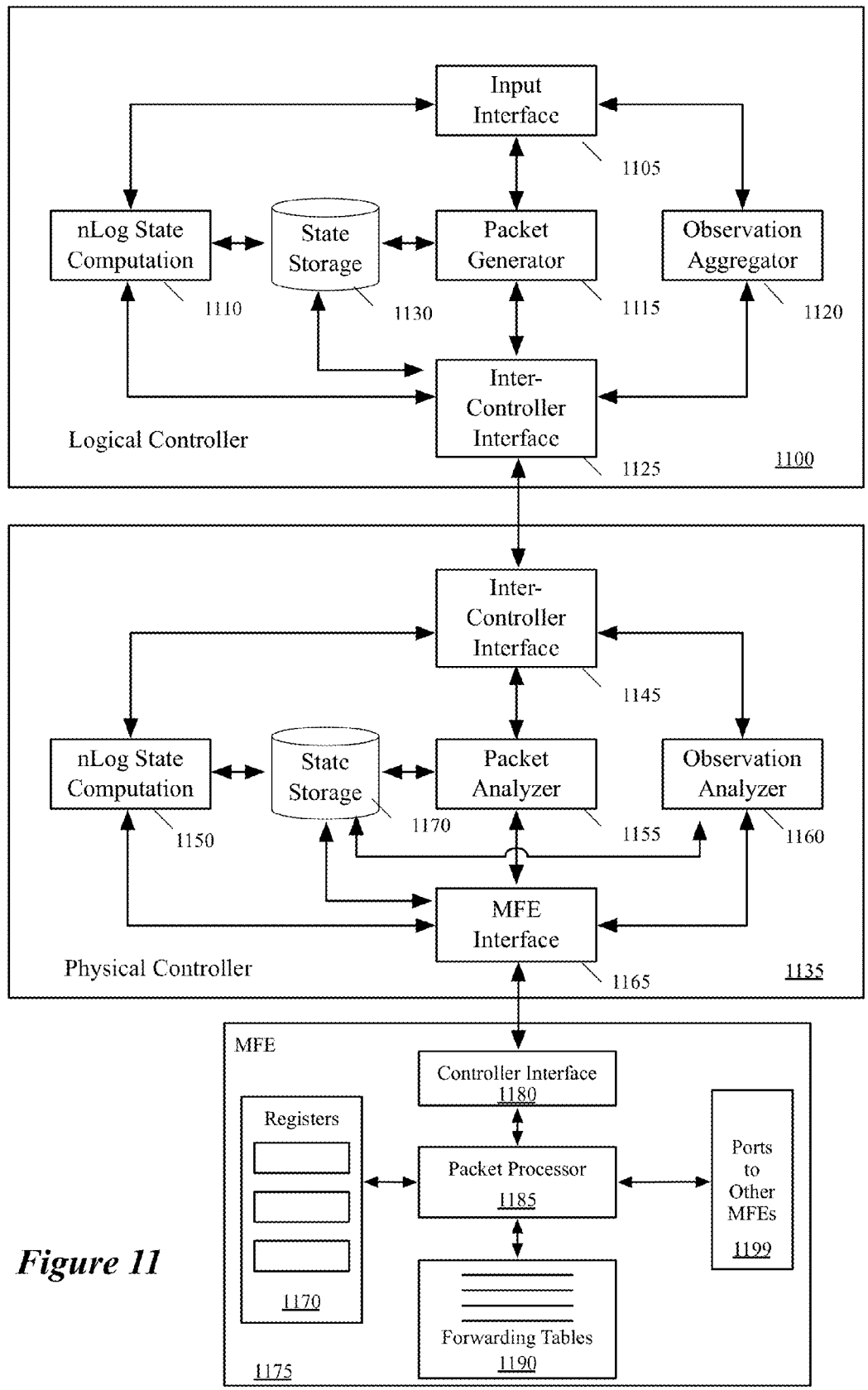
FIG. 11 conceptually illustrates a logical network controller, a physical network controller, and a MFE.

FIG. 11 conceptually illustrates a logical controller 1100 and a physical controller 1135 as well as a MFE 1175. The logical controller 1100 and the physical controller 1135 represent controllers in a controller cluster, such as the controller cluster 305 described above by reference to FIG. 3. As mentioned above, the network controllers in a controller cluster form a hierarchy. For a tracing operation, a logical controller is at the top of the hierarchy, receiving trace requests from the user and generating trace packets. A physical controller is below the logical controllers in the hierarchy, relays the trace packets from the logical controllers to the MFEs, and receives the observations from the MFEs that the physical controller manages.

As shown, the logical controller 1100 includes an input interface 1105, an nLog state computation module 1110, a packet generator 1115, an observation aggregator 1120, and an inter-controller interface 1125. In addition, the network controller 1100 includes one or more state storage databases 1130, which in some embodiments store input and/or output of the nLog state computation module 1110.

The input interface 1105 of some embodiments is similar to the input interface 505 of the single network controller 500 described above by reference to FIG. 5. The input interface 1105 receives input from one or more users to define logical networks as well as requests to trace packets sent through a set of logical switches and logical routers on such logical networks. For example, a user could define a logical switch shown in FIG. 1, described above, and a logical router shown in FIG. 20, that will be described further below. In addition, with such logical switches or routers defined and implemented within the physical network managed by a controller cluster (which includes a number of MFEs), the user could request a packet tracing operation for a packet sent from one logical port to another logical port (e.g., two logical ports on the same logical switch, one logical port of a first logical switch to another logical port of a second logical switch via a logical router, etc.).

In some embodiments, a request that the user specifies is the same regardless of whether the controller cluster includes a single controller or a hierarchy of controllers. Therefore, in these embodiments, the request received at the input interface 1105 specifies the same information as the request received at the input interface 500 specifies—e.g., a source logical port (as a MAC address, a port UUID, etc.), a destination address or port, and other information about the packet.

When the input interface 1105 receives a specification of a logical network, the interface of some embodiments translates this specification into logical control plane data that defines the logical network, and passes this data to the nLog state computation module 1110. In some embodiments, the input interface 1105 reads this logical control plane data into input tables of the state computation module 1110. The nLog state computation module 1110 of some embodiments includes a table mapping engine with a set of input tables and output tables, and maps records in the input tables to records in the output tables according to a set of rules. More specifically, some embodiments translate logical control plane data into logical forwarding plane data and subsequently translate the logical forwarding plane data into physical control plane data that can be passed down to the MFEs that implement the logical network.

In some embodiments, the logical controller does not directly send the physical control plane data to the MFEs.

Rather, the logical controller propagates the physical control plane data to a set of physical controllers, each of which manages one or more of the MFEs that implement the logical network. In some embodiments, the logical controller translates the logical forwarding plane data into universal physical control plane data to propagate to a set of physical controllers. In some of these embodiments, the physical controllers customize the universal physical control plane data into customized physical control plane data before sending them to the MFEs that implement the logical network. The translation from logical control plane data to logical forwarding plane data and then to universal physical control plane data is described in U.S. Publication 2013/0103817, which is incorporated above.

As mentioned above, some embodiments include flow entries for the trace operation, which are passed to the MFEs. For instance, these entries specify that if the packet being allowed to access the logical switch is a traced packet, then certain data should be copied to the registers and sent as an observation message to the controller. More specifically, a flow entry might state "If the packet is allowed to access the logical switch through a logical ingress port and register bit J==1→copy MFE ID and the ingress ACL entries to registers and send register data with packet to controller". Similarly, a flow entry might state "If the packet is disallowed to exit the logical switch through a logical egress port and register bit J==1→copy MFE ID and the egress ACL entries to register and send register data with packet to controller". These flow entries, like the other physical control plane data, are converted by the MFE into physical forwarding plane data in the forwarding tables of the MFE, as described below.

In some embodiments, the nLog state computation module 1110 stores its output state in the state storage database(s) 1130. This database 1130 stores MAC address to logical port bindings, physical control plane data output by the nLog state computation module 1110, and other data in some embodiments. The operations of the nLog state computation module 1110 may take place at a different time than the packet tracing operations.

The packet generator 1115 receives requests to trace packets through the input interface 1105. The packet generator 1115, in some embodiments, receives the source and destination logical ports, payload specification, frame size, etc., and generates a packet with the appropriate headers and payload. In addition, the packet generator 1115 appends an indicator in the packet that specifies to a MFE processing the packet that the packet is a traced packet. This signifies to the MFE (1) that it should send observations back to the controller when it performs specific logical or physical forwarding operations on the packet and (2) that it should drop the packet once it has made the decision to deliver the packet to its intended recipient at the destination address. In addition, some embodiments append an identifier for the issuing controller (i.e., the logical controller 1100) as well as a trace operation session ID to differentiate between multiple packet tracing operations. Some embodiments append this data at the end of the payload. After generating the packet, the controller sends the packet to a physical controller that manages the appropriate MFE (that which connects to the source logical port) through the inter-controller interface 1125.

The observation aggregator 1120 receives analyses of observations about a traced packet. In some embodiments, the analyses of observations come from the physical controllers that manage the MFEs that send the observations to the physical controllers. In some embodiments, a MFE sends a set of observations to a physical controller that manages the MFE by sending an observation whenever it performs a logical or physical forwarding operation on the traced packet. The analyses of observations are received at the inter-controller interface 1125 and sent to the observation aggregate 1120.

In some embodiments, the analyses of observations are certain data deduced from the observations by the controllers that receive the observations from the MFEs. The observation aggregator 1120 aggregates these analyses of the observations and uses them to generate a report on the requested trace operation. Performing analyses on the observations by the physical controllers will be described further below.

In some embodiments, it is the logical controller that performs analyses on the observations. In these embodiments, the physical controllers receiving the observations do not perform the analyses on the observations and just relay the observations to the logical controller that generated the traced packet. The logical controller then performs the analyses on the observations and generates a report for the traced packet.

In some embodiments, the observation aggregator 1120 generates a report for the traced packet. Some embodiments provide a summary report to the user through the input interface 1105 that indicates whether the packet successfully reached its destination(s), to which destinations it was delivered, packet information specified in the request (source/destination addresses, frame size, timeout duration, etc.), the number of observations received, the number of times the packet was forwarded, and a time stamp that indicates when the traced packet was sent by the controller.

The logical controller 1100 connects to one or more physical controllers through its inter-controller interface 1125. Through this interface, the logical controller sends traced packets to the physical controllers and receives the analyses of the observations from the physical controllers. In addition, the logical controller exchanges other data with physical controllers. For instance, the logical controller sends the physical control plane data or the universal control plane data to the physical controllers. In some embodiments, the communication channels between the logical controller 1100 and the physical controllers are remote procedure call (RPC) channels, used for the exchange of network state data (e.g., the physical control plane data), the packets generated by the logical controller, and the observation analysis sent to the logical controller.

As shown in the middle portion of FIG. 11, the physical controller 1135 includes an inter-controller interface 1145, an nLog state computation module 1150, a packet analyzer 1155, an observation analyzer 1160, and a MFE interface 1165. In addition, the physical controller 1135 includes one or more state storage database 1170, which in some embodiments stores input and/or output of the nLog state computation module 1110.

The inter-controller interface 1145 facilitates data exchange between the physical controller 1135 and other logical and physical controllers. In particular, the inter-controller interface 1145 receives trace packets from one or more logical controllers. Also, the inter-controller interface 1156 receives universal physical control plane data or physical control plane data from the logical controllers. As mentioned above, the communication channels between the physical controller 1135 and other controllers are RPC channels in some embodiments.

The packet analyzer 1155 receives trace packets from the inter-controller interface 1145. When the packet analyzer 1155 receives a trace packet, the packet analyzer identifies the MFE at which to inject the trace packet. In some embodiments, the packet analyzer 1155 first identifies the source logical port of the packet and looks up the mappings between the logical ports and physical ports in the network state data stored in the state storage 1170. The packet analyzer then finds an MFE that has the physical port to which the source logical port of the packet is mapped, which should be one of the MFEs that it manages (as otherwise the logical controller would not have sent the packet to the particular physical controller). In some embodiments, the communication with the trace packet from the logical controller specifies a particular MFE at which to inject the packet. The physical controller 1135 sends the packet to the appropriate MFE through the MFE interface 1165.

The observation analyzer 1160 receives observations about a traced packet sent by the MFEs to the physical controller 1135. In some embodiments, a MFE sends a set of observations to the physical controller that manages this MFE whenever the MFE performs a logical or physical forwarding operation on a trace packet. In addition, when a MFE delivers a traced packet to its destination (or would deliver the packet, if it was not a traced packet injected to the MFE by the physical controller), the MFE sends an observation to the physical controller. These observations are received at the MFE interface 1165 and sent to the observation analyzer 1160.

The observation analyzer 1160 of some embodiments performs operations to deduce certain data from the received observations. For observations containing the results of performing logical forwarding operations (e.g., a logical L2 ingress ACL operation), the observation analyzer 1160 of some embodiments extracts relevant information out of the observation or reformats the information so that the logical controller can generate a report by aggregating the information. The observation analyzer 1160 sends the deduced data to the logical controller that generated the trace packet, through the inter-controller interface 1145.

When the inter-controller interface 1145 receives physical control plane data, the interface passes this data to the nLog state computation module 1150. In some embodiments, the input interface 1150 reads this data into input tables of the state computation module 1150. The nLog state computation module 1150 of some embodiments includes a table mapping engine with a set of input tables and output tables, and maps records in the input tables to records in the output tables according to a set of rules. More specifically, some embodiments identify the MFEs to which to send the physical control plane data to so that the MFEs can further translate the physical control plane data into physical forwarding plane data to implement the logical network.

When the inter-controller interface 1145 receives universal physical control plane data, the interface reads this data into input tables of the state computation module 1150. The nLog state computation module 1150 translates universal physical control plane data into customized physical control plane data that can be passed down to the MFEs that implement the logical network. In other embodiments, the universal physical control plane data is passed to all of the MFEs that are connected to the physical controller 1135 without being processed by the nLog state computation module 1150. The MFEs, rather than the physical controllers, perform the translation of the universal physical control plane data into customized physical control plane data and then into physical forwarding data.

In some embodiments, the nLog state computation module 1150 stores its output state in the state storage database(s) 1170. This database 1170 stores MAC address to logical port bindings, logical port to physical port bindings, physical control plane data, and other data in some embodiments. The operations of the nLog state computation module 1150 may take place at a different time than the packet tracing operations. That is, a user may initially set up a logical network, which requires operations by both the nLog state computation module 1110 of the logical controller 1100 and the nLog state computation module 1150 of the physical controller 1135 in order to generate flow entries for implementing the logical network within a set of MFEs. At a later time, this user could initiate a packet tracing operation within the network in order to test various aspects of the logical network.

In some embodiments, the physical controller 1135 connects to one or more MFEs through its MFE interface 1165. Through this interface, the controller (i) distributes physical control plane data to the MFEs, (ii) sends traced packets for insertion into the physical network at a particular MFE and (iii) receives observations regarding traced packets from the MFEs in the physical network. In some embodiments, the communications channel between the controller and the MFE for the purpose of the packet tracing operations is the same channel through which the physical control plane entries are pushed down to the MFE (e.g., using a particular communication protocol such as OpenFlow). In some embodiments, the communication through this interface is a TCP connection between the controller and a specific control port of the MFE. Thus, IP reachability is required between the controller and the control port of the MFE. Some embodiments use a specific VLAN for control channel connectivity.

While the physical controller 1135 may communicate with one or more MFEs, FIG. 11 displays additional detail regarding a particular one of the MFEs 1175, which is illustrative of all of the MFEs in some embodiments. This MFE 1175 may be an edge MFE which resides in a machine that hosts VMs, a pool node, etc. The MFE 1175 includes a controller interface 1180, a packet processor 1185, a set of forwarding tables 1190, a set of registers 1195, and a set of ports 1199 to other MFEs.

The controller interface 1180 enables the MFE to communicate with a physical controller. Through this interface, the MFE 1175 receives universal physical control plane data or customized physical control plane data that it converts (e.g., using a module not shown in this figure) into physical forwarding plane data that populates the forwarding tables 1190. In some embodiments, the MFE 1175 receives universal physical control plane data and converts it into customized physical control plane data using an nLog state computation module located at the MFE. This customized physical control plane data is then converted into physical forwarding plane data by the MFE. The physical forwarding plane data implements the logical forwarding operations as well as physical forwarding operations, in some embodiments. In addition, through the controller interface 1180, the MFE 1175 receives traced packets for processing and sends observation messages back to the controller.

The packet processor 1185 receives packets (e.g., from the controller interface, from the ports 1175) and processes the packets using the forwarding tables 1190. The forwarding tables 1190, in some embodiments, include entries for one or more unaffiliated logical networks that are virtualized over the physical network. Each entry includes a condition and a corresponding set of actions to perform if the condition is matched.

The registers 1195 are used by the packet processor 1185 as a temporary storage when processing a packet (e.g., in memory). In some embodiments, the packet processor 1185 uses one or more registers per packet, such that numerous registers may be created at a single time when numerous different packets are being processed. The temporary information may include an indication that a packet is for a tracing operation, result of a logical or physical forwarding operation performed on the packet, logical context information that specifies information about the logical forwarding element through which a packet is logically sent, etc. In some embodiments, the forwarding table entries that cause the packet processor 1185 to send an observation to a physical controller specify to write certain data to the registers 1195 and then send a copy of the packet along with the register contents to the physical controller that manages the MFE 1175.

Figure 12:
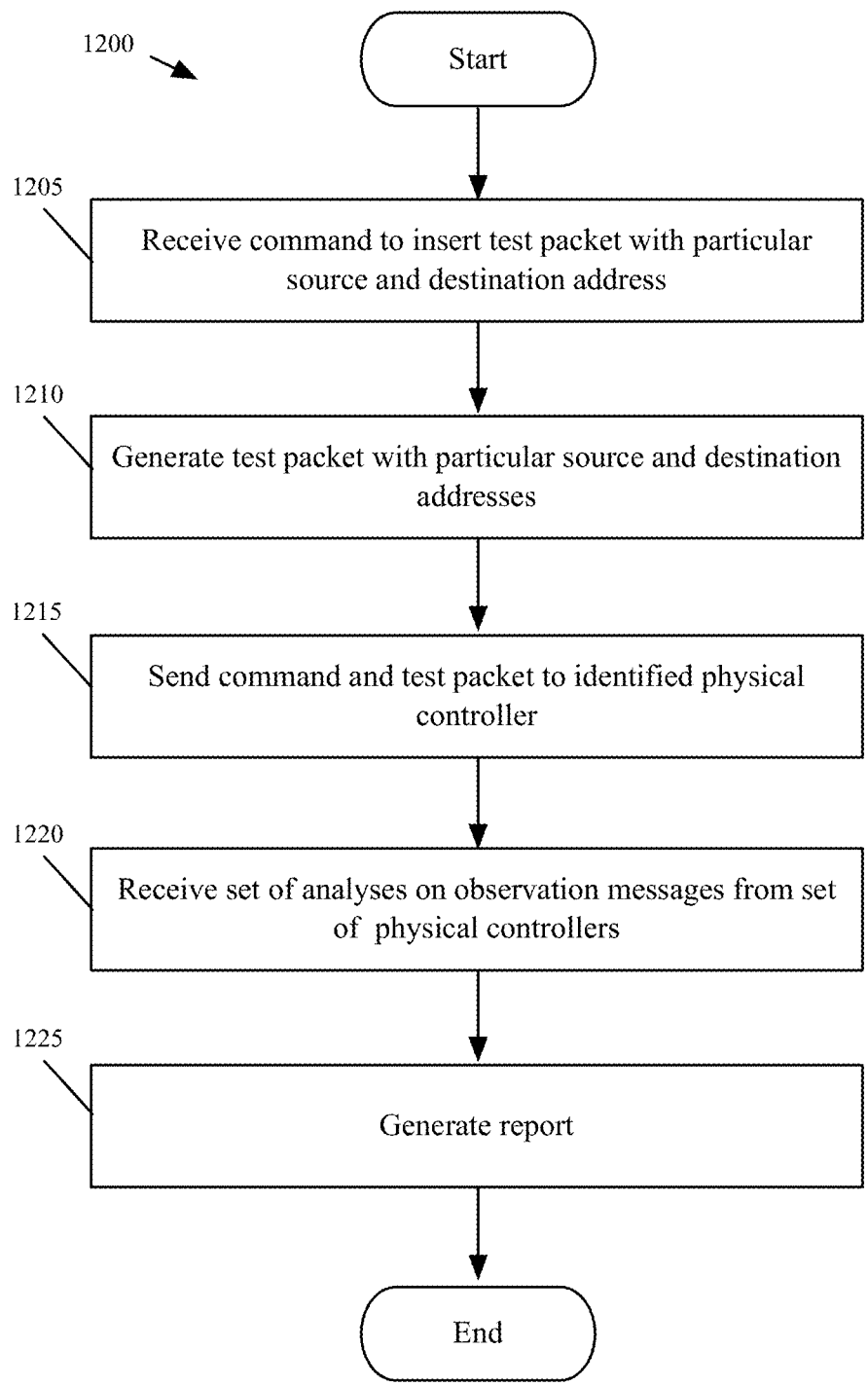
FIG. 12 conceptually illustrates a process performed by a logical network controller of some embodiments in order to execute a packet tracing operation.

FIG. 12 conceptually illustrates a process 1200 performed by a logical controller of some embodiments in order to execute a packet tracing operation. The process 1200 is performed, in some embodiments, by a logical controller such as that shown above in FIG. 11. As shown, the process 1200 begins by receiving (at 1205) a command to insert a test packet with specified source and destination addresses on a set of logical forwarding elements (e.g., logical switches and logical routers) into the physical network implementing the logical forwarding elements. The source or destination address are not necessarily both VMs. For instance, the packet could be a broadcast packet, or could have as a source or destination a logical port that connects to an external network (e.g., via a gateway). As described above, the request may additionally include a timeout duration, a payload for the packet, or other parameters.

Next, the process 1200 generates (at 1210) a packet with the specified source and destination addresses. In some embodiments, these addresses are MAC addresses that represent VMs (more specifically, VIFs of VMs) on the same logical switch or on different logical switches, gateways that connect the logical switch to external networks, connections on one logical switch to a different logical switch or to a logical router, etc. The controller logic has the ability to generate a packet that mimics packets arriving at a MFE from the source address with the destination address as the intended recipient. In addition, the logical controller stores an indicator in the packet (e.g., in the packet header) that denotes the packet as a traced packet. In some embodiments, the logical controller uses a specific bit in the logical VLAN portion of the header. Furthermore, some embodiments append to the end of the payload additional information regarding the packet tracing operation, such as a controller identifier that uniquely identifies the logical controller issuing the packet and a tracing operation identifier that uniquely identifies the particular trace operation issued by the logical controller.

The process then sends (at 1215) the generated packet to a physical controller that manages the edge MFE associated with the source of the packet. In some embodiments, this binding information (of logical port to physical port of an MFE) is stored by the logical controller along with the binding of MAC address to logical port. The logical controller also stores a list of a mapping of MFEs to their managing physical controller. The physical controller subsequently injects the packet into the MFE associated with the source of the packet.

In some embodiments, a particular logical port (and thus source address) could reside on multiple MFEs. While a VM will be connected to one MFE, a gateway to an external network or a connection to a different logical switch domain might connect to several different MFEs (e.g., all of the pool nodes in the physical domain). In this case, some embodiments allow the user to specify to which particular physical MFE the packet will be sent. When the user does not specify one of the MFEs, the controller chooses one (e.g., randomly, from an ordered list, etc.) in some embodiments.

The process 1200 next receives (at 1220) a set of analyses of observation messages from a set of physical controllers. These physical controllers manage the MFEs through which the trace packet passes. As described above, the MFEs send observation messages to the physical controllers that manage the MFEs whenever the MFEs perform logical and/or physical forwarding operations. The physical controllers analyzes the observation messages and sends the analyses to the logical controller that generated the trace packet.

Finally, the process 1200 generates (at 1225) a report based on the received analyses, then ends. The report, in some embodiments, indicates whether the packet successfully reached its destination(s), to which destinations the packet was delivered, packet information specified in the request (source/destination addresses, frame size, timeout duration, etc.), the number of observations received, how many times the packet was forwarded, and a time stamp that indicates when the traced packet was sent by the controller.

In addition, for each observation received by the controller cluster, some embodiments include additional information. For physical forwarding observations, this information may include whether the observation was sent for forwarding (into a tunnel) or delivery to a destination, information about the source and destination MFE for a particular tunnel, time duration from when the packet was sent by the controller to when the observation was received, remote IP address (for observations indicating that the packet was forwarded into a tunnel), and logical port to which the packet would have been delivered (for observations indicating delivery). For logical processing observations, this information might include ACL decisions (e.g., why a packet was dropped), the logical port to which a packet was forwarded on a particular logical switch or logical router, etc. Some of the logical processing observations of some embodiments are described in greater detail below by reference to FIG. 21.

Figure 13:
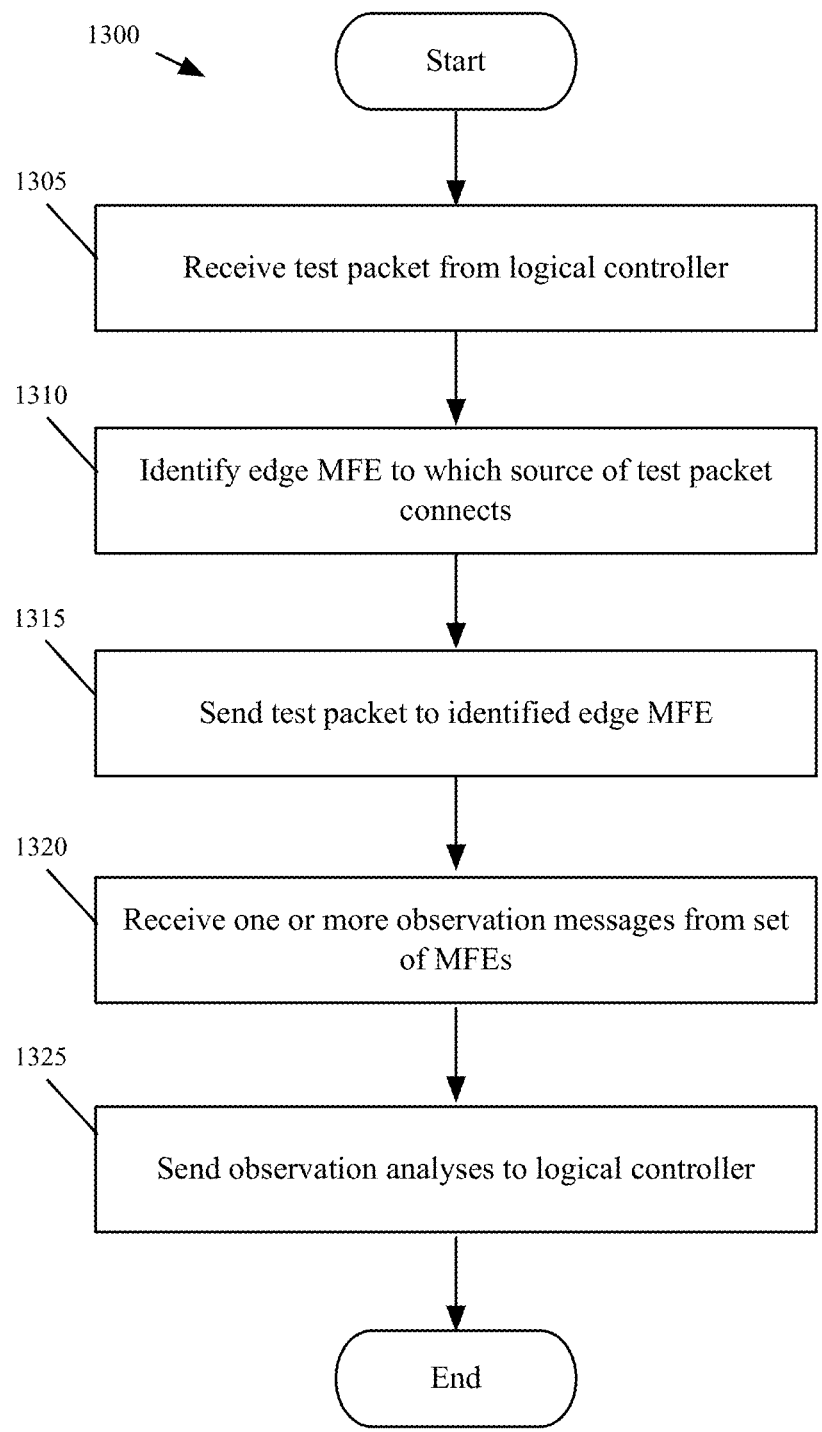
FIG. 13 conceptually illustrates a process performed by a physical network controller of some embodiments in order to execute a packet tracing operation.

FIG. 13 conceptually illustrates a process 1300 performed by the network controller of some embodiments in order to execute a packet tracing operation. The process 1300 is performed, in some embodiments, by a physical controller such as that shown above in FIG. 11. As shown, the process 1300 begins by receiving (at 1305) from a logical controller a test packet with specified source and destination addresses on a set of logical network element (e.g., logical switches and logical routers). As described above, the logical controller generates the packet from a trace request received from a user.

Next, the process 1300 identifies (at 1310) a MFE to which to inject the packet. In some embodiments, the process 1300 uses the source MAC address of the packet and mappings between the physical ports and the addresses of VMs. In some embodiments, these addresses are MAC addresses that represent VMs (more specifically, VIFs of VMs), gateways that connect the logical switch to external networks, connections to a different logical switch in a different controller domain, etc. In other embodiments, the communication from the logical controller with the test packet additionally includes a specification of the MFE at which the packet should be inserted.

The process then sends (at 1315) the packet to the edge MFE associated with the source of the packet. In some embodiments, this binding information (of logical port to physical port of an MFE) is stored by the network controller along with the binding of MAC address to logical port. When sending the packet to the edge MFE, in some embodiments the physical controller also accesses the registers (e.g., via a command over the communications channel with the MFE) associated with the packet on the MFE. The controller, in some embodiments, sets register values at the MFE that mimic those for a packet received from the specified source address.

The process 1300 next receives (at 1320) a set of observation messages from MFEs in the physical network regarding the injected packet and analyzes the observation messages to deduce certain data from the messages. The observation messages are sent to the network controller when an MFE performs a set of logical or physical forwarding operations. Some of the logical forwarding operations after which the MFE sends observation messages include a logical L2 ingress ACL operation, a logical L2 forwarding operation, a logical L2 egress ACL operation, a logical L3 ACL operation, a logical L3 routing operation, and a logical L3 egress ACL operation. For the physical forwarding operations, some embodiments send an observation message when either of two actions is taken by an MFE: (1) the MFE sends the packet to another MFE via a tunnel, or (2) the MFE delivers the packet to a logical port.

The physical controller receives different observations that provide different information for the different operations performed by the MFEs. For instance, when the packet is dropped as a result of performing a logical L2 ingress ACL, the observation includes some or all of the entries in the ACL, the security policy (e.g., port security) that was implemented by the ACL, the identity of the logical forwarding element to which the ACL belongs, etc. For forwarding via a tunnel, the observation includes an indicator of the MFE performing the action and a tunnel identifier in some embodiments. From this information the physical controller can determine a remote IP for the tunnel port at the destination MFE of the tunnel using the network state data that it stores. For delivery to a logical port, the observation of some embodiments includes an indicator of the MFE performing the action and a physical port through which the packet would be delivered if it were not a traced packet. From this information, the physical controller can determine a logical port identifier (e.g., of a gateway, a VM, etc.) to which the packet is sent based on the mappings stored in its network state data.

Finally, the process 1300 sends (at 1325) the analyses of the observation messages to the logical controller. As mentioned above, the observation messages include the identification of the logical controller that generated the trace packet. The process thus identifies the logical controller to which to send the analyses to and sends them to the identified logical controller.

It will be noted that this process 1300 is performed by a single physical controller for a given trace operation (specifically, the controller that manages the MFE at which the trace packet is inserted). However, the operations 1320 and 1325 are only performed by this particular physical controller for observations sent by MFEs that this physical controller manages. For the same trace operation, other physical controllers will perform operations 1320 and 1325 for observation messages received from MFEs that these controllers manage and then send the analyses to the same logical controller.

B. Example Packet Tracing Operations

The above sub-section II.A. describes in detail the operation of logical controllers and physical controllers of some embodiments. This sub-section II.B. describes several example packet-tracing operations and the observations sent to a controller cluster that includes a set of logical controllers and physical controllers.

Figure 14:
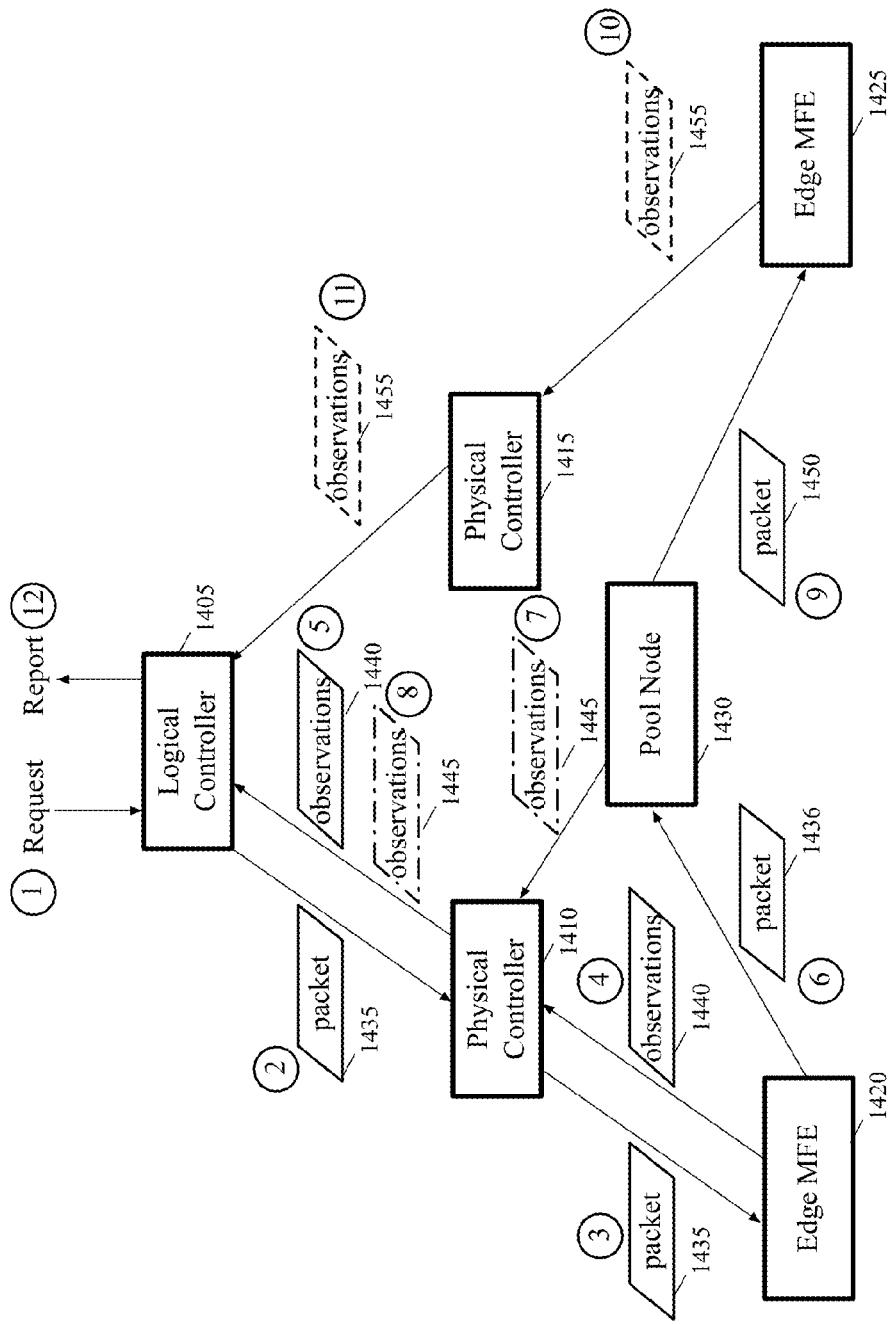
FIG. 14 conceptually illustrates an example for a traced packet that is generated by a logical controller and injected to a MFE by a physical controller.

FIG. 14 conceptually illustrates an example for a traced packet that is generated by a logical controller and injected to a MFE by a physical controller. This traced packet is sent through a pool node between the source MFE and destination MFE. As shown, this example illustrates a controller cluster 1400, a first edge MFE 1420, a second edge MFE 1425, and a pool node 1430 (also an MFE). In addition, the example illustrates various packets and observations with encircled numbers to indicate an order in which the various data (packets, observation messages) are sent within the network. As shown, the controller cluster 1400 in this example includes a logical controller 1405 and two physical controllers 1410 and 1415.

As shown by the encircled 1, initially the logical controller 1405 receives a request. In this case, the request specifies a source logical port that maps to a VM connected to the first MFE 1420 and a destination logical port that maps to a VM connected to the second MFE 1425. In response to the request, the controller 1405 generates a packet 1425.

As shown by the encircled 2, the logical controller 1405 then sends the generated packet to the physical controller 1410 because the physical controller 315 manages the MFE 1420 associated with the source of the packet. The header of the packet 1435 specifies the source and destination addresses received in the request, as well as a trace indicator that marks the packet as a test packet for a trace operation.

The physical controller 1410 identifies that the MFE 1420 is the MFE into which to inject the packet (e.g., based on a communication from the logical controller 1405 or by examining the packet) because the VM to which the destination logical port maps is connected to the MFE 1420. As shown by the encircled 3, the physical controller 1410 sends the packet 335 to the MFE 1420, along with a command to process the packet.

The first edge MFE 1420 processes the packet by performing a set of logical and physical forwarding operations. The MFE's forwarding table entries in some embodiments indicate to forward the packet to the pool node 1430. In some embodiments, this may be because the edge MFE 1420 does not have a direct tunnel connection to the edge MFE 1425. In this case, the edge MFE 1420 (i) encapsulates the packet with a logical context tag that specifies a destination logical port corresponding to the destination MAC address and (ii) further encapsulates the packet using tunnel encapsulation with an IP address for a port of the pool node 1430. Furthermore, the forwarding table entries also specify to send an observation message to the managing physical controller of the MFE 1420 whenever performing a logical or physical forwarding operation because a register bit at the MFE has been modified to identify the packet as associated with a trace operation. Thus, as shown by the encircled 4, the first MFE 1420 sends a set of observations 1440 to the physical controller 1410. The first MFE 1420 sends the observations to the physical controller 1410 because the physical controller 1410 manages the first MFE 1420. While shown as one set of data, these observations may be sent separately as each operation is performed by the MFE 1420.

The physical controller 1410 receives the set of observations 1440, analyzes them, and sends (shown by the encircled 5) the analyses to the logical controller 1405. In some embodiments, the physical controller 1410 uses the information (e.g., logical controller ID) included in the observation messages to identify the logical controller to which to send the analyses.

As the first edge MFE 1420 sends the last observation of the set of observations 1440, the first edge MFE 1420 sends (shown by encircled 6) a packet 1436 to the pool node 1430. The packet 1436 is the same as the packet 1435 in some embodiments, with the additional encapsulations mentioned above. It is to be noted that an instance in time when the packet 1436 is sent to the pool node 1430 is not necessarily after an instance in time when the analyses of the set of observations 1440 are sent to the logical controller 1405, even though the encircled numbers for the analyses and the packet are 5 and 6, respectively. The amount of time for the set of observations 1440 to reach the physical controller 1410 in addition to the amount of time the physical controller 1410 spends to analyze the set of observations received from the MFE 1420 may be longer or shorter than the amount of time for the packet 1436 to be sent to and reach the pool node 1445.

The pool node 1430 of some embodiments receives the packet 1436, sets a register bit based on the trace indicator stored in the packet, removes the tunnel encapsulation, and identifies that the destination logical port is located at the second edge MFE 1425. Thus, much like the edge MFE 1420, the pool node encapsulates the packet in a tunnel (this time terminating at the edge MFE 1425). As shown by the encircled 7, the pool node 1430 sends its own set of observations 1445 to the physical controller 1410 as the pool node 1430 performs a set of logical and/or physical forwarding operations to send the packet to the edge MFE 1425. In this example, the physical controller 1410 manages both the edge MFE 1420 and the pool node 1430. However, in many cases, the pool node will be managed by a different physical controller than the edge MFE (e.g., the physical controller 1415 that manages the destination MFE, or a different physical controller altogether). The physical controller 1410 receives the set of observations 1445, analyzes them, and sends (shown by the encircled 8) the analyses to the logical controller 1405.

As the pool node 1430 sends the last observation of the set of observations 1445, the pool node 1430 sends (shown by encircled 8) a packet 1450 to the second edge MFE 1425. The packet 1450 is the same as the packet 1436 in some embodiments, with the additional or different encapsulations mentioned above. It is to be noted that an instance in time when the packet 1450 is sent to the edge MFE 1425 is not necessarily after an instance in time when the analyses of the set of observations 1445 even though the encircled numbers for the analyses and the packet are 8 and 9, respectively.

The MFE 1425 receives this packet 1450, which still includes the trace indicator, and is encapsulated with the destination logical port. The receiving MFE 1425 reads this destination logical port and identifies (by performing a set of logical and physical forwarding operations specified by the MFE's forwarding table entries) to deliver the packet to the VM associated with the destination logical port. However, based on additional entries that (i) modify a register at the MFE to indicate the trace packet and (ii) read this register when delivering to the logical port, the MFE 1425 instead drops the packet.

Moreover, as the MFE 1425 performs its set of logical and physical forwarding operations, the MFE 1425 sends (shown by the encircled 10) a set of observations 1455 to the physical controller 1415. The second MFE 1425 sends the observations to the physical controller 1415 because the physical controller 1415 manages the second MFE 1415. The physical controller 1415 receives the set of observations 1455, analyzes them, and sends (shown by the encircled 11) the analyses to the logical controller 1405.

The logical controller 1405 receives the analyses of the observations from the physical controller 1410 and waits for more analyses to come from other physical controllers (e.g., the physical controller 1415) until a timeout is reached. Once the timeout is reached, the logical controller 1405 generates a report for the requested tracing operation and sends the report to the user, as shown by the encircled 12.

FIG. 14 illustrates that the logical controller 1405 is at the top of the hierarchy formed by the controllers in the controller cluster. In some embodiments, another type of controller resides above the logical controller 1405 in the hierarchy. This controller at the top is referred to as an API controller or input translation controller. The API controller, in some embodiments, supports the API of the controller cluster and takes the inputs from the user in the form of API calls. The API controller then generates the request and sends the request to a logical controller which is responsible for managing the logical forwarding elements of the user. More details about an API controller (input translation controller) are described in the above-incorporated U.S. Publication 2013/0103817.

Figure 15:
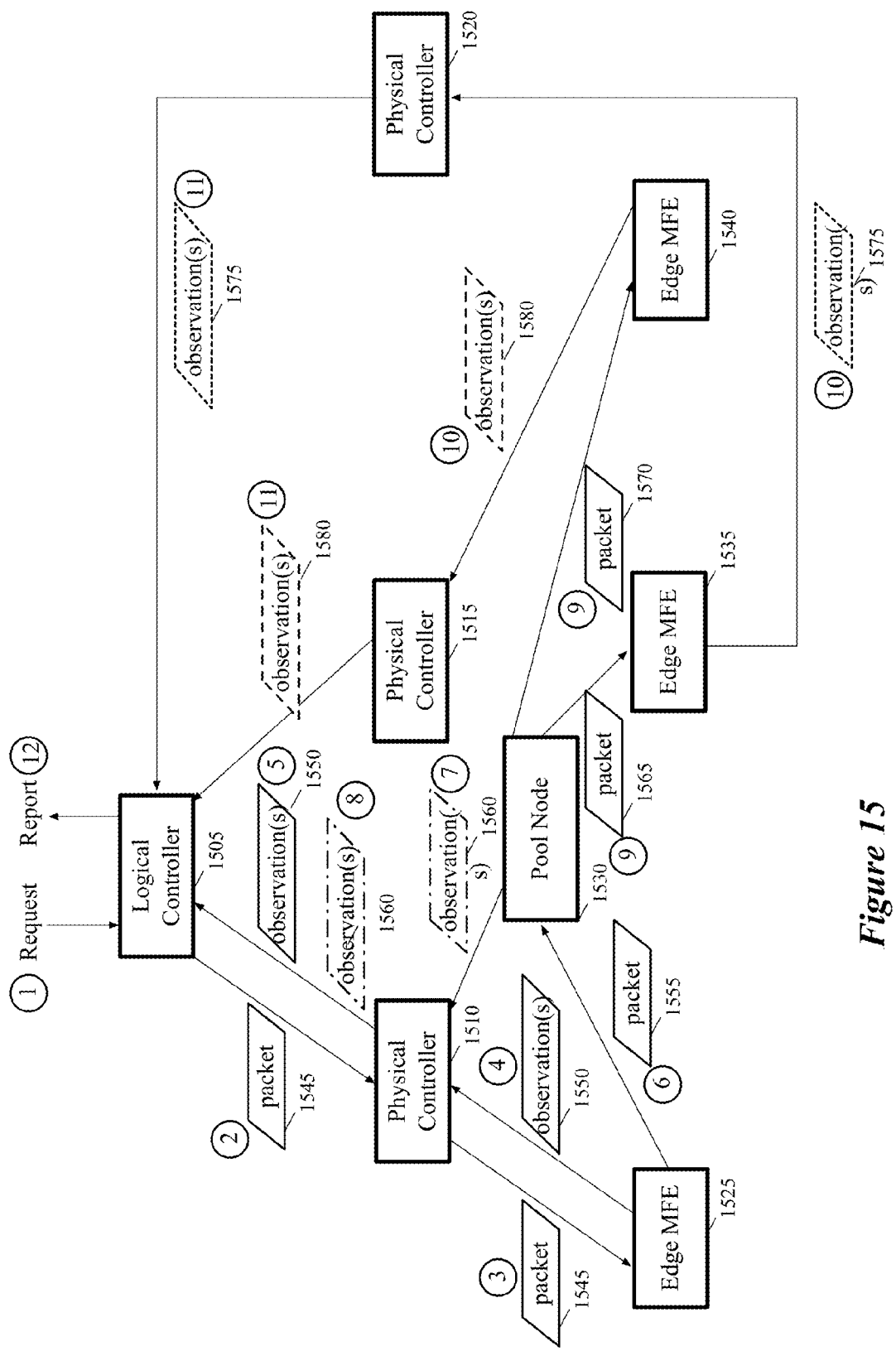
FIG. 15 conceptually illustrates another example for a traced packet that is generated by a logical controller and injected to a MFE by a physical controller.

In the above example, the traced packet specifies a singular destination address. FIG. 15 conceptually illustrates a second example for a traced broadcast packet that is generated by a logical controller and injected to a MFE by a physical controller. As shown, this example illustrates a logical controller 1505, three physical controllers 1510-1520, a first edge MFE 1525, a second edge MFE 1535, a third MFE 1540 and the pool node 1530 (also an MFE). In addition, as with the previous figure, the example illustrates various packets and observations with encircled numbers to indicate an order in which the various data (packets, observation messages) are sent within the network. In this case, the logical switch being examined has only three logical ports corresponding to three VMs, located at the hosts on which the three edge MFEs 1525, 1535, and 1540 operate.

As shown by the encircled 1, initially the logical controller 1505 receives a request to trace a specified packet from a source logical port. In this case, the request specifies a source logical port that maps to a VM connected to the first MFE 1525. In addition, rather than specifying a particular destination logical port, the request specifies to send a broadcast packet to the logical switch (e.g., by specifying a broadcast address on the logical switch as the packet destination). In response to the request, the controller 1505 generates a broadcast packet 1545.

As shown by the encircled 2, the logical controller 1505 then sends the generated packet to the physical controller 1510 because the physical controller 1510 manages the MFE 1525 associated with the source of the packet. The header of the packet 1545 specifies the source address and the broadcast destination received in the request, as well as a trace indicator that marks the packet as a test packet for a trace operation.

The first edge MFE 1525 processes the packet by performing a set of logical and physical forwarding operations. The MFE 1525's forwarding table entries in some embodiments indicate to forward broadcast packets to the pool node 1525. Furthermore, the forwarding table entries also specify to send an observation message to the physical controller 1510 whenever performing a logical or physical forwarding operation because a register bit at the MFE 1525 has been modified to identify the packet as associated with a trace operation. Thus, as shown by the encircled 3, the first MFE 1510 sends a set of observations 1550 to the physical controller 1510. The first MFE 1525 sends the observations to the physical controller 1510 because the physical controller 1510 manages the first MFE 1525. As in the previous figure, the MFE 1525 does not necessarily send all of the observations together, but instead some embodiments send each observation as the corresponding operation (e.g., a logical ACL decision, a logical forwarding decision to a specific logical port, a physical forwarding operation into a tunnel, etc.) is performed by the MFE 1525.

The physical controller 1510 receives the set of observations 1550, analyzes them, and sends (shown by the encircled 5) the analyses to the logical controller 1505. In some embodiments, the physical controller 1510 uses the information (e.g., logical controller ID) included in the observation messages to identify the logical controller to which to send the analyses.

As the first edge MFE 1525 sends the last observation of the set of observations 1550, the first edge MFE 1525 sends (shown by encircled 6) a packet 1555 to the pool node 1530. The packet 1555 is the same as the packet 1545 in some embodiments, with the additional encapsulations mentioned above. It is to be noted that an instance in time when the packet 1555 is sent to the pool node 1530 is not necessarily after an instance in time when the analyses of the set of observations 1550 is sent to the logical controller 1505 even though the encircled numbers for the analyses and the packet are 5 and 6, respectively. This is because the amount of time the set of observations 1550 to reach the physical controller 1510 in addition to the amount of time the physical controller 1510 spends to analyze the set of observations received from the MFE 1525 may be longer or shorter than the time for the packet 1555 to be sent to the pool node 1530.

The pool node 1530 of some embodiments receives the packet, sets a register bit based on the trace indicator stored in the packet, removes the tunnel encapsulation, and identifies the packet as a broadcast packet. In some embodiments, the pool node 1525 converts the broadcast packet into a set of unicast packets with the different destinations of the MAC addresses connected to the logical switch (excluding the source address). For each of these unicast packets, the pool node 1525 (i) encapsulates the packet with a logical context tag specifying the destination logical port for the packet and (ii) further encapsulates the packet using tunnel encapsulation with an IP address for a port of the destination MFE at which the logical port is located.

As shown by the encircled 7, the pool node 1530 sends its own set of observations 1560 to the physical controller 1510 as the pool node 1530 performs a set of logical and physical forwarding operations to convert the broadcast packet to the set of unicast packets and send the unicast packets to the respective destination MFEs. The physical controller 1510 receives the set of observations 1560, analyzes them, and sends (shown by the encircled 8) the analyses to the logical controller 1505.

As shown by the encircled 9, the pool node sends (i) a packet 1565 to the edge MFE 1535 and (ii) a packet 1570 to the edge MFE 1540. Each of the corresponding observations for sending these two packets is a forwarding observation indicating the respective tunneling data to the MFEs (sent as part of the set of observations 1560).

The MFEs 1535 and 1540 receive their respective packets 1545 and 1555, which still include the trace indicator and are encapsulated with their respective destination logical ports. The receiving MFEs 1535 and 1540 read the destination logical ports and identify (by performing a set of logical and physical forwarding operations specified by their forwarding table entries) to deliver their packets to the VMs associated with the destination logical ports. However, based on additional entries at each of the MFEs that (i) modify a register at the MFE to indicate the trace packet and (ii) read this register when delivering to the logical port, the MFEs 1515 and 1505 instead drop the packets.

Moreover, as the MFEs 1535 and 1540 perform their respective set of logical and physical forwarding operations, the MFEs 1535 and 1540 send (shown by the encircled 10) their respective set of observations 1555 and 1580 to the physical controllers 1520 and 1515, respectively. The second MFE 1535 sends the observations to the physical controller 1520 because the physical controller 1520 manages the second MFE 1535. The third MFE 1540 sends the observations to the physical controller 1515 because the physical controller 1515 manages the second MFE 1540.

The physical controller 1515 receives the set of observations 1580, analyzes them, and sends (shown by the encircled 11) the analyses to the logical controller 1505. The physical controller 1520 receives the set of observations 1575, analyzes them, and sends (shown by the encircled 11) the analyses to the logical controller 1505.

The logical controller 1505 receives the analyses of the observations from the physical controller 1510 and waits for more analyses to come from other physical controllers (e.g., the physical controllers 1515 and 1520) until a timeout is reached. Once the timeout is reached, the logical controller 1505 generates a report for the requested tracing operation and sends the report to the user, as shown by the encircled 12.

C. Multiple Logical Controllers

In the examples described above, a logical controller that generated a trace packet received the observations or analyses of the observations from a set of physical controllers that manage the MFEs through which the packet passes. In some embodiments, another logical controller that did not generate a trace packet aggregates some of the observations or analyses of the observations resulted from processing the trace packet. This logical controller then passes the aggregated observations or the analyses to the logical controller that generated the trace packet. In some embodiments, this may occur in larger-scale deployments in which each logical controller does not have a direct connection to each physical controller.

FIG. 16 conceptually illustrates an example for a trace packet that is generated by a first logical controller. In this example, a second logical controller aggregates some of the observations resulted from processing the trace packet and passes the observations to the first logical controller. The first logical controller generates a report with the observations from the second logical controller as well as those observations that the logical controller aggregates.

As shown, this figure illustrates a first logical controller 1605, a second logical controller 1610, three physical controllers 1615-1625, and four MFEs 1630-1645. In addition, the example illustrates the path of the trace packet with solid-head arrows and illustrates the paths of the observations with hollow-head arrows as indicated in the dotted box illustrated in the bottom of the figure. The example illustrates encircled numbers to indicate an order in which the various data (packets, observation messages, analysis, etc.) are sent within the network. However, when a path diverts into branches (e.g., from 3 to 4 and 6) the numbers may not necessarily represent the temporal order in which the communications occur, owing to the potential for different time lags in different branches.

In some embodiments, the logical controllers share all logical and physical data for implementing a set of logical forwarding elements in the physical network. In some such embodiments, the logical controllers communicate with different sets of physical controllers, for example, in order to scale. In this example, the logical controller 1605 propagates physical control plane data to the physical controllers 1615 and 1620, and the logical controller 1610 propagates physical control plane data to the physical controller 1625. Moreover, the physical controller 1615 manages the MFE 1630, the physical controller 1620 manages the MFE 1635, and the physical controller 1625 manages the MFEs 1640 and 1645. One of ordinary skill in the art will recognize that each physical controller 1615-1625 would generally manage numerous MFEs, which are not shown as they are not involved in the illustrated packet tracing operations.

As shown by the encircled 1, the first logical controller 1605 generates a trace packet from a request received from the user. The first logical controller 1605 sends the trace packet to the physical controller 1615 as shown by the encircled 2 because the physical controller 1615 manages the MFE 1630 to which the source address of the trace packet connects, and the logical controller 1605 has a direct connection to the physical controller 1615. If, on the other hand, the source logical port for the trace packet mapped to a physical port of the MFE 1645, some embodiments would send the trace packet to the logical controller 1610 for subsequent transmission to the physical controller 1625, which manages the MFE 1645.

The physical controller 1615 then injects the trace packet 1630 into the MFE 1630, in the manner described above. The MFE 1630 performs a set of logical and physical forwarding operations on the trace packet while sending (as shown by the encircled 4) an observation to the physical controller 1615 whenever the MFE performs a logical or physical forwarding operation on the packet.

The physical controller 1615 then receives the observations, analyzes each of them, and sends the analysis of the observation to the logical controller 1605. The logical controller 1605 receives the analyses and starts preparing a report of the trace operation by aggregating the analyses of the observation. The logical controller 1605 waits for more analyses to come from other physical controllers until a timeout is reached.

As shown by the encircled 6, the MFE 1630 sends the packet to MFE 1635 through a tunnel. In some embodiments, the MFE 1635 is a pool node, though this MFE may also be an edge MFE in other embodiments. The MFE 1635 then processes the packet by also performing a set of logical and physical operations on the received packet. The MFE 1635 sends (as shown by the encircled 7) its own set of observations to the physical controller 1620, which, in turn, analyzes this set of observations and sends (as shown by the encircled 8) the analyses to the logical controller 1605.

As shown by the encircled 9, the MFE 1635 sends the packet to MFE 1640 through a tunnel. The MFE 1640 then processes the packet by performing a set of logical and physical operations on the received packet. As with the MFE 1635, this MFE may be a pool node in some embodiments and an edge MFE in other embodiments. The MFE 1640 sends (as shown by the encircled 10) its own set of observations to the physical controller 1625, which analyzes this set of observations and sends (as shown by the encircled 11) the analyses to the second logical controller 1610.

The second logical controller 1610 then determines that the analysis of the observation is not resulted from processing a trace packet that the second logical controller 1610 generated. In some embodiments, a logical controller determines whether an observation or the analysis of the observation is resulted from processing a trace packet that it generated, based on the information (e.g., the logical controller ID) that indicates the origin of the traced packet, which is part of the observation message received by the physical controller and thus part of the analysis in the multiple logical controller situation. In this example, the analyses of the set of observations that the logical controller 1610 received from the physical controller 1625 includes the logical controller ID of the first logical controller 1605. Therefore, the second logical controller 1610 sends (as shown by the encircled 12) the analysis or the observation to the logical controller 1605.

As shown by the encircled 13, the MFE 1640 sends the packet to MFE 1645 through a tunnel. The MFE 1645 then processes the packet by performing a set of logical and physical operations on the received packet, including a decision to deliver the packet to its destination logical port (as well as dropping the packet before actually delivering it). The MFE 1645 sends (as shown by the encircled 14) its own set of observations to the physical controller 1625, which analyzes this set of observations and sends (as shown by the encircled 15) the analyses to the second logical controller 1610.

The second logical controller 1610 again determines that the analyses of the observations are not the result of processing a trace packet generated by the second logical controller 1610. In this example, the analyses of this set of observations that the logical controller 1610 received from the physical controller 1625 includes the logical controller ID of the first logical controller 1605. Therefore, the second logical controller 1610 sends (as shown by the encircled 16) the analysis or the observation to the logical controller 1605. The logical controller 1605 generates a report for the requested tracing operation by aggregating the analyses of the observations from the physical controllers 1615 and 1620 and the logical controller 1610 and sends the report to the user, as shown by the encircled 17.

Figure 17:
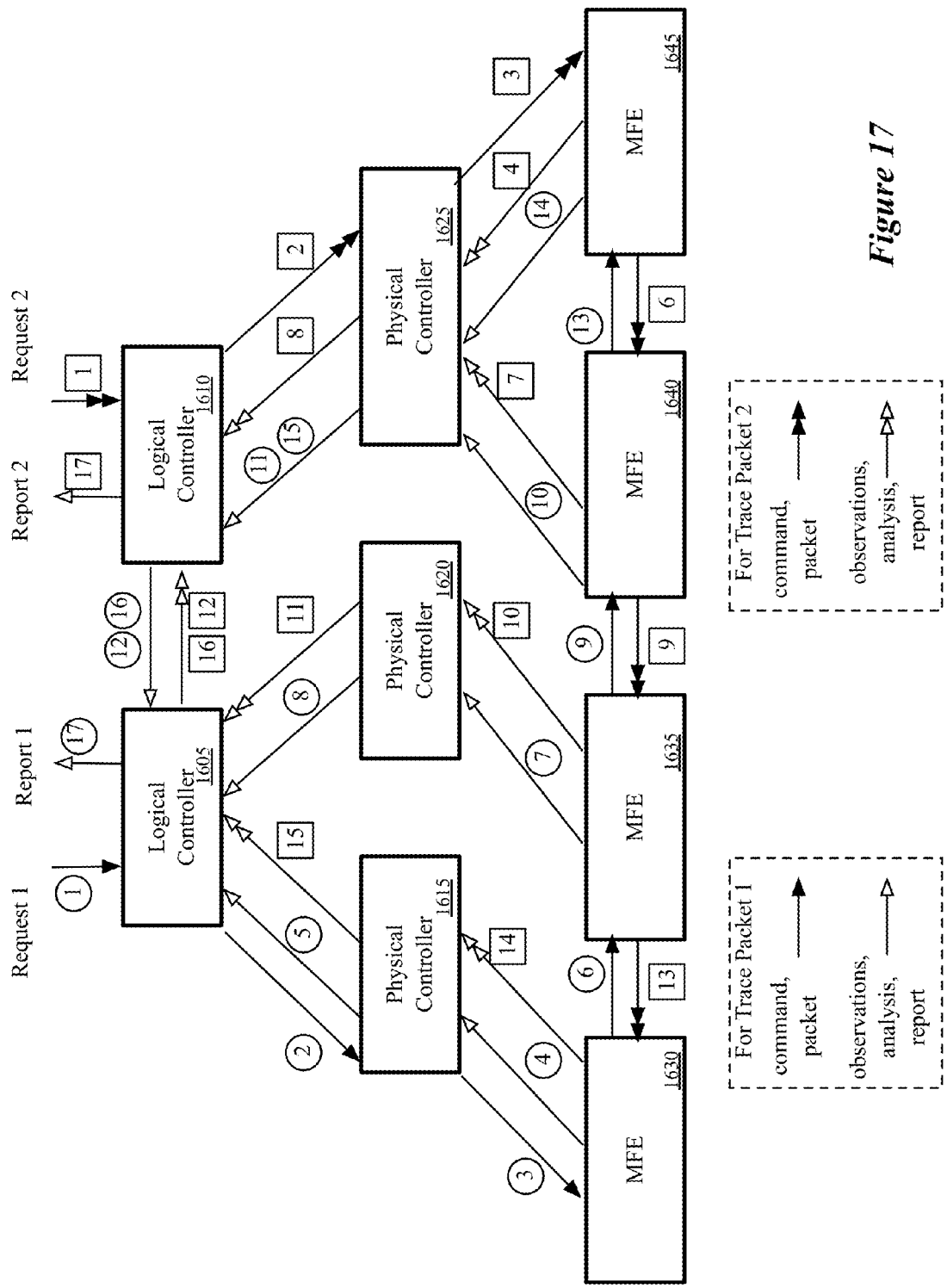
FIG. 17 conceptually illustrates an example for two trace packets originating from two different logical controllers.

In the example illustrated in FIG. 16, a first logical controller received observations from a second logical controller because the first logical controller generated the trace packet the processing of which resulted in the observation messages and analysis. FIG. 17 conceptually illustrates an example for two trace packets originating from two different logical controllers. In this example, a first logical controller aggregates some of the observations resulted from processing a first trace packet generated by a second logical controller and passes the observations to the second logical controller. The second logical controller also aggregates some of the observations resulted from processing a second trace packet generated by the first logical controller and passes the observations to the first logical controller.

As shown, this figure illustrates the same network control system as the previous figure: the first logical controller 1605, the second logical controller 1610, the three physical controllers 1615-1625, and the four MFEs 1630-1645. This figure also illustrates paths of two trace packets 1 and 2 generated by the first and second logical controllers 1605 and 1610, respectively. The paths for the trace packet 1 and its associated observations are illustrated as solid-head arrows and hollow-head arrows as indicated in the left dotted box shown in the bottom of the figure. The paths for the trace packet 2 and its associated observations are illustrated as double solid-head arrows and double hollow-head arrows, respectively, as indicated in the right dotted box shown in the bottom of the figure. The example illustrates encircled numbers representing the first trace packet and its resulting observation messages and analysis, and squared numbers representing the second trace packet and its resulting observation messages and analysis. The encircled and squared numbers indicate an order in which the various data for a particular trace operation (packets, observation messages, analysis, etc.) are sent within the network. However, when a path diverts into branches (e.g., from the encircled 3 to the encircled 4 and 6), the numbers may not necessarily represent the temporal order in which the communications occur, owing to the potential for different time lags in different branches. In addition, the encircled numbers representing communications for the first trace operation and the squared numbers representing communications for the second trace operation do not necessarily take place at the same time.

The description for the trace operation for the trace packet 1 in this example is identical with the description for the trace operation for the trace packet in the example of FIG. 16 above. Also, the description for the trace operation for the trace packet 2 is similar to the description for the example of FIG. 16, except that the packet traverses the set of MFEs in the opposite direction (e.g., from a source port located at the MFE 1645 to a destination port located at the MFE 1630) and therefore the observations/analyses are sent in this opposite order by the MFEs and physical controllers. Furthermore, whereas in the first trace operation the first logical controller 1605 aggregates the analyses (including some sent by the logical controller 1610) and generates a report, in the second trace operation the second logical controller 1610 receives some of its analyses from the first logical controller 1605 and performs the aggregation into a report to output to the user that requested the trace operation.

III. Observations for Logical Forwarding Operations

As mentioned above, an MFE of some embodiments generates an observation after performing a logical or physical forwarding operation. Because an MFE performs one or more logical or physical forwarding operations on a packet, the MFE sends one or more observations to a controller cluster. This section describes logical and physical forwarding operations for which an MFE generate observations.

A. Managed Forwarding Element Operation

Figure 18:
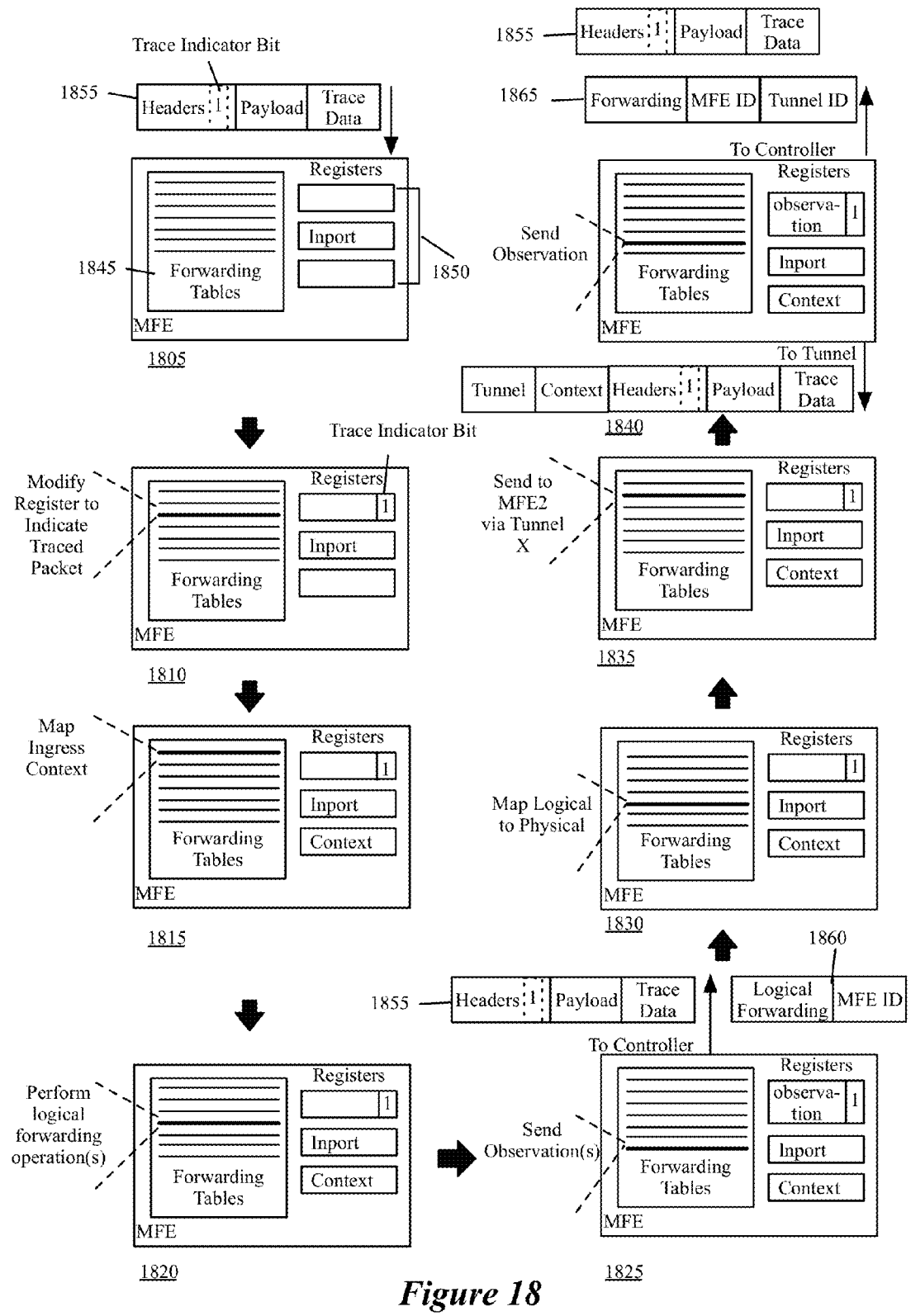
FIG. 18 conceptually illustrates packet processing performed by a MFE.
Figure 19:
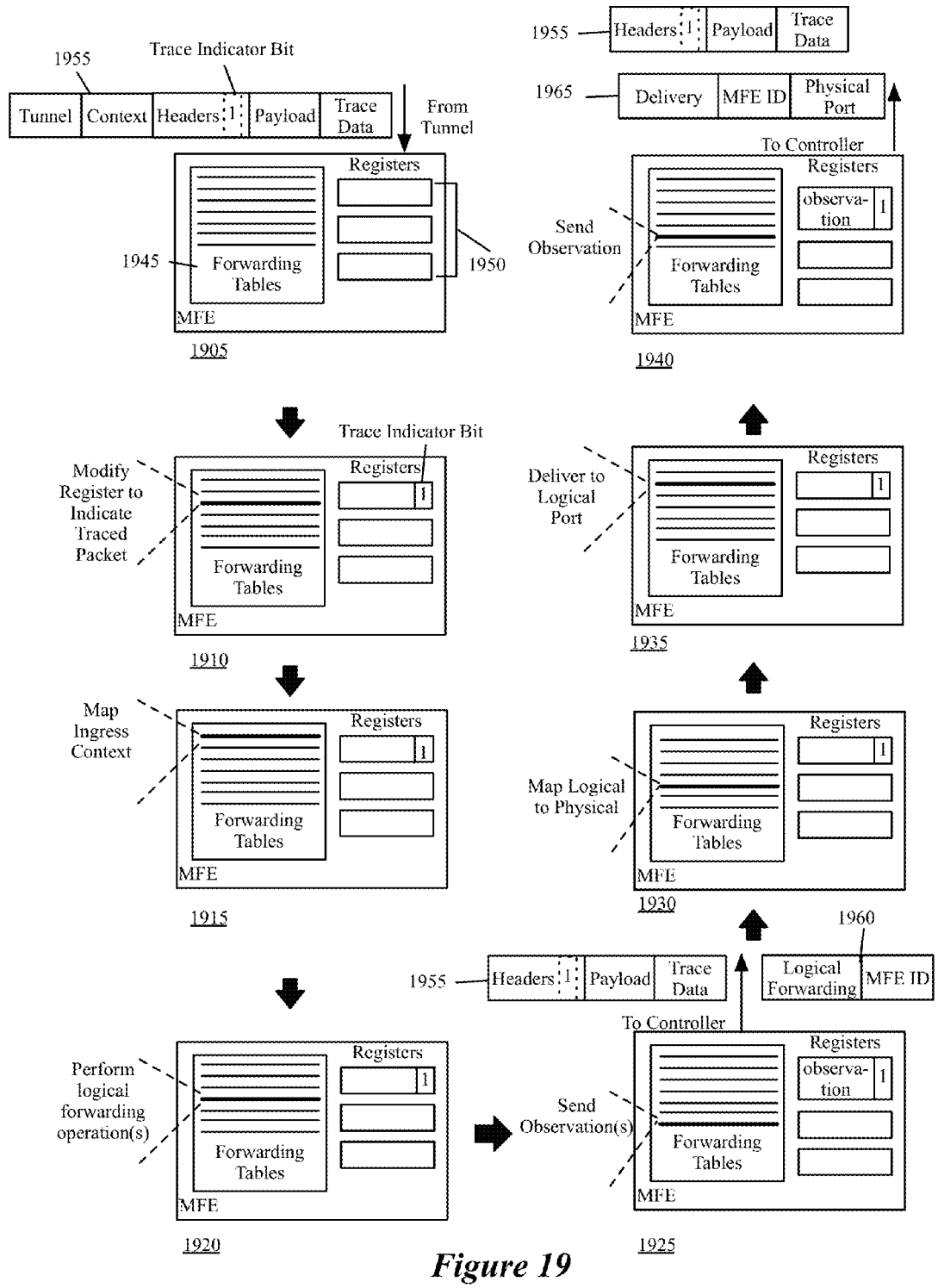
FIG. 19 conceptually illustrates a processing performed by a MFE that receives a packet from another MFE through a tunnel.

The next two figures, FIGS. 18 and 19, illustrate a MFE that sends observation messages as it performs a set of logical and physical forwarding operations. FIG. 18 conceptually illustrates packet processing performed by a MFE 1800 that receives a trace packet from a network controller, processes the packet, sends the packet out over a tunnel, and sends several observations to the network controller. This figure illustrates the processing over eight stages 1805-1820.

As with the MFE 700 described above by reference to FIG. 7, the MFE 1800 of some embodiments may be a software forwarding element that runs on or within a hypervisor on a VM host in a virtualized environment. Moreover, the MFE 1800 is similar to MFE 700 in that the MFE 1800 includes one or more forwarding tables 1845 and one or more registers 1850. In some embodiments, these registers are created (e.g., in the memory of the MFE) on a per packet basis, and the registers illustrated are those for the currently processed packet 1855.

At the first stage 1805, the MFE 1800 receives a packet 1855 directly from a network controller that manages the MFE. This network controller could be a physical controller that manages the MFE or a single network controller that generates packets and reports on the tracing of the packets. As described above, in some embodiments the network controller uses the same channel to send this packet as to send flow entries. The packet 1855 is similar to the packet 735 described above by reference to FIG. 7. In addition, as in the example of FIG. 7, the controller sets a register at the MFE 1800 to include the physical inport through which the packet would have been received had the packet been sent from its source address.

The MFE 1800 receives the packet 1855 and begins processing the packet through its forwarding tables. As mentioned, the forwarding tables include numerous flow entries, which take the form of a match and corresponding action or set of actions. As shown by the thicker line in the forwarding tables 1845 in the second stage 1810, at this stage a flow entry that is matched specifies to modify a particular bit in a particular register in order to indicate that the current packet is a traced packet. Thus, as shown, one of the registers 1850 is modified to specify this trace indicator bit. In some embodiments, this entry has a high priority so that the first operation the MFE performs upon receiving a traced packet is to set this register bit. In some embodiments, this bit is set by the controller specifying register values and therefore this flow entry is not required.

In the third stage 1815, a different flow entry is matched, as shown by the thicker line in the forwarding tables 1845. This flow entry specifies to determine the logical ingress context of the packet. In some embodiments, a logical context represents the state of the packet with respect to the logical forwarding element. Because this packet is received from the network controller, but made to look as though it was received directly from a source address, the packet does not yet have a logical context tag. However, based on the physical inport stored in the registers 1850 for the packet, the forwarding table maps the packet to a particular logical ingress port of a particular logical forwarding element (e.g., a logical switch). In some embodiments, this information is stored in a register, as shown. However, no observation is sent at this point, as mapping ingress context does not cause an observation message to be sent in some embodiments.

For simplicity of illustration, the fourth stage 1820 shows that the resubmitted packet matches one flow entry. However, the packet is resubmitted a number of times to perform a set of logical forwarding operations specified by a set of flow entries that is matched sequentially. Some of these logical forwarding operations include a logical ingress ACL operation for determining access control when the logical forwarding element receives the packet, a logical L2 operation for determining where to forward the packet through a layer 2 network, and a logical egress ACL operation for determining access control before the logical forwarding element routes the packet out of the logical forwarding element. Alternatively, or in conjunction with the logical L2 operations, the logical forwarding operations include a logical L3 operation for determining where to route the packet through a logical layer three network. For example, an ingress ACL operation might be based on the logical input port stored in the registers, a logical L2 forwarding operation might be based on a MAC address stored in the packet header, etc. These operations are described in further detail below.

The MFE 1800 stores the result of performing each of these operations in the registers in some embodiments (not shown). That is, some embodiments update the registers for the packet each time an operation specified by a flow entry is performed. Moreover, after a logical forwarding operation is performed, the resubmitted packet matches a flow entry that specifies to send an observation to the controller or controller cluster. The MFE 1800 sends an observation after performing a logical forwarding operation. Sending of an observation after performing a logical forwarding operation is shown by the fifth stage 1825. As shown, the MFE sends an observation message to the network controller from which it received the packet. In some embodiments, this observation message contains (i) the packet and (ii) the contents of the registers. The contents in the registers, which is then sent as part of observation message 1860, includes an (i) an indicator that the observation is a result of performing a logical forwarding operation (e.g., allowing the packet to enter the logical switch, dropping the packet as the packet is sent to the logical egress port, etc.), (ii) a MFE ID specifying that the MFE 1800 is sending the observation, etc. The different observations sent for different logical processing operations of some embodiments are described below by reference to FIG. 21.

Therefore, in order to send a set of observations to the network controller, the MFE actually repeats the stages 1820 and 1825 as many times as the number of logical operations it performs in some embodiments (with stage 1825 repeated only for the operations that result in an observation message).

After performing all the logical operations, the MFE 1805 resubmits the packet unless the packet is dropped as a result of performing a logical forwarding operation (e.g., an ACL operation that specifies to drop the packet). In addition, when logical forwarding decisions are made by the MFE (e.g., forwarding the packet to a particular destination logical port of a logical forwarding element), some embodiments encapsulate the packet with this destination logical port.

In the sixth stage 1830, the packet matches a flow entry that specifies to determine one or more ports of one or more MFEs that correspond to the logical egress port of the logical forwarding element through which the packet is to be sent out. For instance, if the packet is a broadcast packet or a multicast packet, in some embodiments the MFE 1800 determines the ports of the MFEs that correspond to the logical egress ports of the logical forwarding element through which the packet is to be broadcasted or multicasted out (i.e., the logical ports to which the intended recipients of the packet is coupled). However, in other embodiments, broadcast and multicast packets are sent to a pool node that performs this mapping. If the packet is a unicast packet, the MFE determines a port of a MFE that corresponds to the logical egress port of the logical forwarding element through which the packet is to be sent out (i.e., the logical port to which the intended recipient of the packet is coupled). This information is stored in the registers for the packet in some embodiments, for use in subsequent operations on the packet.

In the seventh stage 1835, a different flow entry is matched. This flow entry specifies to send the packet to a different MFE, which is determined in the previous stage 1830, via a particular tunnel. In some embodiments, the MFE bases this decision on the physical destination identified in the previous stage and its flow entry which maps this physical destination to a particular tunnel either directly to the physical destination or to a different MFE that can forward the packet through another tunnel to its physical destination.

At the eighth stage 1840, the resubmitted packet matches a flow entry to send an observation to the controller based on (i) the trace indicator bit stored in the register and (ii) the decision to send the packet out through a tunnel. As shown, the MFE sends an observation message to the network controller from which it received the packet. In some embodiments, this observation message contains (i) the packet as received and (ii) the contents or data of the registers for the packet.

The data in the registers, which is then sent as part of observation message 1865, includes an (i) an indicator that the observation is a forwarding observation (i.e., that the traced packet is being sent into a tunnel), (ii) a MFE ID specifying that the MFE 1800 is sending the observation, and (iii) a tunnel ID denoting the tunnel through which the packet is sent. Some embodiments also send a remote IP of the MFE at which the tunnel terminates, while in other embodiments the controller determines this data based on its stored network state information.

As indicated, the MFE 1800 sends the packet 1855 as received to the controller as part of the observation message in some embodiments. In other embodiments, the MFE sends to the controller the packet with the encapsulations that is sent to the MFE. The controller, in some embodiments, only uses the packet to read the trace data stored in the packet (e.g., the controller ID and the trace operation session ID), and reads all other pertinent information from the register contents sent as the observation message.

Furthermore, the MFE 1800 also sends out the packet 1855 through the tunnel to another MFE (e.g., the destination MFE, a pool node that connects to a destination MFE, etc.), which is now further encapsulated. In addition to the previous headers, the packet is now encapsulated with a tunnel header. In some embodiments, the MFE 1800 also clears out the registers after processing the packet 1855 (e.g., deletes the registers from memory).

The previous example illustrates an MFE processing a packet from a controller and sending a set of observation message when the packet is sent to another MFE via a tunnel. In the managed networks of some embodiments, MFEs also send observations when delivering traced packets to logical ports. FIG. 19 conceptually illustrates the processing performed by a MFE 1900 that receives a packet from another MFE through a tunnel, processes the packet, identifies that the packet should be delivered to a logical port from the MFE, and sends an observation to the network controller. This figure illustrates the processing over eight stages 1905-1920.

As with the MFE 1800, the MFE 1900 of some embodiments may be a software forwarding element that runs on or within a hypervisor on a VM host in a virtualized environment. In this case, the MFE operates within the same machine that hosts the destination VM for the processed packet.

As shown at the first stage 1905, the MFE 1900 includes one or more forwarding tables 1945 and one or more registers 1930. Like the forwarding tables of the MFE 1800, the forwarding tables 1945 of some embodiments include forwarding entries pushed down to the MFE 1900 from a network controller as physical control plane data and then converted into physical forwarding plane data by the MFE. The forwarding tables 1945, in some embodiments, include entries for several unaffiliated logical networks that are virtualized over the physical network.

Like the registers of the MFE 1800, the registers 1930 serve as temporary, quick-access storage for information while processing a packet. Some embodiments resubmit a packet to the forwarding tables of the MFE several times in order to fully process the packet. During this processing, the MFE 1900 uses the registers 1850 to temporarily store information (e.g., logical context information, packet tracing information, etc.) about the packet. In addition, some embodiments send the contents of the registers to the controller as part of an observation message.

At the first stage 1905, the MFE 1900 receives a packet 1955 through a tunnel from a different MFE. The packet 1955 is similar to the packet 1855 after the eighth stage 1840 of FIG. 18, in that the packet is encapsulated with a logical context and tunnel information. While the tunnel through which the packet is sent terminates at two MFEs, in between these two MFEs may be one or more unmanaged forwarding elements that make up a physical network over which packets are sent. In addition, like the packet of the previous figure, the packet 1955 includes a payload and a set of headers. As illustrated, the headers include a trace indicator bit that is set to "1" to indicate that the packet is a traced packet. In some embodiments, this bit is set within a logical VLAN field of the header. While shown as a single bit, some embodiments use more than one bit in the logical VLAN field or a different location of the packet to indicate that a packet is traced. In addition, appended to the payload (either within the payload portion of the packet or after the payload portion), the packet 1955 includes trace operation data.

The MFE 1900 receives the packet 1955 and begins processing the packet through its forwarding tables. As mentioned, the forwarding tables include numerous flow entries (e.g., on the order of hundreds or thousands of entries) which take the form a match and corresponding action. That is, if the packet matches a flow entry, the entry specifies an action to take. As shown by the thicker line in the forwarding tables 1945 in the second stage 1910, at this stage a flow entry is matched that specifies to modify a particular bit in a particular register in order to indicate that the current packet is a traced packet. Thus, as shown, one of the registers 1930 is modified to specify this trace indicator bit.

In the third stage 1915, a different flow entry is matched, as shown by the thicker line in the forwarding tables 1945. This flow entry specifies to read the logical context of the packet as stored on the packet as received. In this case, the packet has completed at least some of the logical forwarding operations in its logical processing pipeline at a previous MFE (e.g., the MFE at which the packet was injected) and the logical context tag on the packet specifies the results of these decisions (e.g., forwarding to a particular logical port). In some cases, all of the logical forwarding operations for the packet will have been performed by previous MFEs, in which case the fourth and fifth stages 1920 and 1925 of this figure will be skipped. In some embodiments, many trace packets will have all of their logical operations performed by the first MFE at which the packets are injected. However, some embodiments perform certain operations at a later MFE rather than the first hop MFE (e.g., egress ACL decisions, destination logical switch L2 forwarding after being sent through a logical L3 router, etc.).

When at least one logical operations remains to be performed, the packet matches a flow entry that specifies to perform the remaining set of logical forwarding operations. In that case, the MFE will perform these remaining logical forwarding operations and send the resulting observations to the network controller that manages the MFE 1900, as shown by the fourth and fifth stages 1920 and 1925, which are similar to the fourth and fifth stages 1820 and 1825 described above. As indicated below, different logical forwarding or logical ACL operations may result in different observation messages sent to the controllers.

In the sixth stage 1930, the packet matches a flow entry that specifies to identify, based on the logical context (i.e., the logical egress port) of the packet, the physical interface of the MFE 1900 to which the logical egress port is bound. For instance, for a destination address that corresponds to a VM, this is the port of the MFE to which a VIF of the VM connects. In the seventh stage 1935, a different flow entry is matched, as shown by the thicker line in the forwarding tables 1945. This flow entry specifies to deliver the packet to this destination port identified in the sixth stage. In some embodiments, the operations shown in these two stages 1930 and 1935 are in fact all specified by a single flow entry.

At the eighth stage 1940, the resubmitted packet matches a flow entry to write data to the registers for the packet, send an observation to the controller based on (i) the trace indicator bit stored in the register and (ii) the decision made at the third stage 1915 to deliver the packet to its destination logical port, and to drop the packet (i.e., not actually deliver the packet to the destination port). As shown, the MFE sends an observation message to the network controller that manages the MFE 1900. In some embodiments, this observation message contains (i) the packet as generated by the controller (i.e., without the logical context and tunnel encapsulation) and (ii) the contents of the registers for the packet. As such, in some embodiments the flow entry that specifies to send the observation also specifies that the MFE first write certain data into the registers. As indicated, the MFE 1900 sends the packet 1955 to the controller as part of the observation message.

B. Logical Forwarding Operations

As described above, a MFE performs a set of logical forwarding operations to forward packets in the logical networks and sends observations for these logical forwarding operations to the controller cluster that manages the MFE. This sub-section II.B describes different logical forwarding operations for which the MFE of some embodiments send observations to the controller.

Figure 20:
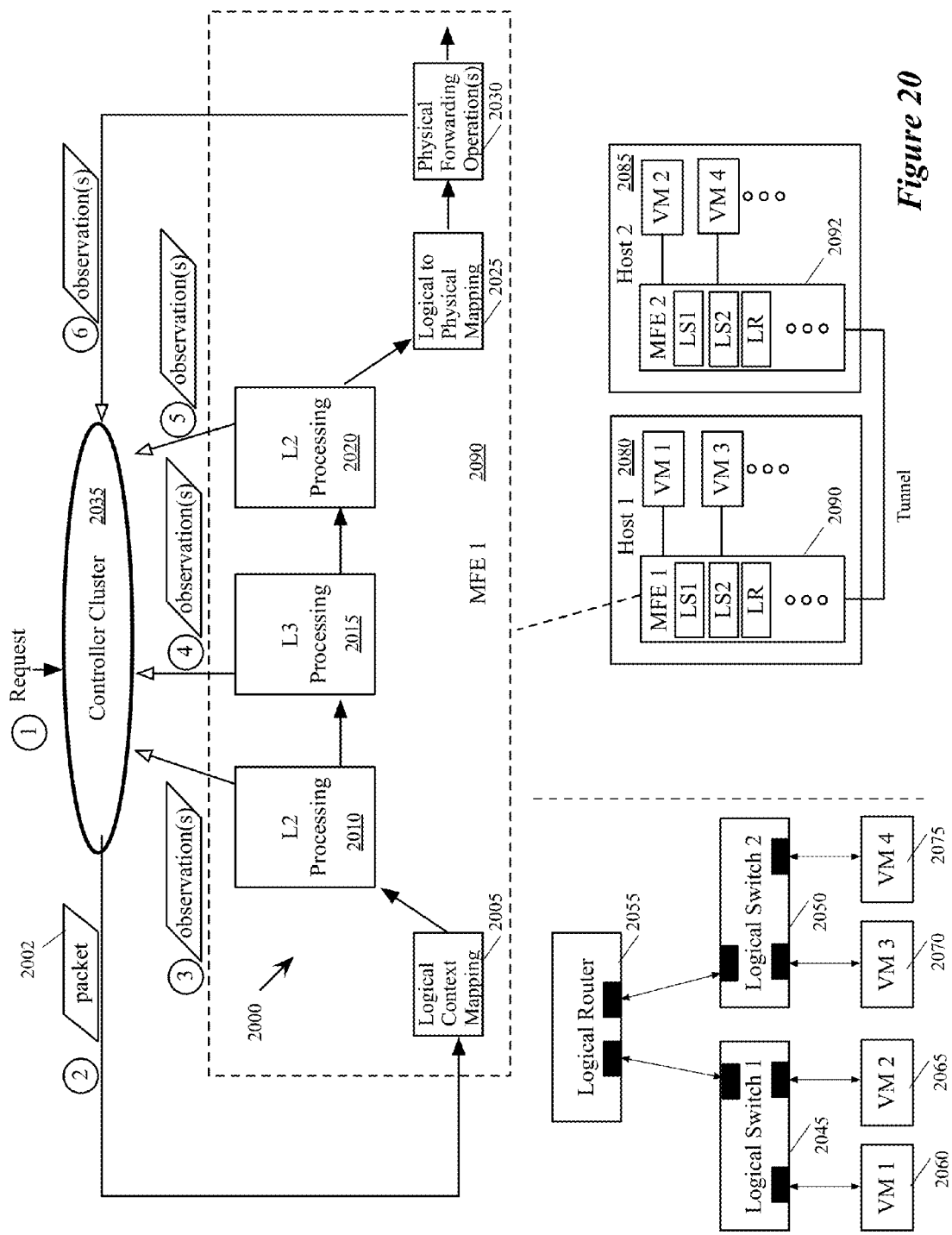
FIG. 20 conceptually illustrates an example of a MFE that sends multiple observations to a controller cluster while processing a trace packet.

FIG. 20 conceptually illustrates an example of a MFE that sends multiple observations to a controller cluster while processing a trace packet. Specifically, the top half of this figure illustrates a processing pipeline 2000 that a MFE performs on a packet in order to advance the packet in a logical forwarding element implemented across a set of MFEs. The processing pipeline 2000 includes six stages 2005-2030 for processing a packet.

The top half of this figure also illustrates a controller cluster 2035, a MFE 2090 that performs the processing pipeline 2000, and various packets and observations with encircled numbers that indicate an order in which the packets and observations messages sent. The bottom half of the figure illustrates three logical forwarding elements, which are a logical switches 2045 and 2050 and a logical router 2055, which are implemented in a physical network.

As shown, the logical switch 2045 connects two virtual machines 2060 and 2065 and the logical switch 2050 connects two virtual machines 2070 and 2075. The logical router 2055 routes data traffic between the two logical switches. Each of the virtual machines 2060-2075 connects to a logical port of the logical switches 2045 and 2050. In some embodiments, a user (e.g., network administrator) defines the logical switches and router, which may be part of a larger logical network. For instance, the logical router 2055 may include a logical port that connects to an external gateway (e.g., to an external network), to various middleboxes, etc.

In some embodiments, the user defines the logical forwarding elements through an API of a controller cluster, which translates the user definition into a logical control plane definition of the logical forwarding elements. The controller cluster then converts this logical control plane definition into a logical forwarding plane specification of the logical forwarding element. The logical forwarding plane specification, in some embodiments, includes logical forwarding table entries (logical flow entries) that specify rules for forwarding packets to logical ports of the logical forwarding elements. For instance, the logical control plane of some embodiments includes bindings between MAC addresses of VMs and logical ports, and the logical forwarding plane specifies flow entries for forwarding packets to the logical ports based on matches of the MAC addresses.

The controller cluster, as mentioned, pushes these flow entries to several MFEs in some embodiments, such that the logical forwarding element (and/or other logical forwarding elements, such as logical routers) are implemented in a distributed, virtualized fashion. The physical network of FIG. 20 illustrates that the four VMs 2060-2075 are hosted on two different host machines 2080 and 2085. Some embodiments may put multiple VMs from a logical network on the same machine, as in this case with the hosts 2080 and 2085. As shown, in the virtualized environment, each of these hosts 2080 and 2085 also hosts additional virtual machines beyond those connected to the logical switches 2045 and 2050. That is, many tenants may share the use of the physical network, and in fact may share use of a single physical host.

Operating on each host (e.g., within the hypervisor on the host) is a MFE. The MFE, in some embodiments, is a software forwarding element to which the network controller connects and pushes down flow entries for various logical forwarding elements. In this case, because VMs from each of the logical switches 2045 and 2050 are located on each of the two illustrated hosts 2080 and 2085, the MFE in each of these hosts implements both of the logical switches 2045 and 2050. That is, each of the illustrated MFEs has flow entries in its forwarding tables for logically forwarding packets to the logical ports associated with the different VMs 2060-2065. In addition, each of the MFEs 2090 and 2092 implement the logical router 2055 in order to logically route packets sent by one of the VMs 2060-2075.

The top half of FIG. 20 will now be described. As shown by the encircled 1, the controller cluster 2035 receives a request for a packet tracing operation. In this case, the request specifies a source logical port that maps to a VM connected to the MFE 2090 and a destination logical port that maps to a VM connected to another MFE (e.g., MFE 2092). In response to the request, the controller cluster 2035 generates a packet 2002 and sends (shown by the encircled 2) this to the MFE 2090. Some embodiments send the packet to the host from a logical controller via a physical controller, as described above by reference to, e.g., FIG. 14. The header of the packet 2002 specifies the source and destination addresses received in the request, as well as a trace indicator that marks the packet as a test packet for a trace operation.

In some embodiments, the processing pipeline 2000 may be implemented by flow entries in the MFEs. These flow entries process the packet by matching various fields either stored in the packet header (e.g., source and destination MAC addresses) or stored in registers for the packet created at the MFE (e.g., physical and logical ingress ports, logical forwarding element IDs, etc.). As mentioned, in some embodiments these flow entries are pushed down by the controller cluster as physical control plane data and converted into the physical forwarding plane data that makes up the forwarding tables.

When the MFE 2090 receives the packet 2002, the MFE 2090 stores a register bit indicating that the packet is marked for a trace operation (either based on a command sent with the packet by the controller cluster 2035 or a flow entry that matches the trace indicator bit in the packet). The MFE 2090 then performs an ingress context mapping on the packet to determine the ingress context of the packet in the first stage 2005 of the processing pipeline 2000. In some embodiments, the controller cluster sets register bits for the packet at the MFE that indicate a physical ingress port in order to mimic the packet having actually been received through that physical ingress port of the MFE (e.g., the physical ingress port to which the VM 2060 connects). The ingress context mapping of some embodiments maps this physical ingress port to a logical ingress port of a logical switching element (e.g., logical switch 2045).

In the second stage 2010 of the processing pipeline 2000, a set of logical operations are performed on the packets by the flow entries that implement the logical switch 2045 at the MFE 2090. These operations are performed first because the ingress context mapping mapped the source physical ingress port to a logical port of the logical switch 2045. The operations that implement the logical switch 2045, in some embodiments, include at least a logical L2 forwarding operation that identifies a destination logical port on the logical switch 2045 based on the destination address stored in the packet header (e.g., the port that connects to the logical router 2055). The processing 2010 may additionally include logical L2 ingress and/or egress ACL decisions, respectively performed before and after the logical L2 forwarding operation. These L2 operations will be described in further detail below by reference to FIG. 21.

In some embodiments, the MFE 2090 sends (shown by the encircled 3) an observation for each of the L2 operations for the logical switch 2045. In some embodiments, the MFE 2090 is configured (by the controller cluster 2035) to send an observation to the controller cluster after performing each L2 operation for the logical switch 2045 when the register bit for the packet indicates that the packet is marked for the trace operation. Because the packet 2002 is marked for the tracing operation, the MFE 2090 of some embodiments sends an observation including the result of performing an L2 operation for the logical switch 2045. In some embodiments, the MFE 2090 is configured to send observations only for some of the L2 operations for the logical switch 2045 performed on the marked packet (e.g., only certain ACL or forwarding operations).

In this example, the packet is logically sent to the logical router 2055 through a logical port of the logical switch 2045 because the destination MAC address of the packet corresponds to a logical port of the logical router, which is linked to the logical switch 2045. Because the packet is sent from the logical switch 2045 to the logical router 2055, both of which are implemented within the MFE 2090, the packet does not physically leave the MFE 2090. Instead, the packet is resubmitted to the MFE 2090 so that the MFE can perform the logical L3 router operations.

In the third stage 2015 of the processing pipeline 2000, a set of logical forwarding operations are performed on the packets by the flow entries that implement the logical router 2055 at the MFE 2090. The operations that implement the logical router 2055, in some embodiments, include at least a logical L3 forwarding operation that identifies a destination logical port on the logical router 2055 (e.g., based on the destination address stored in the packet header). In this case, this destination logical port is the port that connects to the logical switch 2050. The processing 2015 may additionally include logical L3 ingress and/or egress ACL decisions, respectively performed before and after the logical L3 forwarding operation. These L3 operations will be described in further detail below by reference to FIG. 21.

In some embodiments, the MFE 2090 sends (shown by the encircled 4) an observation for each of the L3 operations of the logical switch 2045. In some embodiments, the MFE 2090 is configured (by the controller cluster 2035) to send an observation to the controller cluster after performing each L3 operation for the logical router 2055 when the register bit for the packet indicates that the packet is marked for the tracing operation. Because the packet 2002 is marked for the tracing operation, the MFE 2090 of some embodiments sends an observation including the result of performing each L3 operation for the logical router 2055. In some embodiments, the MFE 2090 is configured to send observations only for some of the L3 operations that the logical router 2055 performed on the marked packet (e.g., only certain ACL or forwarding operations).

In this example, the logical router 2055 routes the packet to the logical switch 2050 because the destination IP address of the packet maps to the output port (e.g., by performing routing functions such as DNAT, identifying a longest prefix match, etc.) of the logical router that connects to the logical switch 2050. Because the packet is sent from the logical router 2055 to the logical switch 2050, which is also implemented within the MFE 2090, the packet does not leave the MFE 2090 within the physical network. Instead, the packet is resubmitted to the MFE 2090 so that the MFE can perform the logical L2 switching operations for the second logical switch 2050.

In the fourth stage 2020 of the processing pipeline 2000, an additional set of logical forwarding operations are performed on the packets by the flow entries that implement the logical switch 2050 at the MFE 2090. The operations that implement the logical switch 2055, in some embodiments, include at least a logical L2 forwarding operation that identifies a destination logical port on the logical switch 2050 (e.g., based on the destination address stored in the packet header). In this case, the destination logical port is the port that connects to the VM 2075, the IP address of which is the destination address of the trace packet 2002. The processing 2020 may additionally include logical L2 ingress and/or egress ACL decisions in some embodiments. In other embodiments, the egress ACL decisions are performed by the destination MFE 2092 rather than the first hop MFE 2090.

In some embodiments, the MFE 2090 sends (shown by the encircled 5) an observation for each of the L2 operations of the logical switch 2050. In some embodiments, the MFE 2090 is configured (by the controller cluster 2035) to send an observation to the controller cluster after performing each L2 operation for the logical switch 2050 when the register bit for the packet indicates that the packet is marked for the trace operation. Because the packet 2002 is marked for the tracing operation, the MFE 2090 of some embodiments sends an observation including the result of performing each L2 operation for the logical switch 2050. In some embodiments, the MFE 2090 is configured to send observations only for some of the L2 operations for the logical switch 2050 performed on the marked packet (e.g., only certain ACL or forwarding operations).

Next, the fifth stage 2030 of the processing pipeline 2000 is similar to the third stage 430 of the processing pipeline 400 described above by reference to FIG. 4. That is, the fifth stage 2030 of the processing pipeline 2000 performs a mapping operation on the packet to map the logical egress port (e.g., the port of logical switch 2050 that connects to the destination VM 2075) to a physical destination. That is, the mapping operation determines one or more ports of one or more MFEs that correspond to the logical egress port of the logical switch through which the packet is to be sent out.

At the sixth stage 2025 of the processing pipeline 2000, a set of operations to implement physical forwarding of the packet is performed. The set of physical operations of some embodiments includes operations for sending the packet to the physical port(s) that correspond to the logical egress port(s) of the packet, as determined in the previous stage 2025 of the pipeline. For example, the set of physical operations of some embodiments determines one or more ports of the MFE on which the processing pipeline 2000 is performed through which to send the packet out in order for the packet to reach the physical port(s) determined at the fifth stage 2025. This way, the MFEs can route the packet along the correct path in the network for the packet to reach the determined physical port(s) that correspond to the packet destination.

In some embodiments, the MFE 2090 sends (shown by the encircled 6) one or more observation messages 2065 to the controller cluster for the set of physical operations performed at the fourth stage 2040 when the register bit indicates that the packet is marked for the trace operation. For instance, the MFE of some embodiments sends observations when either of two actions is taken by the MFE: (1) the MFE sends the packet to another MFE via a tunnel, or (2) the MFE delivers the packet to a physical port to which the logical egress port is mapped. In this case, if sending the packet through a tunnel to the MFE 2092 for delivery to the VM 2075, the MFE 2090 would send a forwarding observation message. On the other hand, if the MFE delivered the packet to the VM 2070 (or, would deliver the packet if it were not a trace operation packet), the MFE would send a delivery observation message.

As mentioned above, in some embodiments, the processing pipeline 2000 is performed by each MFE in the managed network that is used to implement the logical forwarding element. In some embodiments, some of the MFEs perform only a portion of the processing pipeline 2000. For example, in some embodiments, the MFE that initially receives the packet may perform the first-sixth stages 2005-2030 and the remaining MFEs that subsequently receive the packet only perform the first, fifth, and sixth stages 2005, 2025, and 2030.

In the example of FIG. 20, the logical forwarding operations for all of the logical forwarding elements—the L2 processing operations for the logical switch 2045, the L3 processing operations for the logical router 2055, and the L2 processing operations for the logical switch 2050—are performed by the MFE 2090. In some embodiments, the controller cluster configures the MFEs in such a way that the logical forwarding operations for a packet are performed by the MFEs in a distributed manner. For instance, the MFEs can be configured such that the MFE 2090 performs the L2 processing operations for the logical switch 2045 and the L3 processing operations for the logical router 2055 and another MFE performs the L2 processing operations for the logical switch 2050. An example of performing logical forwarding operations in a distributed manner by the MFEs is described below by reference to FIG. 22. However, before FIG. 22 illustrates the example, FIG. 21 illustrates L2 and L3 operations in detail.

Figure 21:
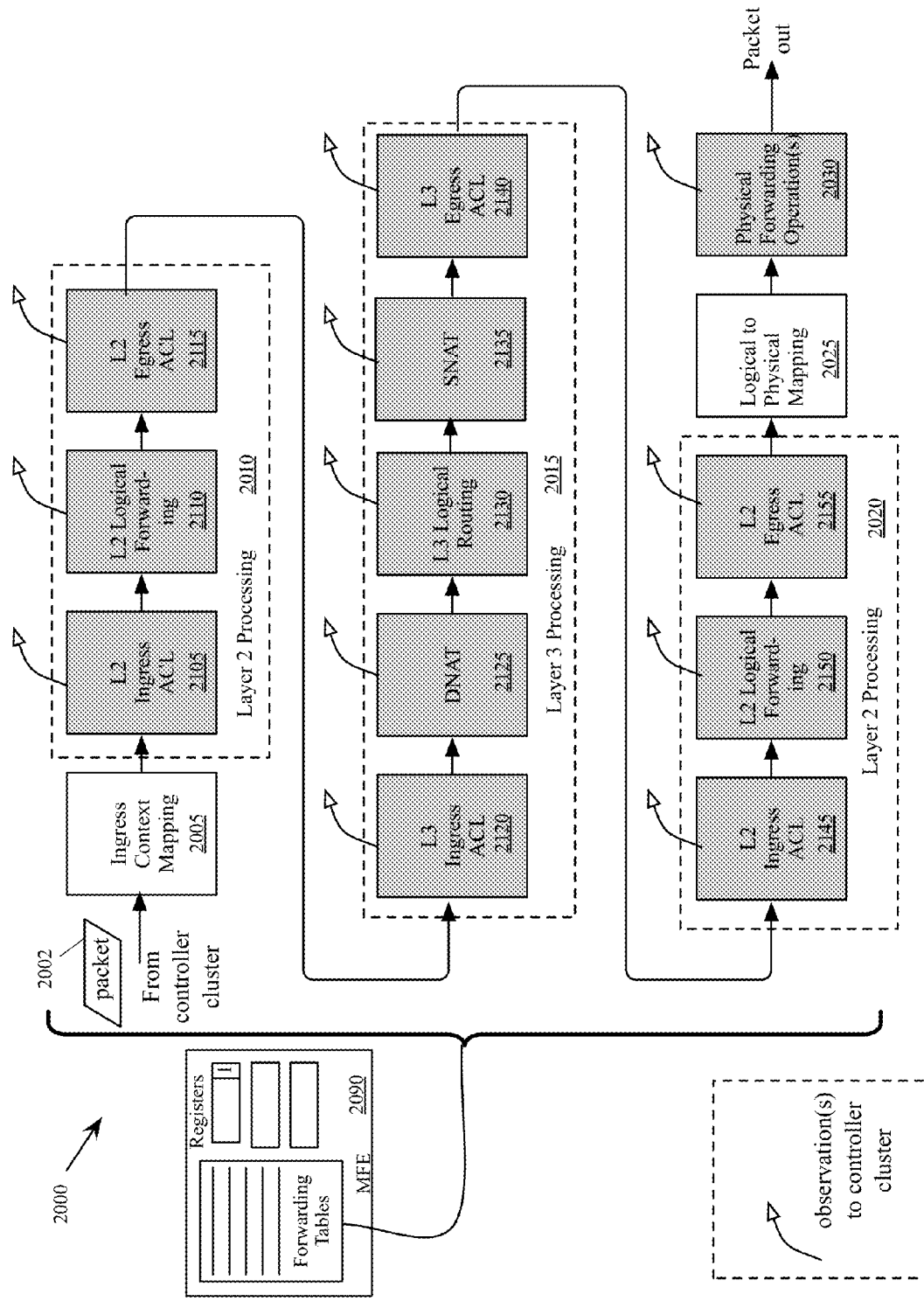
FIG. 21 conceptually illustrates an example of a processing pipeline that a MFE performs.
Figure 22:
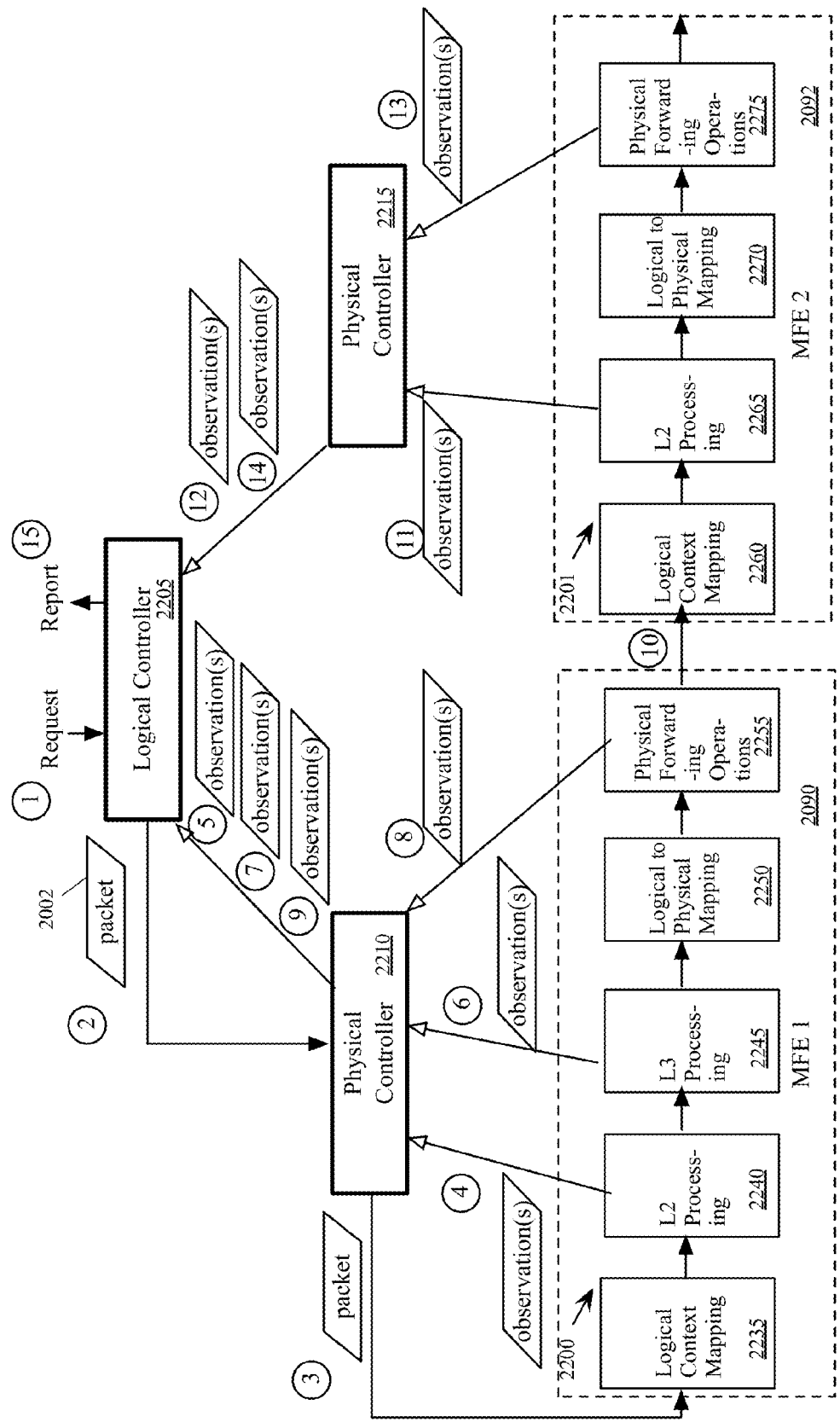
FIG. 22 conceptually illustrates an example of performing logical forwarding operations in a distributed manner by MFEs.

FIG. 21 conceptually illustrates an example of more detailed processing pipeline 2000 described above by reference to FIG. 20. Specifically, FIG. 21 illustrates the L2 processing operations at the stage 2010, the L3 processing operations at the stage 2015, and the L2 processing operations at the stage 2020 of FIG. 20 in more details. FIG. 21 also illustrates the MFE 2090 and the packet 2002.

In some embodiments, each operation in a processing pipeline performed by a MFE is based on one or more flow entries stored in the forwarding tables of the MFE. In order to configure the MFE to send an observation for an operation, the controller cluster of some embodiments populates the forwarding tables with such flow entries that direct the MFE to send an observation at the time or after the operation is performed. In some embodiments, one of these flow entries will be matched when the packet is resubmitted to the MFE after the MFE performs the operation. In other embodiments, a single matched flow entry specifies to both perform the logical processing pipeline operation and send the corresponding observation to the controller cluster.

Some embodiments send an observation to the controller cluster only for a subset of logical or physical forwarding operations that a MFE performs on a packet. For instance, the MFE 2090 is configured to send an observation after performing an operation depicted as a grey box illustrated in this figure. Therefore, when the MFE 2090 resubmits the packet 2002 after performing an operation depicted as a grey box, a flow entry is matched that specifies to send an observation to the controller cluster (e.g., the physical controller that manages the MFE 2090). As mentioned, in other embodiments, the flow entry for performing these operations also specifies to send the observation, rather than having the operation and the observation message as two separate flow entries. Each curvy, hollow-headed arrow on top of grey boxes indicates that the observation for the operations depicted as the grey box is sent to the controller cluster.

The operations depicted as boxes in this figure will now be described. The ingress context mapping stage 2005 is described above, and in some embodiments does not result in an observation message sent to the controller cluster. For the next stage 2010, the L2 processing operations at this stage include three operations at sub-stages 2105-2115 for processing a packet through the logical switch 2045. At the stage 2105, the MFE 2090 performs a logical L2 ingress ACL operation based on the packet's logical context to determine ingress access control of the packet with respect to the logical switch 2045. For instance, an ingress ACL is applied to the packet to control the packet's access to the logical switch 2045 when the logical switch 2045 receives the packet. Based on the ingress ACL defined for the logical switch 2045, the packet may be allowed into the logical switch 2045 or the packet may be dropped. For instance, some embodiments ensure that the packet's source MAC address is correct for the logical port from which it was received.

The observation message of some embodiments, as with the previously described observations, includes both the packet as received at the MFE and data copied to the registers for the packet for the purpose of being sent in the observation message. This data includes, for a L2 ingress ACL decision in some embodiments, (i) a MFE ID specifying that the MFE 2090 is sending the observation, (ii) a logical switch ID for the switch 2045 that implements the ACL conditions (and, in some embodiments, the logical ingress port on that logical switch), (iii) the matching ACL entry (e.g., a port security entry, QoS entry, etc.), and (iv) the decision of the ACL entry (e.g., whether to drop, allow, enqueue, etc. the packet). One of ordinary skill in the art will recognize that different logical ingress ACL observation messages may include different information.

At the following stage 2110, an L2 forwarding operation is performed on the packet. In some embodiments, the MFE 2090 performs this L2 forwarding operation based on the packet's destination MAC address in order to send the packet through a logical egress port of the logical switch 2045 (i.e., the logical port that corresponds to the destination address of the packet, which at this point in this case is the address of the logical router).

The observation message of some embodiments again includes both the packet as received at the MFE (or as modified to include the logical egress port, in other embodiments) and data copied to the registers for the packet for the purpose of being sent in the observation message. This data includes, for a logical L2 forwarding decision in some embodiments, (i) a MFE ID specifying that the MFE 2090 is sending the observation, (ii) a logical switch ID for the switch 2045 through which the packet is processed, and (iii) the logical egress port of the logical switch to which the packet is sent. One of ordinary skill in the art will recognize that different logical L2 forwarding observation messages may include different information.

Next, at the stage 2115, the MFE 2090 performs a L2 egress ACL operation based on the packet's logical egress context to determine egress access control of the packet with respect to the logical switch 2045. For instance, an egress ACL may be applied to the packet to control the packet's access out of the logical switch 2045. Based on the egress ACL defined for the logical switch 2045, the packet may be dropped. For example, some embodiments ensure that the packet's source is allowed to send packets to the packet's destination.

The observation message of some embodiments again includes both the packet as received at the MFE and data copied to the registers for the packet for the purpose of being sent in the observation message. This data includes, for a L2 egress ACL decision in some embodiments, (i) a MFE ID specifying that the MFE 2090 is sending the observation, (ii) a logical switch ID for the switch 2045 that implements the ACL conditions (and, in some embodiments, the logical egress port on that logical switch), (iii) the matching ACL entry (e.g., a port isolation entry, etc.), and (iv) the decision of the ACL entry (e.g., whether to drop, allow, enqueue, etc. the packet). One of ordinary skill in the art will recognize that different logical egress ACL observation messages may include different information.

When the packet's destination address is not connected to a logical port of the logical switch 2045, the logical switch 2045 sends the packet to the logical router 2055. The MFE then performs the L3 processing operations at stage 2015 in order to route the packet to the destination. The L3 processing operations in some embodiments include five operations at sub-stages 2120-2140 for processing the packet 2002 through the logical router 2055 (shown in FIG. 20) that is implemented by the MFE 2090. In some embodiments, L3 processing operations involve performing a set of logical routing operations for determining how to route the packet through a logical layer 3 network.

At the stage 2120, the MFE 2090 performs a L3 ingress ACL operation for determining access control when the logical router 2055 receives the packet 2002. In some embodiments, the MFE 2090 performs the L3 ingress ACL operation based on the packet's logical ingress context to determine ingress access control of the packet with respect to the logical router 2055. For instance, some embodiments determine whether packets from the source of the packet are allowed through the logical ingress port of the logical router.

The observation message of some embodiments again includes both the packet as received at the MFE and data copied to the registers for the packet for the purpose of being sent in the observation message. This data includes, for a L3 ingress ACL decision in some embodiments, (i) a MFE ID specifying that the MFE 2090 is sending the observation, (ii) a logical router ID for the router 2055 that implements the ACL conditions (and, in some embodiments, the logical ingress port on that logical router), (iii) the matching ACL entry (e.g., a port security entry, QoS entry, etc.), and (iv) the decision of the ACL entry (e.g., whether to drop, allow, enqueue, etc. the packet). One of ordinary skill in the art will recognize that different logical ingress ACL observation messages may include different information.

At the next stage 2125, the MFE 2090 of some embodiments performs a destination network address translation (DNAT) to revert the destination address of the packet back to the real address of the destination machine that is hidden from the source machine of the packet. This stage 2136 is performed when DNAT is implemented by the MFE 2090. In other embodiments, DNAT may not be necessary or may not be implemented within the particular logical network.

The observation message of some embodiments again includes both the packet as received at the MFE and data copied to the registers for the packet for the purpose of being sent in the observation message. This data includes, for a DNAT operation in some embodiments, (i) a MFE ID specifying that the MFE 2090 is sending the observation, (ii) a logical router ID for the router 2055 within which the DNAT processing is implemented, (iii) the original destination IP address, and (iv) the translated destination IP address. One of ordinary skill in the art will recognize that different DNAT observation messages may include different information. Furthermore, some embodiments do not include observation messages for DNAT performed within the processing pipeline, or may even perform the DNAT using a middlebox located outside of the processing pipeline.

At the stage 2130, the MFE 2090 performs a logical L3 routing operation to determine one or more logical egress ports of the logical router based on the L3 address (e.g., destination IP address) of the packet. The observation message of some embodiments, as with the previously described observations, includes both the packet as received at the MFE and data copied to the registers for the packet for the purpose of being sent in the observation message. This data includes, for a logical L3 routing decision in some embodiments, (i) a MFE ID specifying that the MFE 2090 is sending the observation, (ii) a logical router ID for the router 2055 through which the packet is processed, (iii) the routing entry matched to forward the packet, and (iv) the logical egress port of the logical router to which the packet is sent. One of ordinary skill in the art will recognize that different logical L3 forwarding observation messages may include different information.

At the next stage 2135, the MFE 2090 performs source network address translation (SNAT) on the packet if SNAT is implemented by the MFE 2090. By performing an SNAT operation on the packet, the MFE 2090 replaces the source IP address of the packet with a different IP address in order to hide the real source IP address. Like the DNAT operation 2125, in other embodiments, the SNAT may not be implemented within the particular logical network.

The observation message of some embodiments again includes both the packet as received at the MFE and data copied to the registers for the packet for the purpose of being sent in the observation message. This data includes, for a SNAT operation in some embodiments, (i) a MFE ID specifying that the MFE 2090 is sending the observation, (ii) a logical router ID for the router 2055 within which the SNAT processing is implemented, (iii) the original source IP address, and (iv) the translated source IP address. One of ordinary skill in the art will recognize that different SNAT observation messages may include different information. Furthermore, some embodiments do not include observation messages for SNAT performed within the processing pipeline, or may even perform the SNAT using a middlebox located outside of the processing pipeline.

In some embodiments, the L3 processing additionally includes performing a destination MAC address replacement operation, which may include sending Address Resolution Protocol (ARP) requests. The MFE sends ARP request packets to all the VMs on the logical L2 domain identified as corresponding to the destination port of the logical router. The MFE should receive an ARP reply packet from one of these VMs with a MAC address, which it uses to replace the destination MAC address in the packet before sending the packet to the second logical switch. Some embodiments trace these ARP packets and the processing thereof as well as the original packet, while other embodiments do not also trace the ARP request and reply packets.

At the stage 2135, the MFE 2090 performs a L3 egress ACL operation for determining access control before the logical router 2055 routes the packet out of the logical router 2055 through the logical port determined in the stage 2130. The L3 egress ACL operation is performed based on the L3 addresses (e.g., source and destination IP addresses) of the packet in some embodiments. For instance, some embodiments ensure that packets from the source IP address are allowed to exit the logical router through the logical egress port identified at the stage 2130.

The observation message of some embodiments again includes both the packet as received at the MFE and data copied to the registers for the packet for the purpose of being sent in the observation message. This data includes, for a L3 egress ACL decision in some embodiments, (i) a MFE ID specifying that the MFE 2090 is sending the observation, (ii) a logical router ID for the router 2055 that implements the ACL conditions (and, in some embodiments, the logical ingress port on that logical router), (iii) the matching ACL entry (e.g., a port isolation entry, etc.), and (iv) the decision of the ACL entry (e.g., whether to drop, allow, enqueue, etc. the packet). One of ordinary skill in the art will recognize that different logical egress ACL observation messages may include different information.

For the next stage 2020, the L2 processing operations at this stage include three operations at sub-stages 2145-2155 for processing a packet through the logical switch 2050 shown in FIG. 20. These stages are similar to the stages 2105-2115 for the first logical switch through which the packet is processed.

At the stage 2145, the MFE 2090 performs an L2 ingress ACL operation based on the packet's logical context to determine ingress access control of the packet with respect to the logical switch 2050. For instance, an ingress ACL is applied to the packet to control the packet's access to the logical switch 2050 when the logical switch 2050 receives the packet. Based on the ingress ACL defined for the logical switch 2050, the packet may be allowed into the logical switch 2050 or the packet may be dropped. For instance, some embodiments ensure that packets from the source IP address stored in the packet header are allowed to enter through the logical ingress port of the logical switch 2050.

The observation message of some embodiments, as with the previously described L2 ingress ACL observation from stage 2105, includes both the packet as received at the MFE and data copied to the registers for the packet for the purpose of being sent in the observation message. This data includes, for a L2 ingress ACL decision in some embodiments, (i) a MFE ID specifying that the MFE 2090 is sending the observation, (ii) a logical switch ID for the switch 2050 that implements the ACL conditions (and, in some embodiments, the logical ingress port on that logical switch), (iii) the matching ACL entry (e.g., a port security entry, QoS entry, etc.), and (iv) the decision of the ACL entry (e.g., whether to drop, allow, enqueue, etc. the packet). One of ordinary skill in the art will recognize that different logical ingress ACL observation messages may include different information.

At the stage 2150, an L2 forwarding operation is performed on the packet. In some embodiments, the MFE 2090 performs this L2 forwarding operation based on the packet's destination address in order to send the packet through a logical egress port of the logical switch 2050 (i.e., the logical egress port that corresponds to the destination MAC address of the packet).

The observation message of some embodiments, as with the previously described L2 forwarding observation from stage 2110, includes both the packet as received at the MFE (or as modified to include the logical egress port, in other embodiments) and data copied to the registers for the packet for the purpose of being sent in the observation message. This data includes, for a logical L2 forwarding decision in some embodiments, (i) a MFE ID specifying that the MFE 2090 is sending the observation, (ii) a logical switch ID for the switch 2050 through which the packet is processed, and (iii) the logical egress port of the logical switch to which the packet is sent. One of ordinary skill in the art will recognize that different logical L2 forwarding observation messages may include different information.

Next, at the stage 2155, the MFE 2090 performs a L2 egress ACL operation based on the packet's logical egress context to determine egress access control of the packet with respect to the logical switch 2050. For instance, an egress ACL may be applied to the packet to control the packet's access out of the logical switch 2050. Based on the egress ACL defined for the logical switch 2050, the packet may be dropped. For example, some embodiments ensure that the packet's source is allowed to send packets to the packet's destination logical port on the switch 2050.

The observation message of some embodiments again includes both the packet as received at the MFE and data copied to the registers for the packet for the purpose of being sent in the observation message. This data includes, for a L2 egress ACL decision in some embodiments, (i) a MFE ID specifying that the MFE 2090 is sending the observation, (ii) a logical switch ID for the switch 2050 that implements the ACL conditions (and, in some embodiments, the logical egress port on that logical switch), (iii) the matching ACL entry (e.g., a port isolation entry, etc.), and (iv) the decision of the ACL entry (e.g., whether to drop, allow, enqueue, etc. the packet). One of ordinary skill in the art will recognize that different logical egress ACL observation messages may include different information.

The stages 2025 and 2030 are described above. These stages map the logical output port of the second logical switch 2050 to a physical destination, then perform a physical forwarding operation on the packet to either send the packet through a tunnel to another MFE or to deliver the packet to its destination (e.g., a VM, a gateway to an external network, etc.). As described above, either of these physical operations (forwarding into a tunnel, delivery) result in observations sent to the controller cluster.

In the previous example, all of the logical processing is performed by the first managed forwarding element that receives the traced packet from the controller cluster. In this situation, only this MFE will send observation messages regarding logical processing to the controller cluster, while other MFEs may send physical forwarding or delivery observation messages, as described in section I above. In some embodiments, the last MFE performs the L2 egress ACL for the second logical switch, in which case this MFE may send observation messages detailing the logical ACL decisions.

However, in some embodiments, the controller cluster configures the MFEs to perform a set of logical processing operations in a more distributed manner. FIG. 22 conceptually illustrates an example of performing logical processing operations in such a distributed manner by the MFEs. Specifically, this figure illustrates the two MFEs 2090 and 2092 that implement the logical switches 2045 and 2050 and the logical router 2055 described above by reference to FIG. 20. FIG. 22 also illustrates a logical controller 2205 and two physical controllers 2210 and 2215, which make up at least a portion of the controller cluster 2035 in this example. This figure illustrates various packets and observations with encircled numbers that indicate an order in which the packets and observations messages sent within the network. However, when a path diverts into branches (e.g., 8 and 10) the numbers may not necessarily represent the order in different branches, owing to different lag times for different operations.

As shown by the encircled 1, the logical controller 2205 receives a request from the user. This request specifies a source logical port that maps to a VM connected to the MFE 2090. In response to the request, the logical controller 2205 generates a packet 2092, as described above. As shown by the encircled 2, the logical controller then sends the generated packet to the physical controller 2210 because the physical controller 2210 manages the MFE 2090. The header of the packet 2092 specifies the source and destination addresses received in the request, as well as a trace indicator that marks the packet as a test packet for a trace operation.

The physical controller 2210 examines the packet and identifies that the MFE 2090 is the MFE into which to inject the packet because the logical port to which the source address of the packet connects is mapped to a physical port of the MFE 2090. As shown by the encircled 3, the physical controller 2210 sends the packet 2002 to the MFE 2090. In addition, as previously described, the physical controller 2210 may also modify register bits for the packet at the MFE in order to simulate the receiving of the packet through the appropriate physical port of the MFE.

Upon receiving the packet, the MFE 2090 starts to perform a processing pipeline 2200. As shown, the processing pipeline 2200 performed by the MFE 2090 includes five stages 2235-2240. The first three stages 2235-2245 are similar to the stages 2005-2015 described above by reference to FIGS. 20 and 21. That is, at the stage 2235, the MFE 2090 performs logical ingress context mapping to identify a logical ingress port of a particular logical switch based on the physical port through which the packet was received (or, in this case, through which the MFE thinks the packet was received based on the modified register for the packet).

The MFE 2090 then performs L2 processing operations 2240 and L3 processing operations 2245, which result in the MFE sending observations to the physical controller (as shown by the encircled 4 and 6), and the physical controller sending these observations or the analyses thereof to the logical controller (as shown by the encircled 5 and 7). However, the MFE 2090 in this example is not configured (by the controllers) to perform L2 processing operations for the logical switch 2050. Instead, the MFE 2092 is configured to perform the L2 processing operations for the logical switch 2050. Therefore, when the MFE 2090 resubmits the packet for further processing after the L3 forwarding has been completed, the packet matches a flow entry for the logical to physical mapping operation at the stage 2250. Based on the logical L3 routing decision made at stage 2245, the MFE maps the logical egress port of the logical router to a physical destination (indicating to send the packet encapsulated with this egress port, that connects to the logical switch 2050, to the MFE 2092).

At the stage 2255 of the processing pipeline 2200, the MFE performs a set of physical operations. The set of physical operations in this example determines operations for sending the packet to the MFE 2092 identified in the previous stage 2250 as the MFE to which to send the packet. Specifically, the set of physical operations determines a port of the MFE 2090 from which there is a tunnel to the MFE 2092 (or to a pool node when the MFE 2090 does not have a tunnel established to the MFE 2092). While the MFE 2090 performs the operation at this stage 2255, the MFE sends the observations to the physical controller 2210 as shown by the encircled 8. The physical controller 2210, in turn, sends the observations or the analyses of the observations to the logical controller 2205 as shown by the encircled 9. The MFE 2092 also sends the packet through the tunnel as shown by the encircled 10.

When the MFE 2092 receives the packet, the MFE 2092 performs the processing pipeline 2201, which is the remainder of the logical processing pipeline for the packet. As shown, the processing pipeline 2201 includes four stages 2260-2275. At the stage 2260, the MFE identifies the logical context of the packet 2002. As mentioned above, the logical context would indicate that L2 processing operations for the logical switch 2045 and the L3 processing operations for the logical router 2055 have already been performed on the packet. That is, the logical context would indicate that L2 processing operations for the logical switch 2050 are still left to be performed. In some embodiments, the logical context simply indicates either a logical egress port of the logical router 2055 or a logical ingress port of the logical switch 2050.

Thus, when the MFE resubmits the packet, the flow entries that specify to perform L2 processing operations for the logical switch 2050 are matched and the MFE accordingly performs the L2 processing operations for the logical switch 2050 at the stage 2265. By performing the L2 processing operations at the stage 2260, the MFE 2092 determines a logical port of the logical switch 2050 through which the packet should exit. While the MFE 2092 performs the operation at this stage 2260, the MFE sends the observations to the physical controller 2215 as shown by the encircled 11. The physical controller 2215, in turn, sends the observations or the analyses of the observations to the logical controller 2205 as shown by the encircled 12.

Next, at the stage 2270, the MFE performs the logical to physical mapping operation to identify the physical port to which the logical port identified in the previous stage 2265 is mapped. At the stage 2275, the MFE performs a set of physical forwarding operations and finds out that the physical port identified in the previous stage 2270 is one of those located at the MFE 2092. Therefore, the MFE 2092 sends (as shown by the encircled 13) observation indicating the delivery of the packet but drops the packet so that the packet does not reach the destination address. The physical controller 2215 receives these observations from the MFE 2092 because the physical controller 2215 manages the MFE 2092. The physical controller 2215 sends (as shown by the encircled 14) these observations to the logical controller 2205. The logical controller 2205 generates a report of this trace operation and sends this report to the user as shown by the encircled 15.

The example of FIG. 22 illustrates one possible distribution of logical forwarding operations. However, there may be numerous other possible distributions of logical forwarding operations. Some of these possible distributions are described in U.S. Publication 2013/0044636, which is incorporated by reference above.

In addition to the distributed processing pipeline, some embodiments may use a centralized router for performing the logical L3 processing, as described in U.S. Publication 2013/0044636, incorporated by reference above. In some of these embodiments, the routing is performed by a namespace, which is a container (e.g., in a linux kernel) created to implement a logical router (e.g., in a second level MFE such as a pool node or a gateway), perform network address translation, etc. In addition, some embodiments require forwarding packets to middleboxes, which may be implemented as either centralized appliances (e.g., in a physical box, in a separately running virtual machine) or as distributed applications running alongside the edge MFEs.

In either of these situations, some embodiments mark the packets in such a way that the trace indicator bit is not lost upon sending the packet to a centralized logical router or middlebox and receiving the packet back from this entity. Without a specific manner of marking the packet, the trace indicator could be lost, and no observations would be sent once the packet is received back from the centralized entity. For example, if the middlebox appliance or other entity uses a tunneling protocol to send/receive packets (e.g., GRE, STT, etc.), then the MFE can be configured to incorporate the marking information (which can be referred to as a persistence register) into the tunnel header in some embodiments. For a logical router implemented in a namespace, some embodiments mark the packet in such a way that the MFE writes the bit into a data structure used by the namespace to represent the packet (e.g., by using a specific mark field understood by the namespace). As a specific example, some embodiments use a "mark" field of a "sk_buff" data structure in the linux kernel. The namespace will then pass the packet back with this mark upon completing its logical processing.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 23:
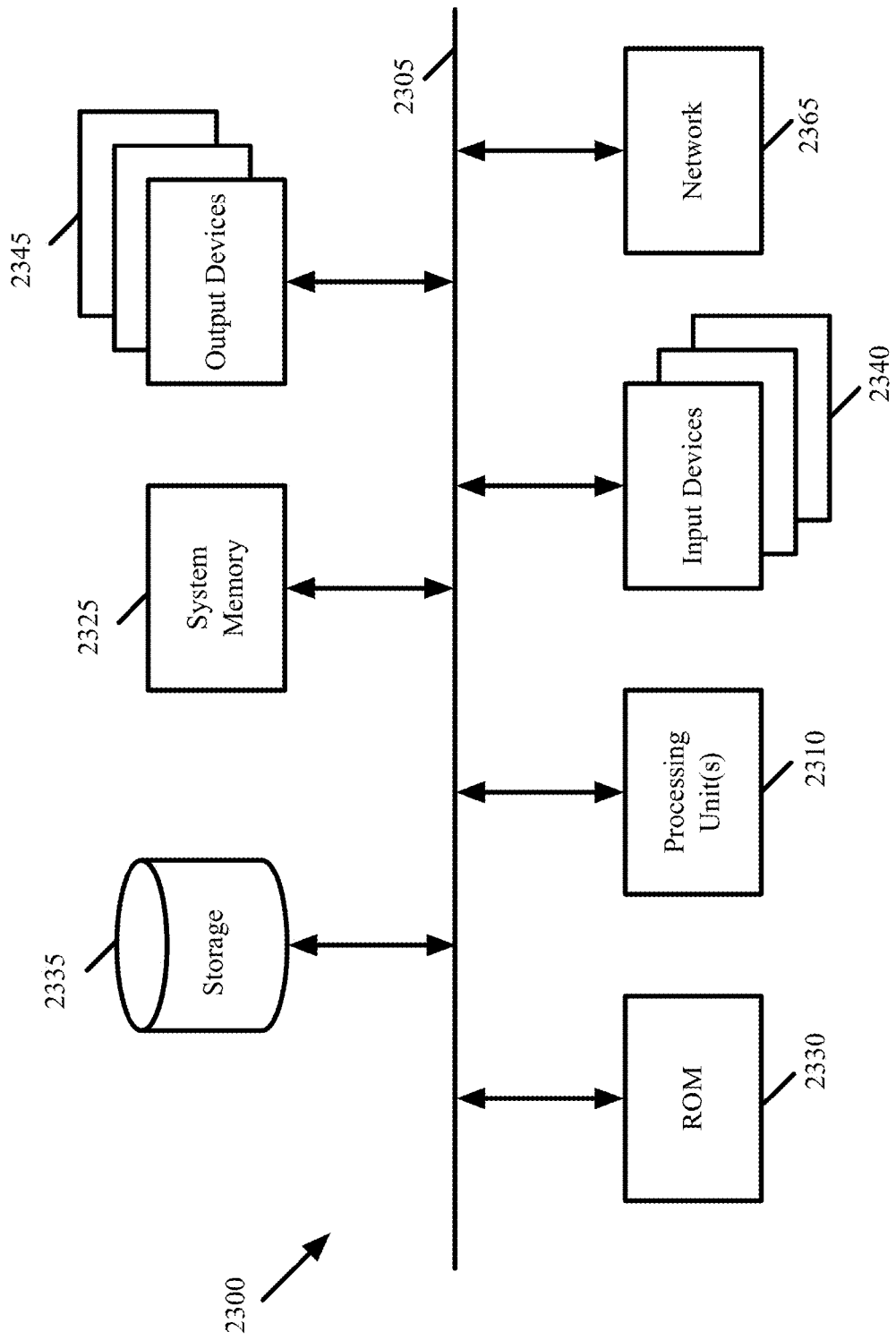
FIG. 23 conceptually illustrates an electronic system with which some embodiments of the invention are implemented.

FIG. 23 conceptually illustrates an electronic system 2300 with which some embodiments of the invention are implemented. The electronic system 2300 can be used to execute any of the control, virtualization, or operating system applications described above. The electronic system 2300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2300 includes a bus 2305, processing unit(s) 2310, a system memory 2325, a read-only memory 2330, a permanent storage device 2335, input devices 2340, and output devices 2345.

The bus 2305 collectively represents all system, peripheral, and chipset buses that communicatively connect the numerous internal devices of the electronic system 2300. For instance, the bus 2305 communicatively connects the processing unit(s) 2310 with the read-only memory 2330, the system memory 2325, and the permanent storage device 2335.

From these various memory units, the processing unit(s) 2310 retrieve instructions to execute and data to process in order to execute the processes of the invention. The processing unit(s) may be a single processor or a multi-core processor in different embodiments.

The read-only-memory (ROM) 2330 stores static data and instructions that are needed by the processing unit(s) 2310 and other modules of the electronic system. The permanent storage device 2335, on the other hand, is a read-and-write memory device. This device is a non-volatile memory unit that stores instructions and data even when the electronic system 2300 is off. Some embodiments of the invention use a mass-storage device (such as a magnetic or optical disk and its corresponding disk drive) as the permanent storage device 2335.

Other embodiments use a removable storage device (such as a floppy disk, flash drive, etc.) as the permanent storage device. Like the permanent storage device 2335, the system memory 2325 is a read-and-write memory device. However, unlike storage device 2335, the system memory is a volatile read-and-write memory, such a random access memory. The system memory stores some of the instructions and data that the processor needs at runtime. In some embodiments, the invention's processes are stored in the system memory 2325, the permanent storage device 2335, and/or the read-only memory 2330. From these various memory units, the processing unit(s) 2310 retrieve instructions to execute and data to process in order to execute the processes of some embodiments.

The bus 2305 also connects to the input and output devices 2340 and 2345. The input devices enable the user to communicate information and select commands to the electronic system. The input devices 2340 include alphanumeric keyboards and pointing devices (also called "cursor control devices"). The output devices 2345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 23, bus 2305 also couples electronic system 2300 to a network 2365 through a network adapter (not shown). In this manner, the computer can be a part of a network of computers (such as a local area network ("LAN"), a wide area network ("WAN"), or an Intranet, or a network of networks, such as the Internet. Any or all components of electronic system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6, 12, and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. For a first network controller that manages a set of logical forwarding elements implemented in a plurality of managed forwarding elements, a method comprising:
   receiving, at the first network controller, a request to trace a specified packet having a particular source on a logical forwarding element;
   generating the specified packet according to the request, the generated packet comprising an indicator that the packet is for a trace operation;
   sending the generated packet to a second network controller that manages a managed forwarding element associated with the particular source; and
   receiving, from a set of network controllers, a first set of messages regarding operations performed on the packet, wherein the set of network controllers receives a second set of messages regarding operations performed on the packet from a set of managed forwarding elements that process the packet.

2. The method of claim 1, wherein the first network controller does not directly communicate with any managed forwarding element.

3. The method of claim 1, wherein the first set of messages and the second set of messages are identical.

4. The method of claim 1, wherein the set of network controllers generates the first set of messages by analyzing the second set of messages.

5. The method of claim 1, wherein the set of network controllers includes the second network controller.

6. The method of claim 1 further comprising receiving a third set of messages regarding operations performed on the packet from a third network controller that receives the third set of messages from a second set of network controllers, wherein the particular set of network controllers receives a fourth set of messages from a second set of managed forwarding elements that process the packet.

7. The method of claim 1, wherein the second network controller receives other packets for trace operations from other network controllers that receive requests to trace the other packets.

8. The method of claim 1 further comprising:
   generating a report of the trace operation based on data regarding the packet in the first set of messages; and
   sending the report to a user that requested the trace operation.

9. The method of claim 1, wherein the managed forwarding element associated with the particular source sends a plurality of messages to the second network controller.

10. A machine readable medium storing a program for execution by at least one processing unit of a first network controller that manages a set of logical forwarding elements implemented in a plurality of managed forwarding elements, the program comprising sets of instructions for:
- receiving a request to trace a specified packet having a particular source on a logical forwarding element;
- generating the specified packet according to the request, the generated packet comprising an indicator that the packet is for a trace operation;
- sending the generated packet to a second network controller that manages a managed forwarding element associated with the particular source; and
- receiving, from a set of network controllers, a first set of messages regarding operations performed on the packet, wherein the set of network controllers receives a second set of messages regarding operations performed on the packet from a set of managed forwarding elements that process the packet.

11. The machine readable medium of claim 10, wherein the particular source is a logical port of the logical forwarding element.

12. The machine readable medium of claim 11, wherein the logical port is associated with a MAC address of a virtual interface of a virtual machine that connects to the logical forwarding element.

13. The machine readable medium of claim 10, wherein the request is received from a third network controller that generates the request based on user inputs.

14. For a first network controller that manages a first plurality of managed forwarding elements, a method comprising:
- receiving, at the first network controller, a specified packet having (i) a particular source on a logical forwarding element and (ii) an indicator that the packet is for a trace operation from a second network controller;
- inserting the received packet into a managed forwarding element associated with the particular source such that the managed forwarding element processes the packet as though the packet was received from the particular source;
- receiving, at the first network controller, a first set of messages from a first set of managed forwarding elements in the first plurality of managed forwarding elements that processes the packet regarding operations performed on the packet; and
- sending the received first set of messages to the second network controller,
- wherein the second network controller receives a second set of messages from a third network controller that receives the second set of messages from a second set of managed forwarding elements in a second plurality of managed forwarding elements that processes the packet, wherein the third network controller manages the second plurality of managed forwarding elements.

15. The method of claim 14, wherein inserting the packet into the managed forwarding element comprises sending a command that modifies registers of the managed forwarding element associated with the particular source.

16. The method of claim 15, wherein the modified registers specify that the packet is received through an ingress port of the managed forwarding element that connects to the particular source.

17. The method of claim 14 further comprising examining the received packet to identify the managed forwarding element into which to insert the packet.

18. The method of claim 14, wherein the second network controller performs analysis on the first and second sets of messages in order to generate a report regarding the trace operation.

19. The method of claim 14, wherein the particular source is a logical port of the logical forwarding element.

20. The method of claim 19, wherein the logical port is associated with an external network to which the logical forwarding element connects, wherein a plurality of different managed forwarding elements are associated with the logical port, the method further comprising selecting one of the plurality of different managed forwarding elements associated with the logical port as the managed forwarding element into which to insert the packet.

21. The method of claim 19, wherein the logical port is associated with a remote domain to which the logical forwarding element connects, wherein a plurality of different managed forwarding elements are associated with the logical port, the method further comprising selecting one of the plurality of different managed forwarding elements associated with the logical port as the managed forwarding element into which to insert the packet.

22. A machine readable medium storing a program for execution by at least one processing unit of a first network controller that manages a first plurality of managed forwarding elements, the program comprising sets of instructions for:
- receiving, from a second network controller, a specified packet having (i) a particular source on a logical forwarding element and (ii) an indicator that the packet is for a trace operation;
- inserting the packet into a managed forwarding element associated with the particular source;
- receiving a first set of messages from a first set of managed forwarding elements in the first plurality of managed forwarding elements that process the packet regarding operations performed on the packet; and
- generating a second set of messages based on the first set of messages; and
- sending the second set of messages to the second network controller in order for the second network controller to combine the second set of messages with other messages received from other network controllers that manage other managed forwarding elements.

23. The machine readable medium of claim 22, wherein the set of instructions for generating the second set of messages comprises a set of instructions for analyzing the first set of messages, wherein the second set of messages comprises analysis of the first set of messages.

24. The machine readable medium of claim 22, wherein the set of instructions for generating the second set of messages comprises a set of instructions for extracting information from the first set of messages to include in the second set of messages.

25. The machine readable medium of claim 22, wherein the program further comprises sets of instructions for:
- receiving a third set of messages from a third set of managed forwarding elements in the plurality of managed forwarding elements that process a different packet generated by a third network controller;
- generating a fourth set of messages by analyzing the third set of messages; and
- sending the fourth set of messages to the third network controller in order for the third network controller to combine the fourth set of messages with other messages received from other network controllers.

26. The machine readable medium of claim 22, wherein the second network controller generates a report for the trace operation based on the second set of messages and the other messages received from the network controllers.

* * * * *